(12) United States Patent
Tashiro et al.

(10) Patent No.: US 8,928,989 B2
(45) Date of Patent: Jan. 6, 2015

(54) ZOOM LENS AND IMAGE PICKUP APPARATUS EQUIPPED WITH ZOOM LENS

(75) Inventors: Yoshihisa Tashiro, Nikko (JP); Toyokatsu Fujisaki, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 102 days.

(21) Appl. No.: 13/488,086

(22) Filed: Jun. 4, 2012

(65) Prior Publication Data

US 2012/0314299 A1 Dec. 13, 2012

(30) Foreign Application Priority Data

Jun. 10, 2011 (JP) ................................ 2011-129910

(51) Int. Cl.
*G02B 15/14* (2006.01)
*G02B 13/00* (2006.01)
*G02B 15/17* (2006.01)
*G02B 15/173* (2006.01)
*G02B 13/12* (2006.01)

(52) U.S. Cl.
CPC .......... *G02B 13/0065* (2013.01); *G02B 13/009* (2013.01); *G02B 15/17* (2013.01); *G02B 15/173* (2013.01); *G02B 13/12* (2013.01)
USPC ............................ 359/678; 359/686; 359/695

(58) Field of Classification Search
USPC .......................................... 359/687, 695, 678
See application file for complete search history.

(56) References Cited

U.S. PATENT DOCUMENTS

| 5,572,277 | A | 11/1996 | Uzawa | |
|---|---|---|---|---|
| 6,002,526 | A * | 12/1999 | Okada et al. | 359/677 |
| 7,889,436 | B2 | 2/2011 | Wada | |
| 7,982,970 | B2 | 7/2011 | Wada | |
| 2001/0046383 | A1 | 11/2001 | Hagimori | |
| 2010/0033839 | A1* | 2/2010 | Fujisaki | 359/687 |
| 2010/0123956 | A1* | 5/2010 | Wada | 359/683 |
| 2010/0302650 | A1* | 12/2010 | Fujisaki | 359/686 |
| 2011/0026133 | A1* | 2/2011 | Fujisaki | 359/683 |
| 2011/0051257 | A1 | 3/2011 | Wada | |
| 2012/0019929 | A1* | 1/2012 | Fujisaki | 359/683 |

FOREIGN PATENT DOCUMENTS

| CN | 101158744 A | 4/2008 |
|---|---|---|
| CN | 102004303 A | 4/2011 |
| CN | 102338928 A | 2/2012 |
| JP | 2007-279541 A | 10/2007 |

* cited by examiner

*Primary Examiner* — Thomas K Pham
*Assistant Examiner* — Marin Pichler
(74) *Attorney, Agent, or Firm* — Canon USA Inc IP Division

(57) ABSTRACT

A zoom lens includes, a first lens unit of a positive refractive power, a second lens unit of a negative refractive power, a reflective element, and a rear lens group including two or more lens units and an aperture stop, in which the first lens unit, the second lens unit, and two or more lens units of the rear lens group are moved while the reflective element is stationary during zooming, wherein movement amounts M1 and M2 of the first and second lens units during zooming, a movement amount Ms of the aperture stop, and focal lengths fw and ft of the entire zoom lens at the wide-angle end and the telephoto end, respectively, lateral magnifications β2w and β2t of the second lens unit, a distance LSw from the first lens surface to the aperture stop at the wide-angle end are appropriately set.

13 Claims, 35 Drawing Sheets

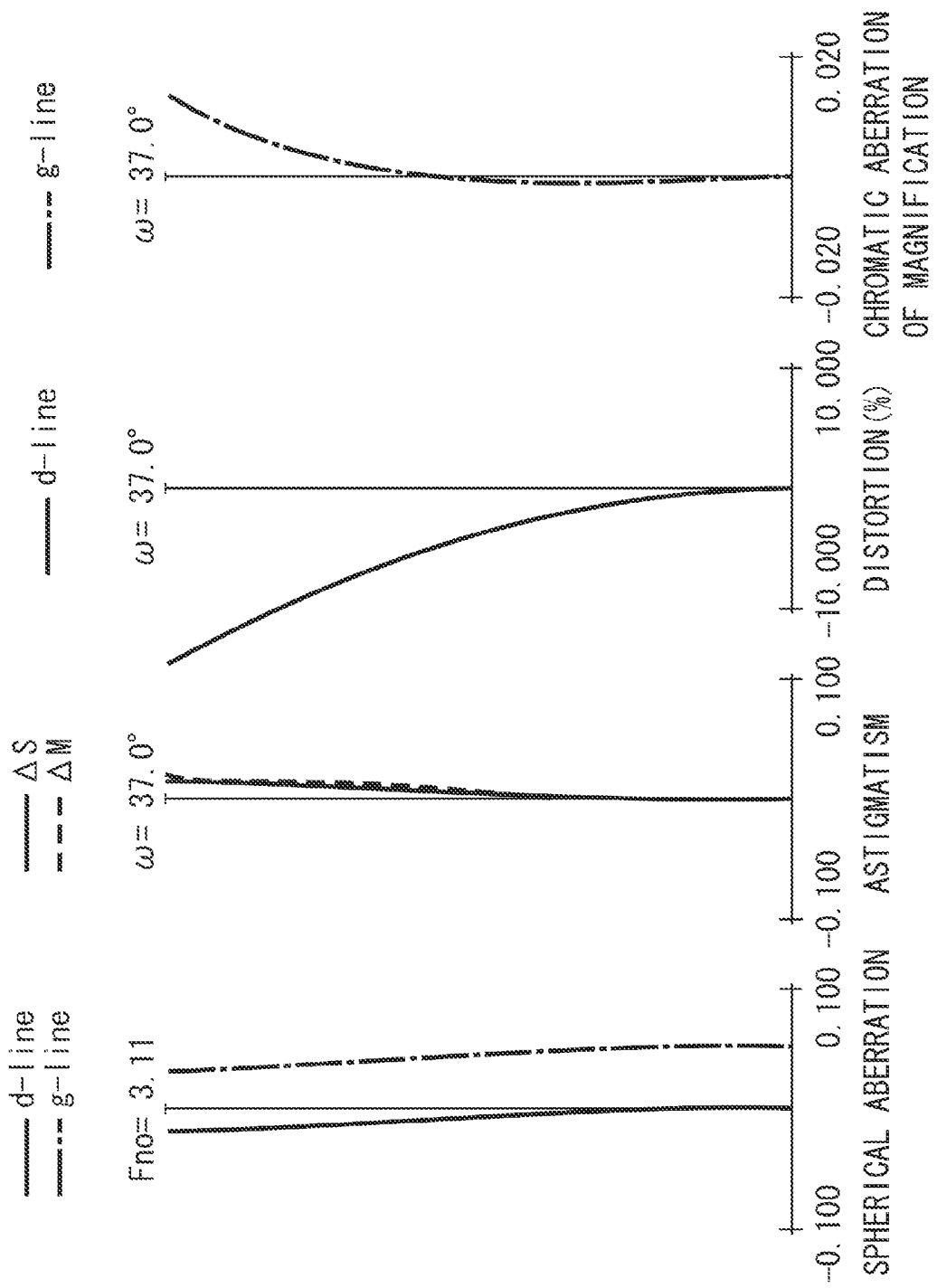

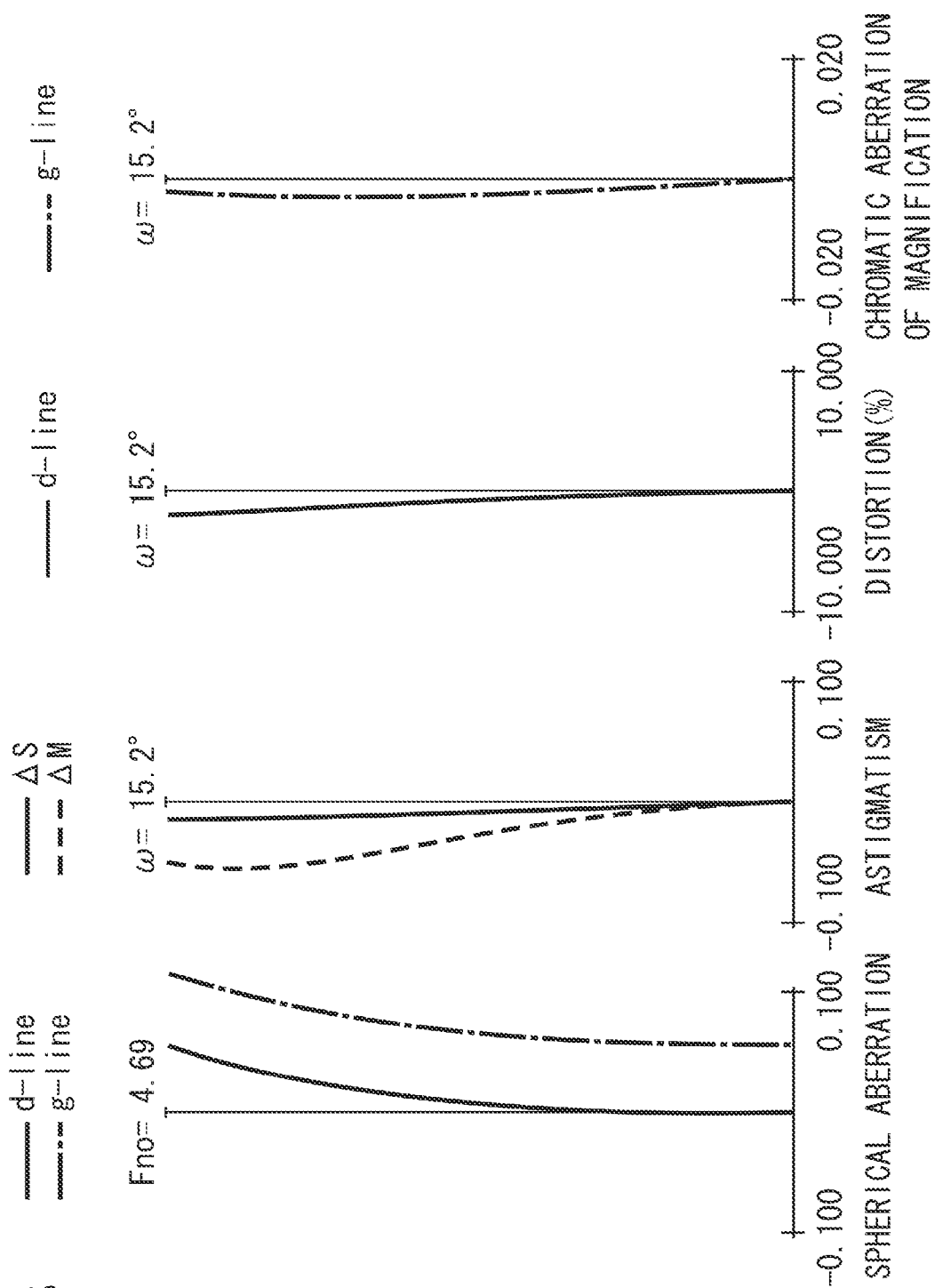

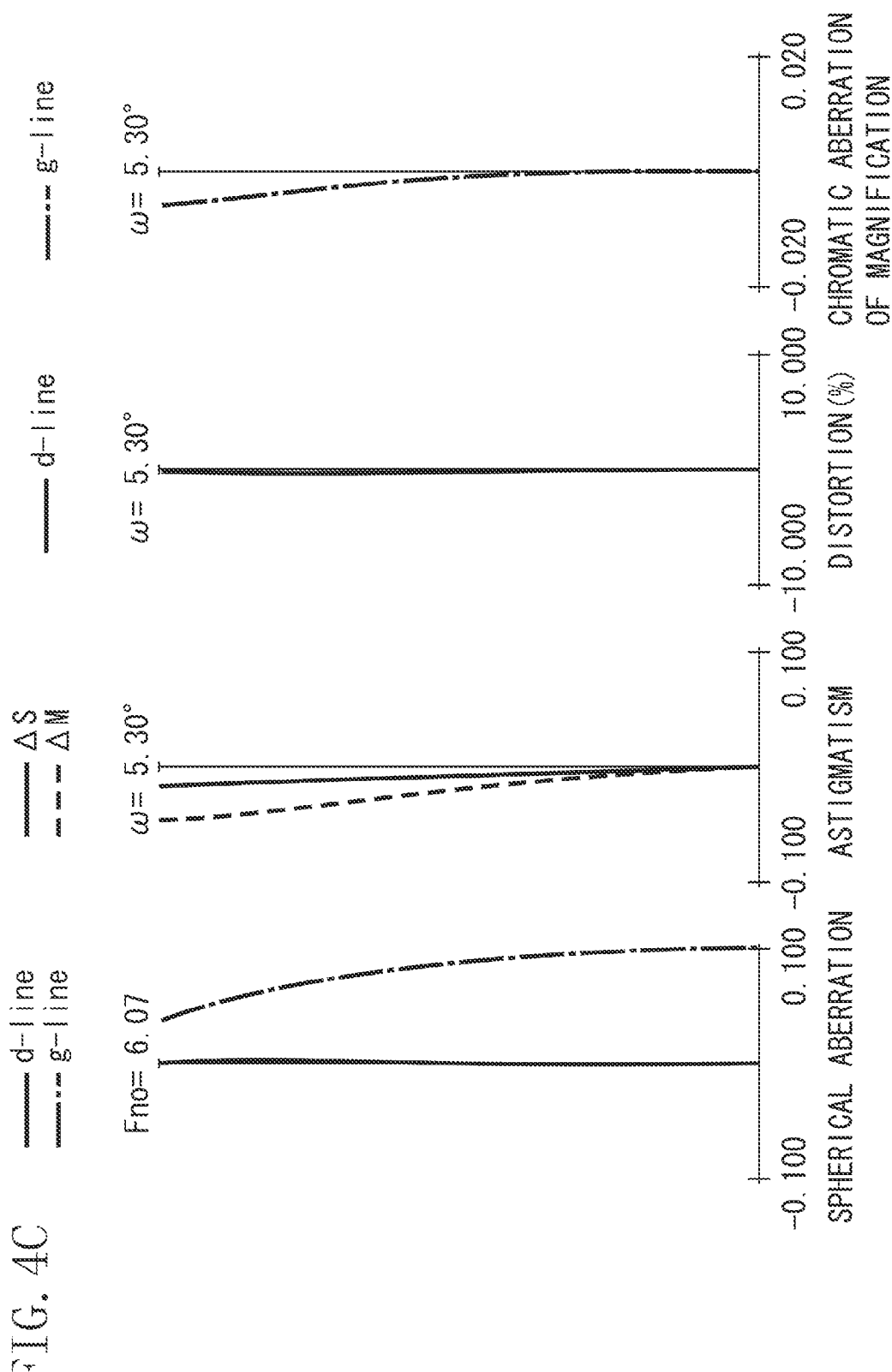

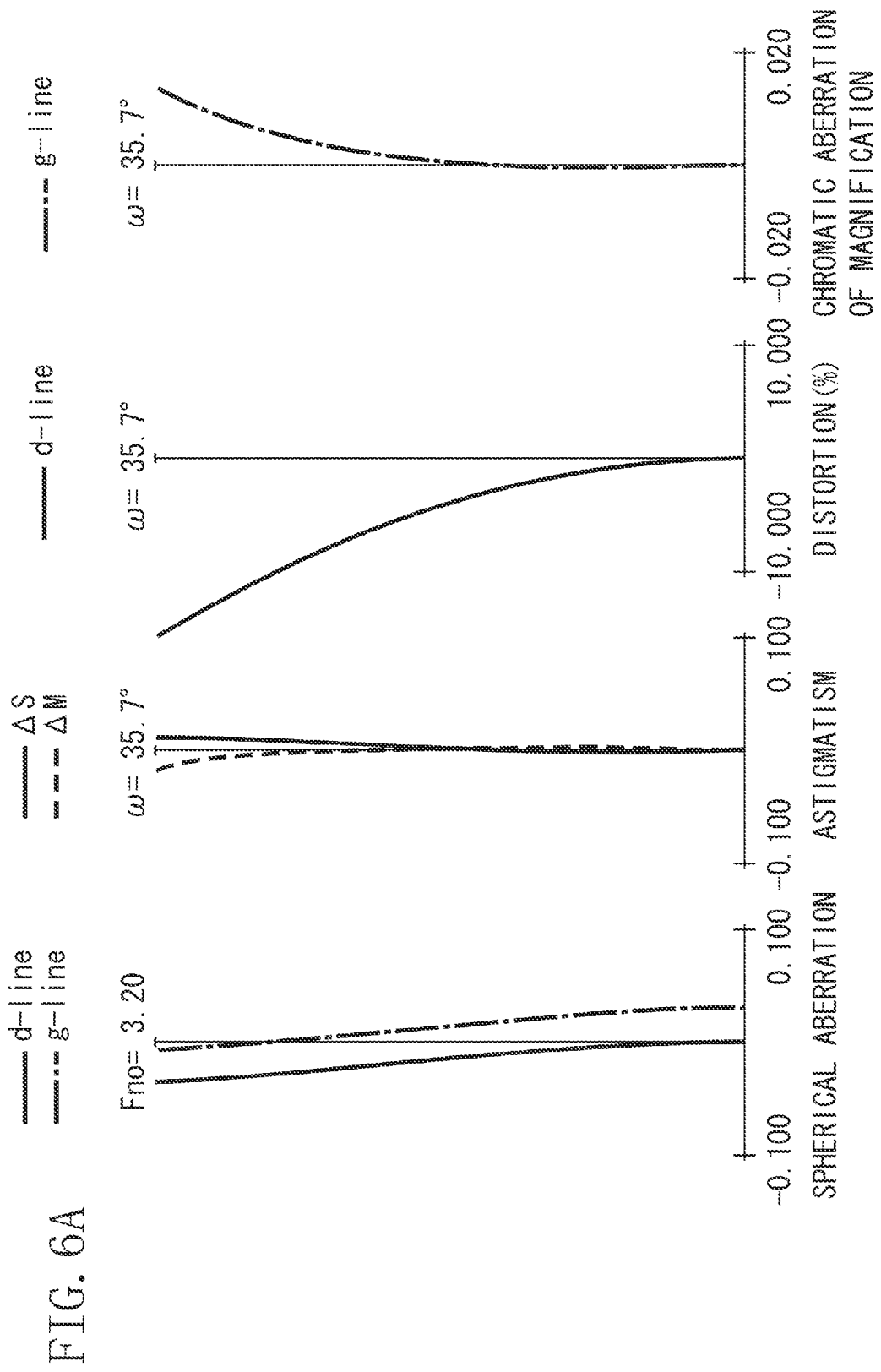

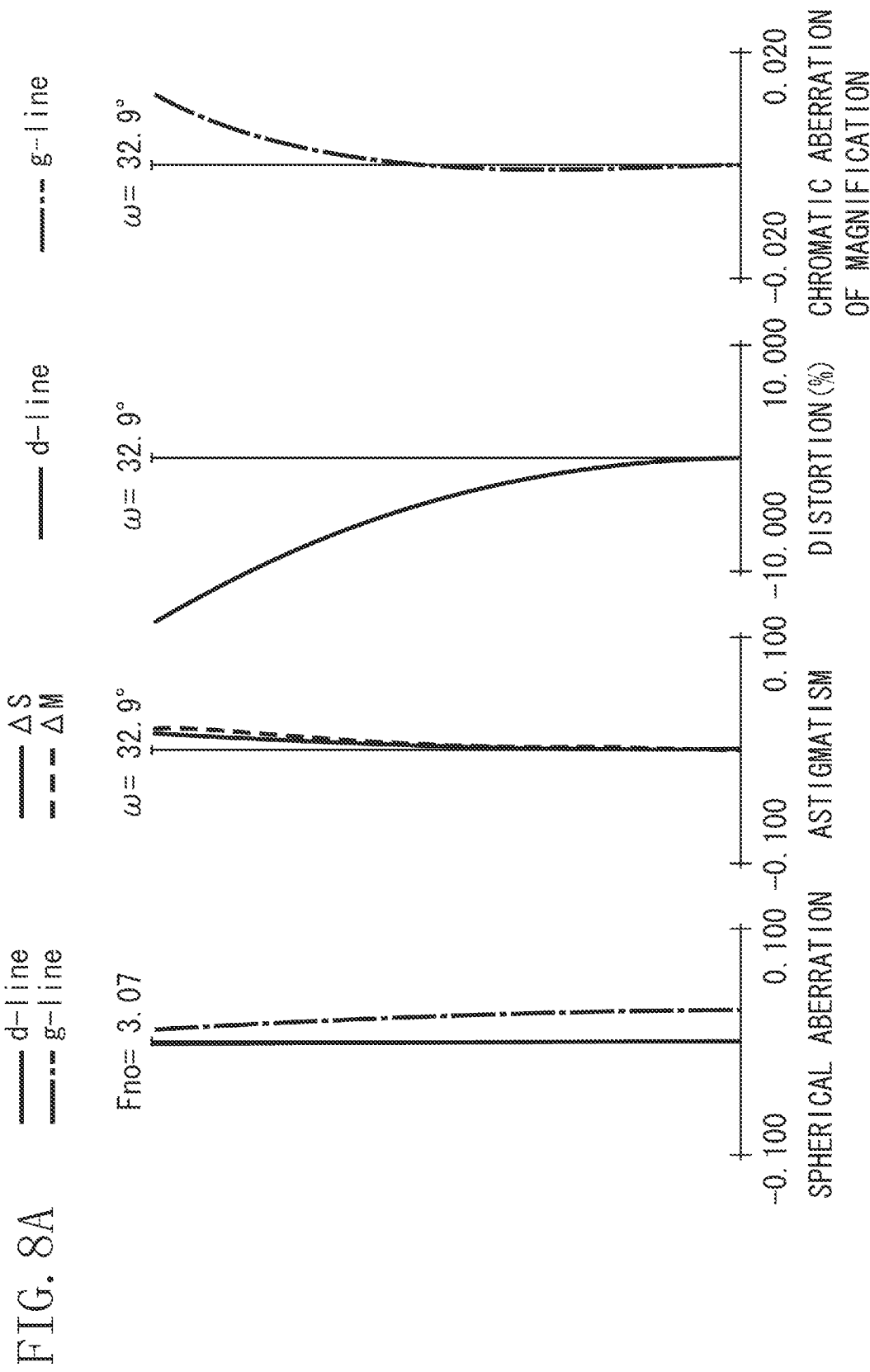

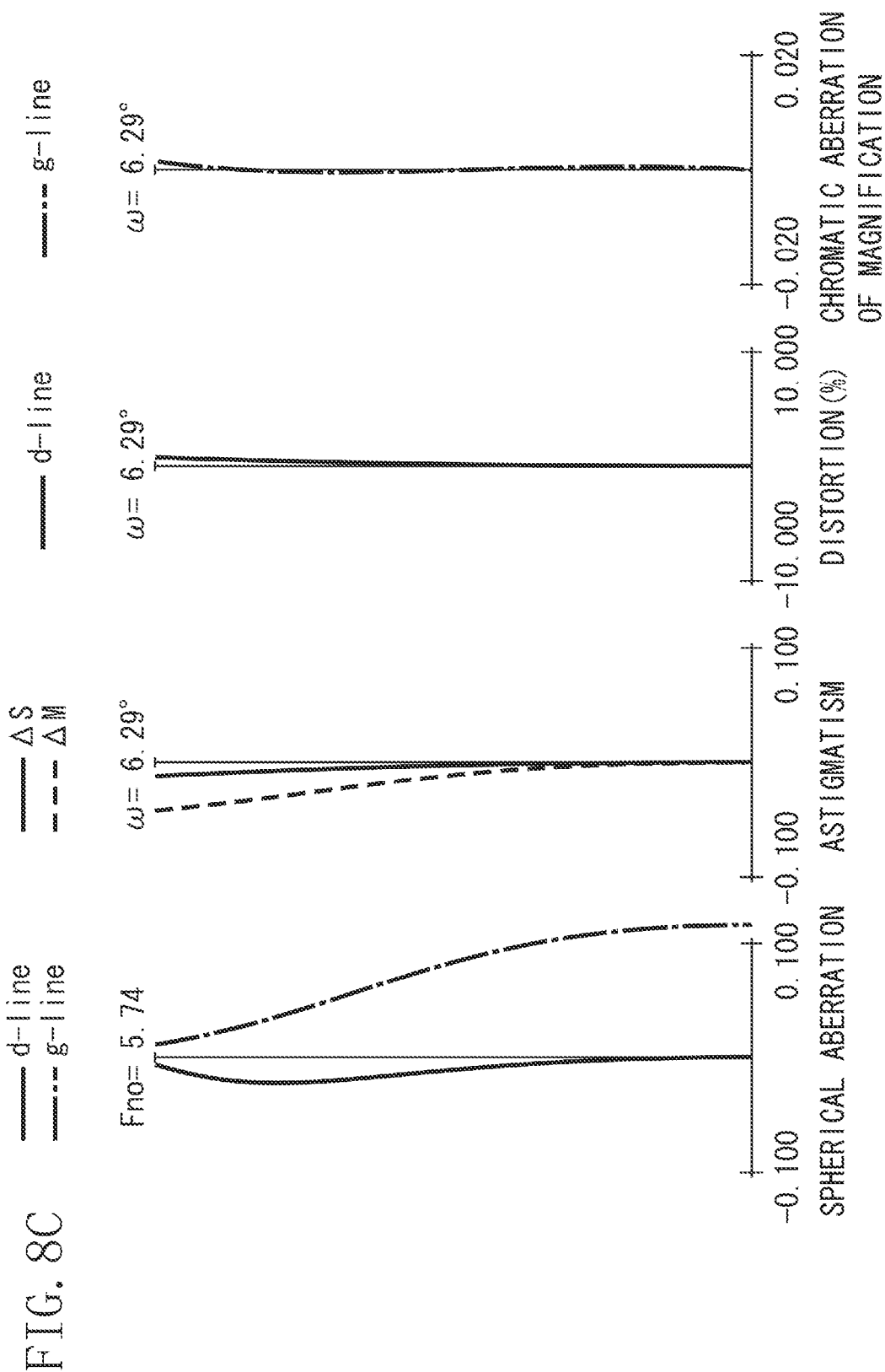

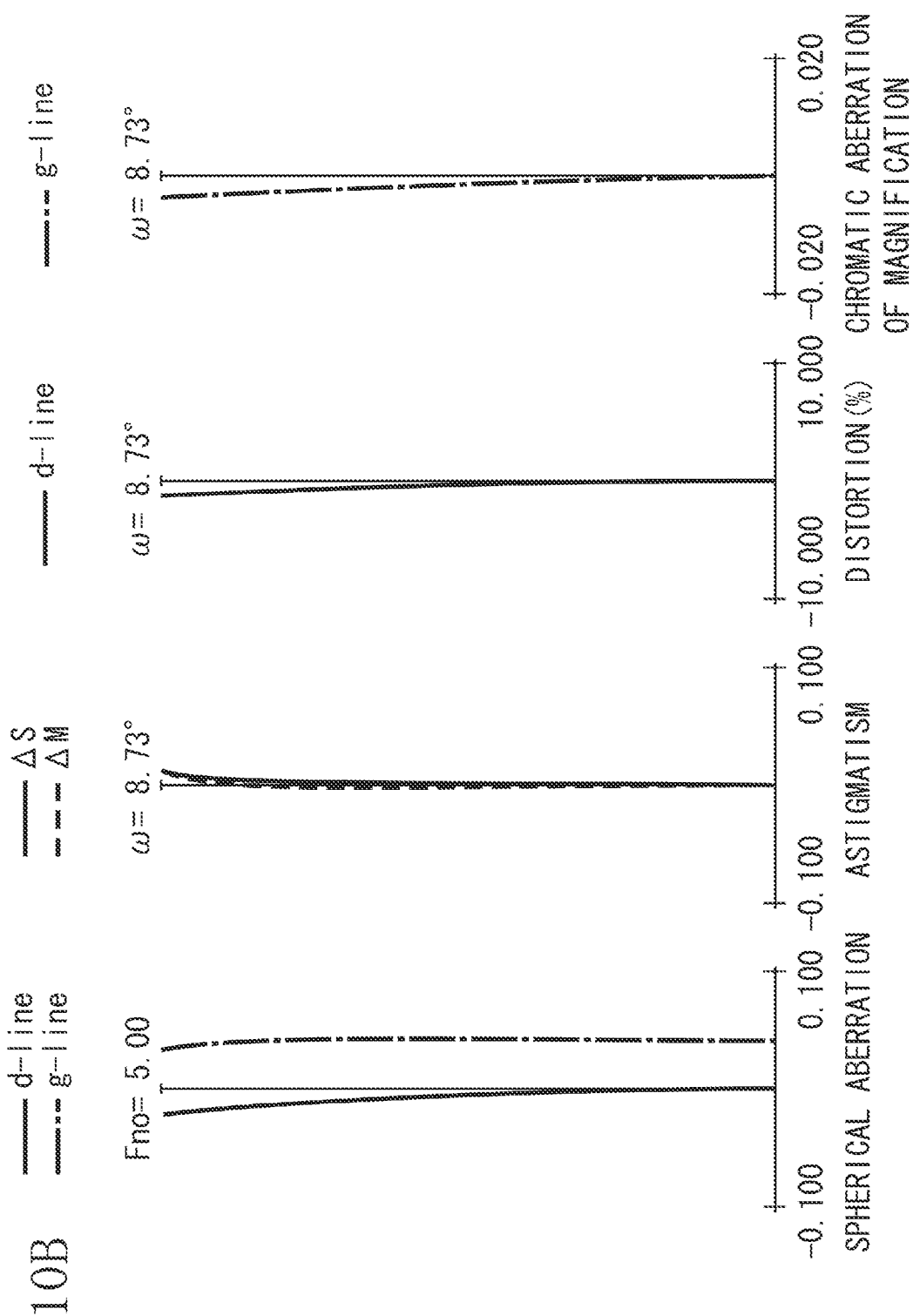

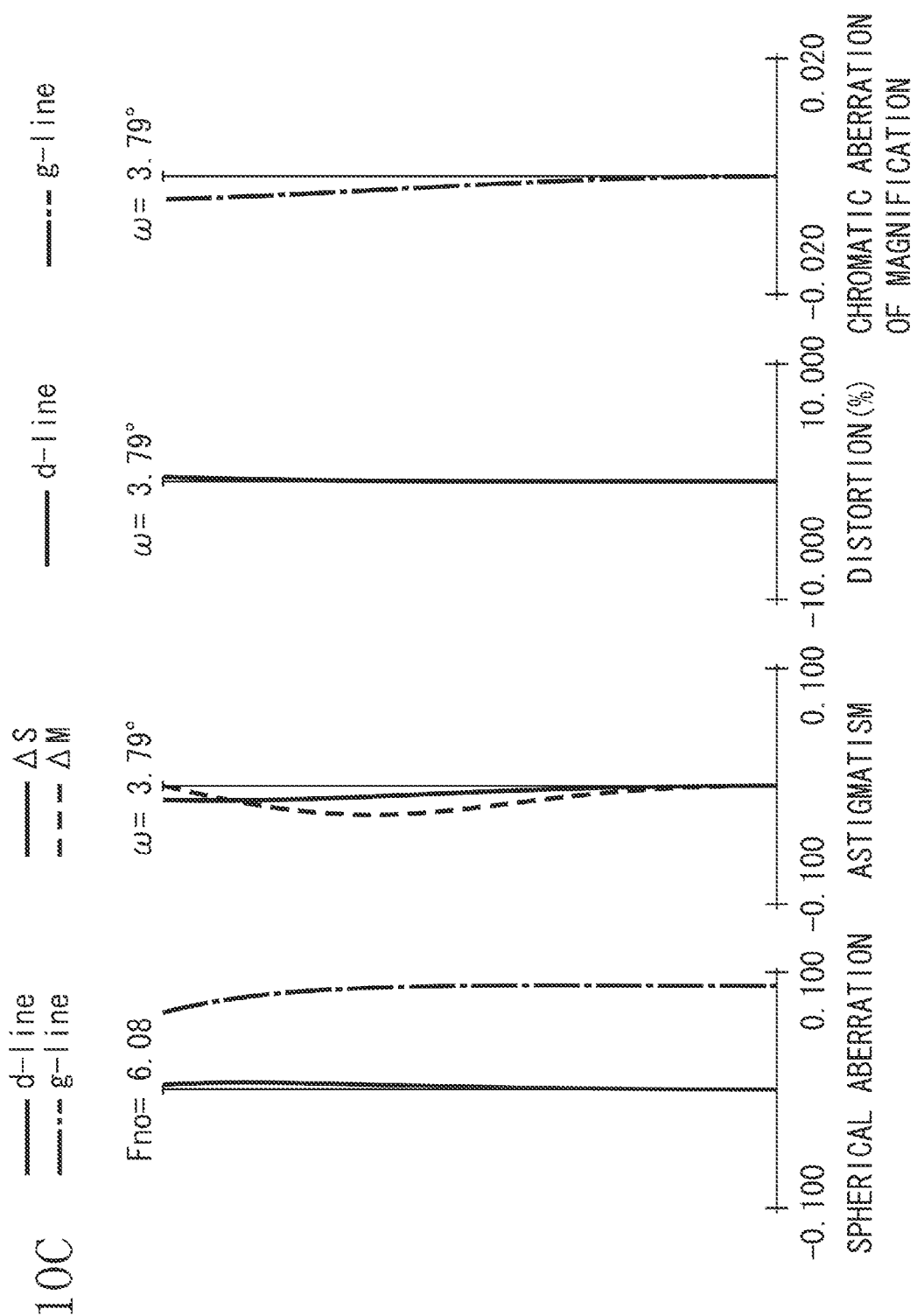

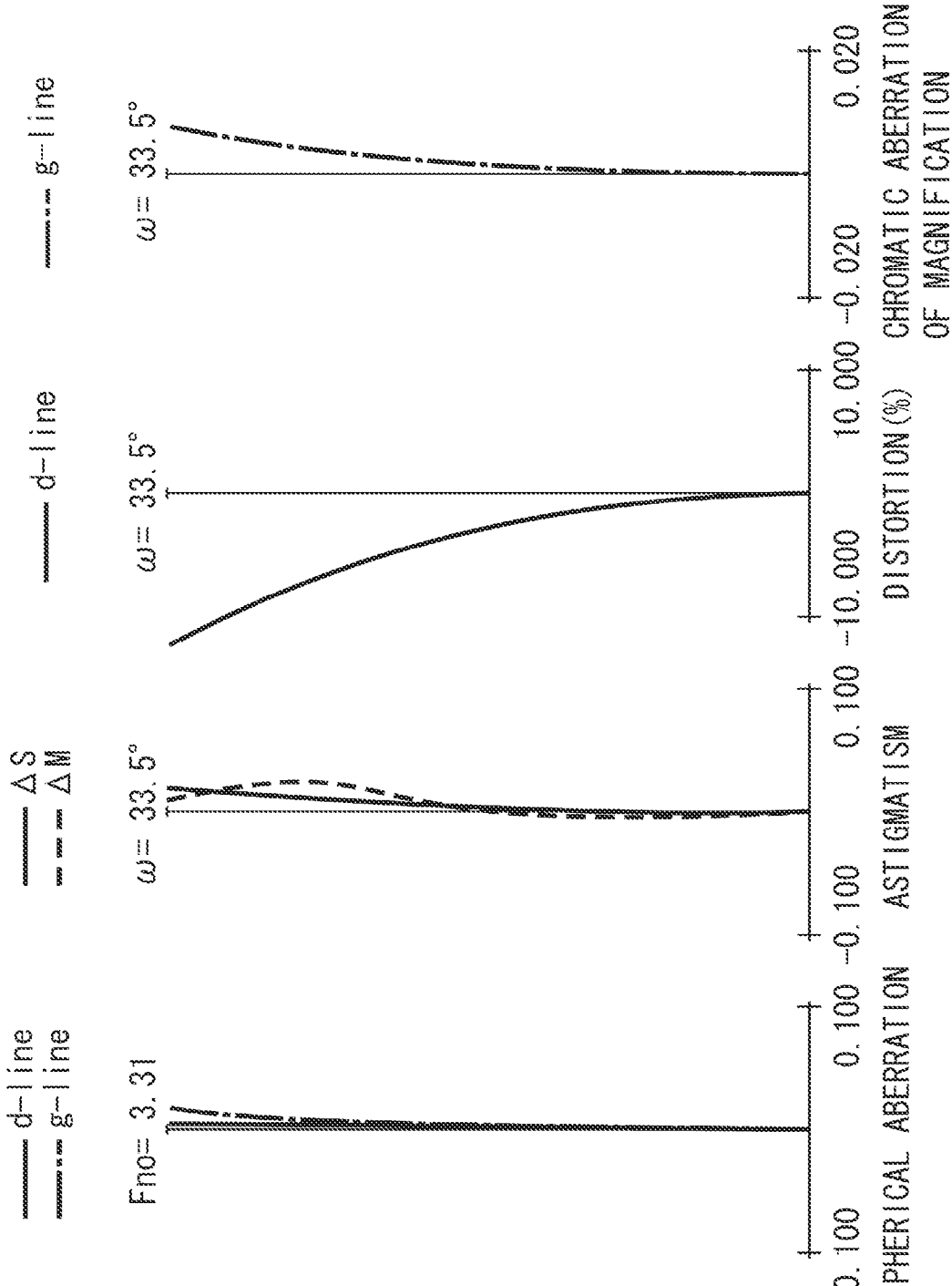

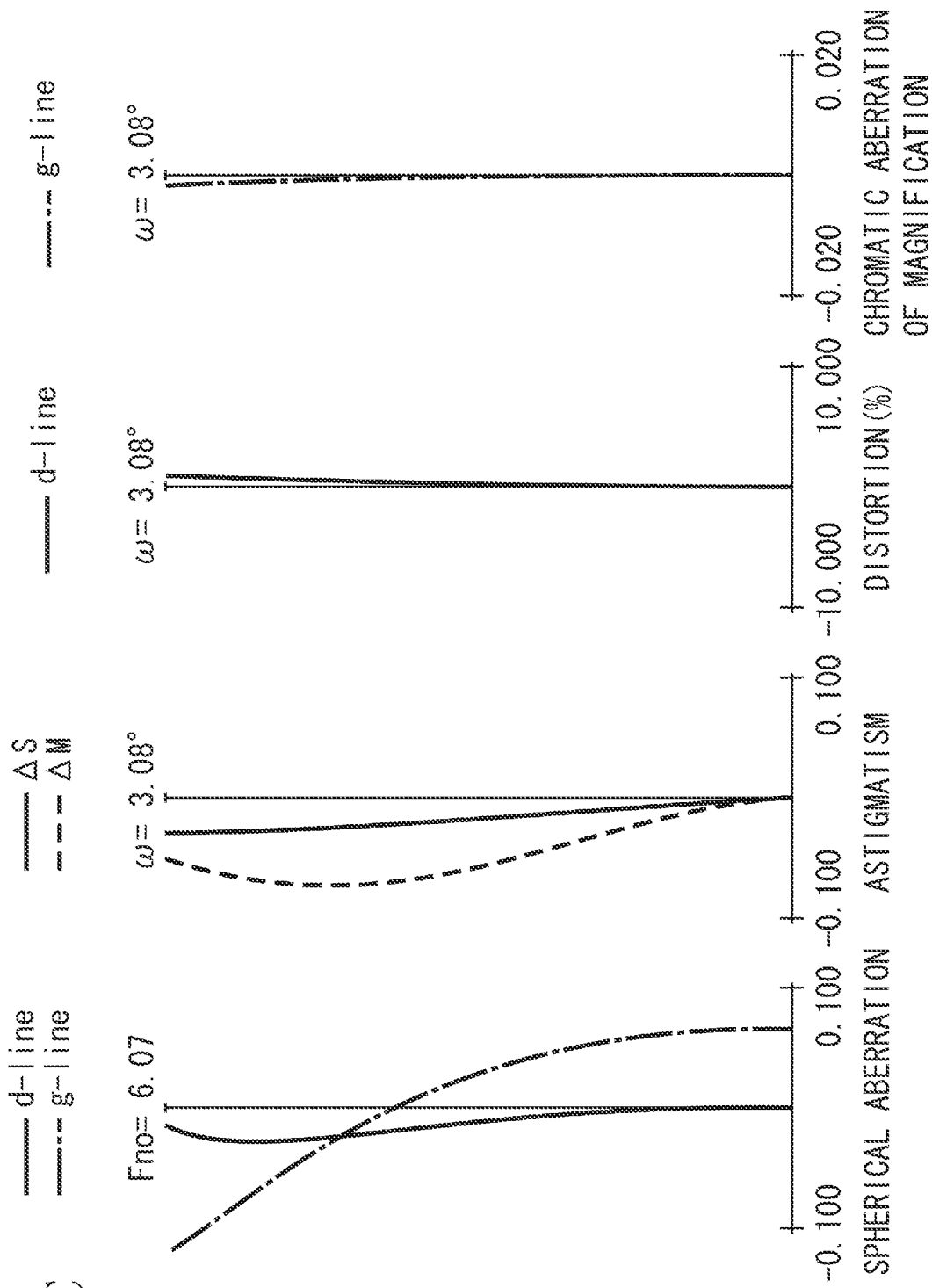

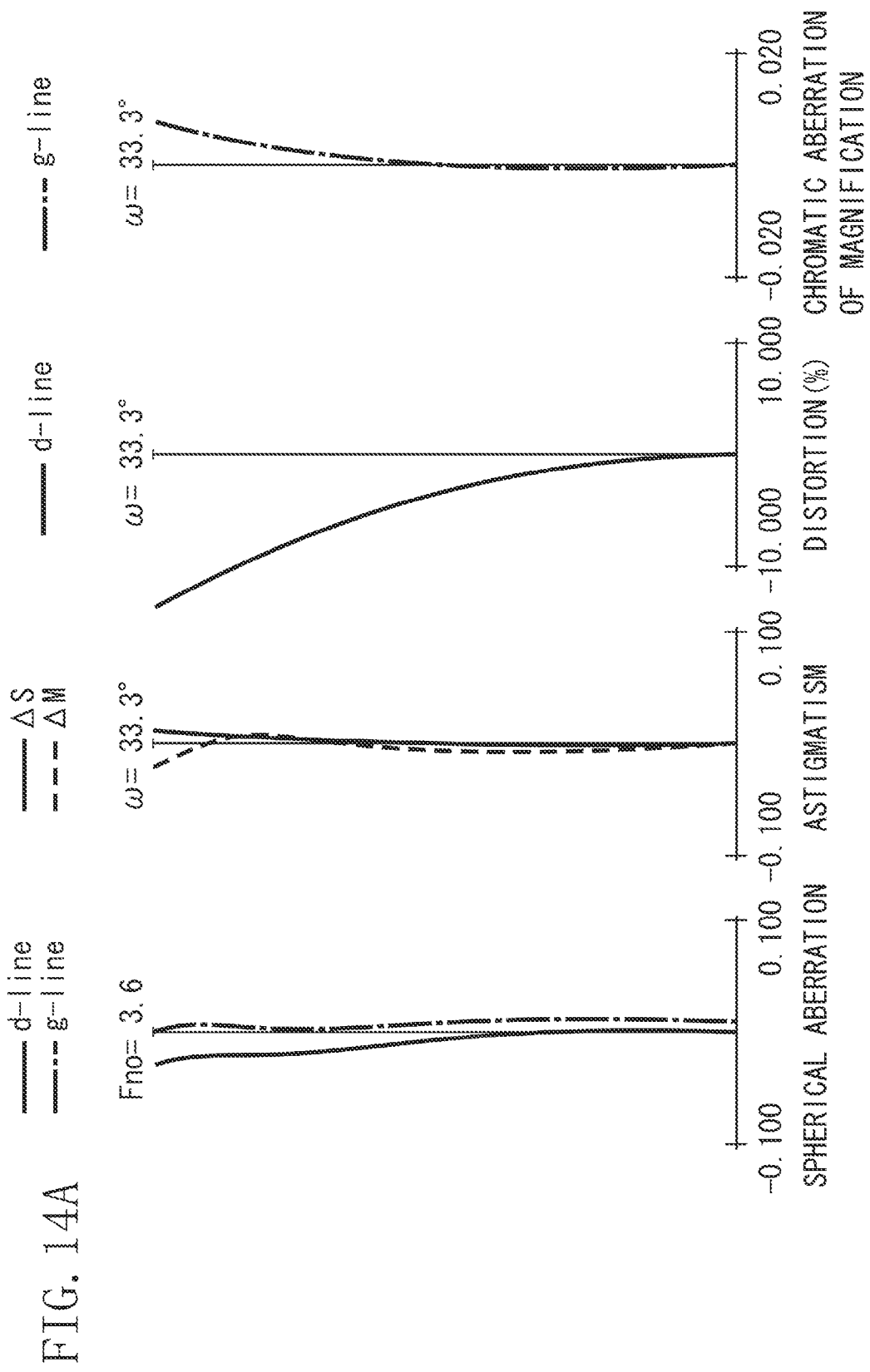

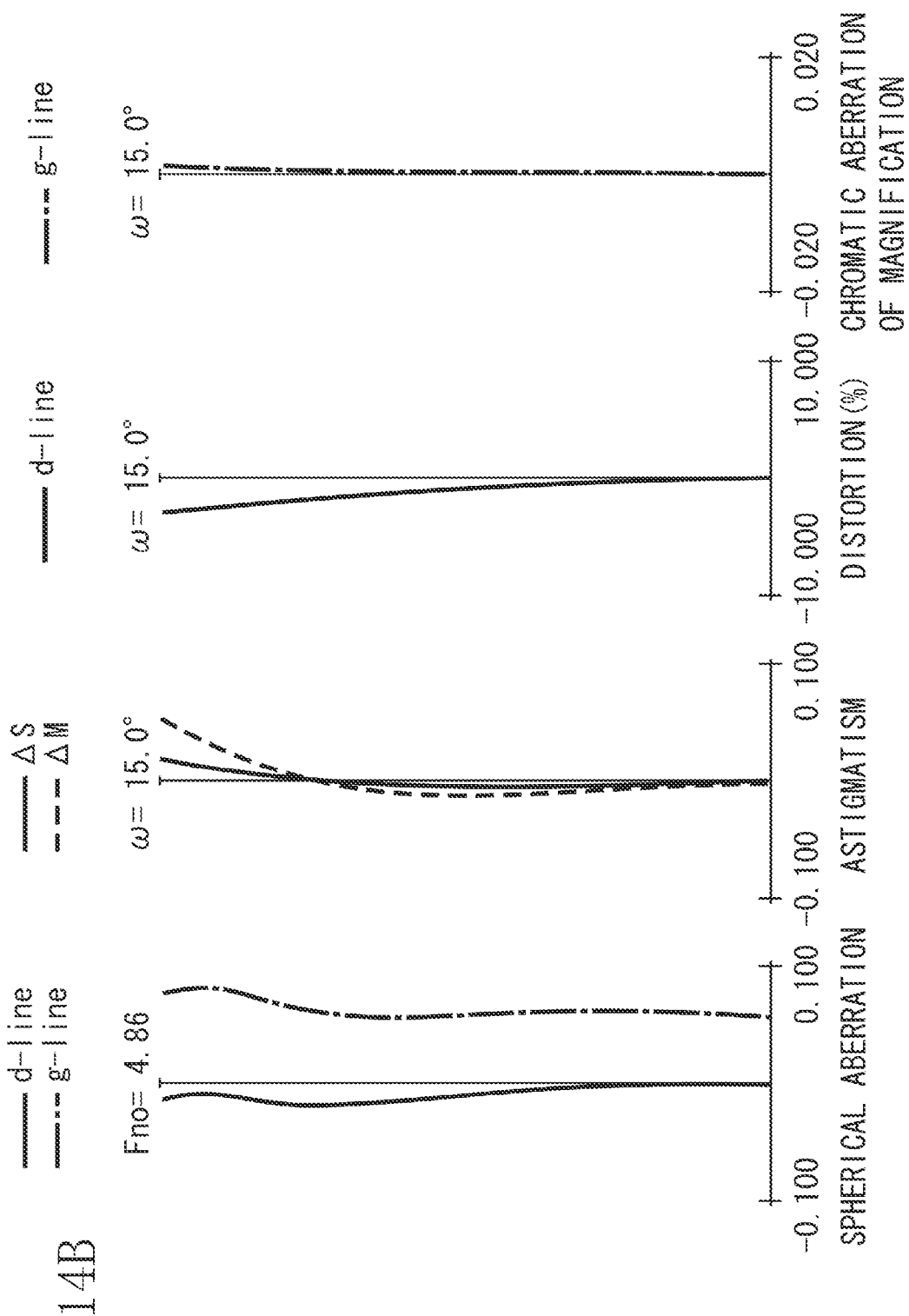

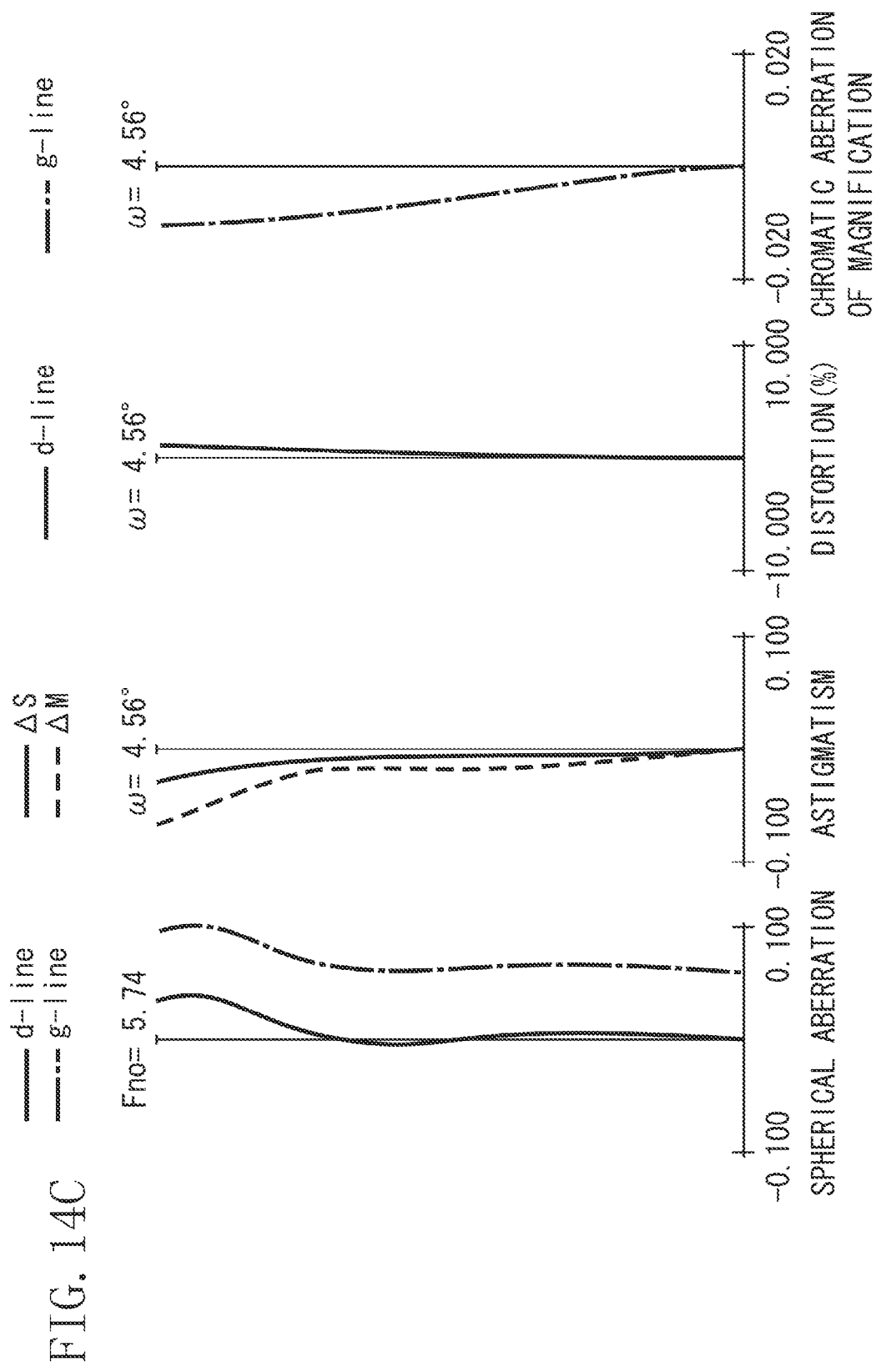

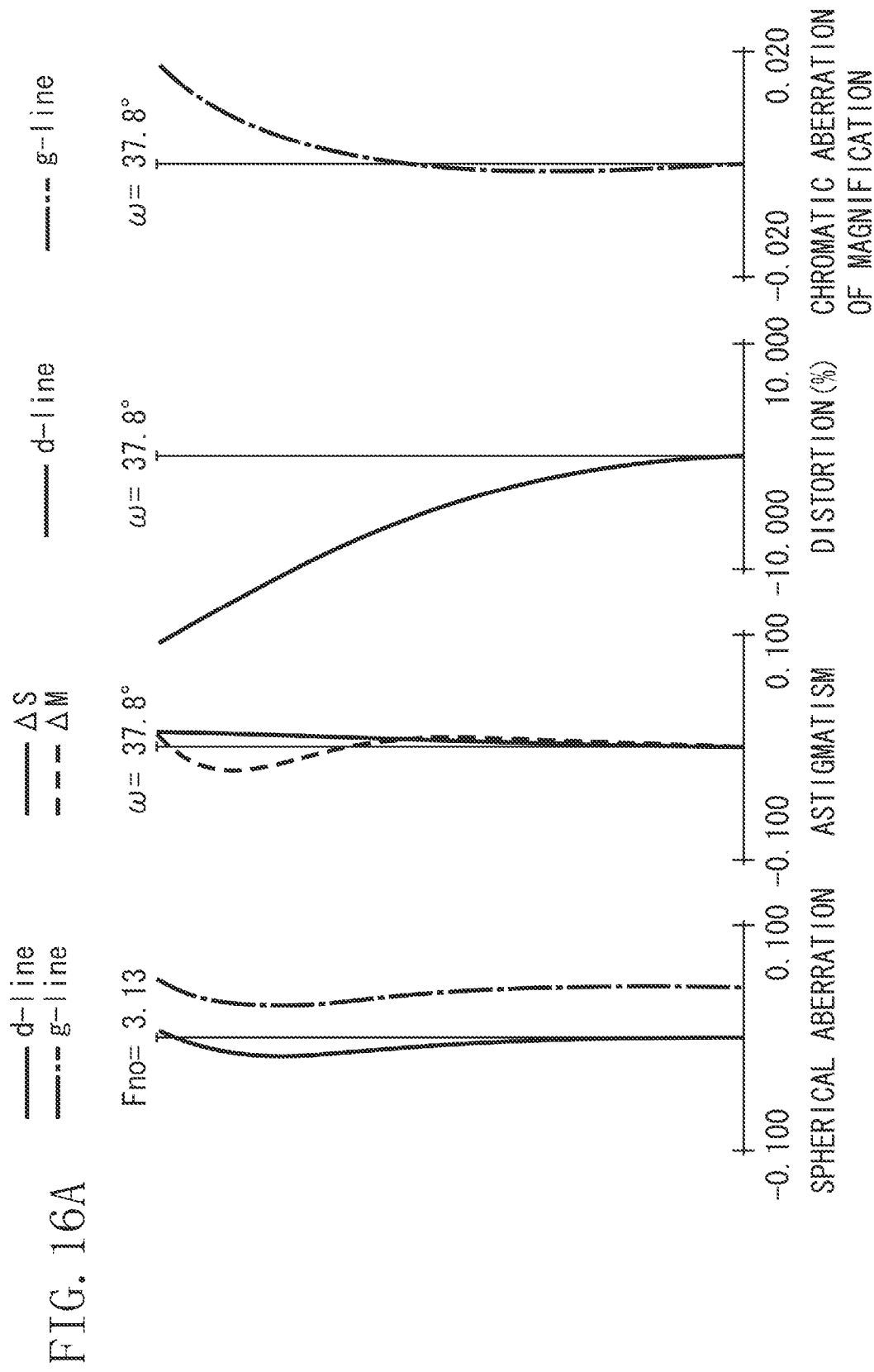

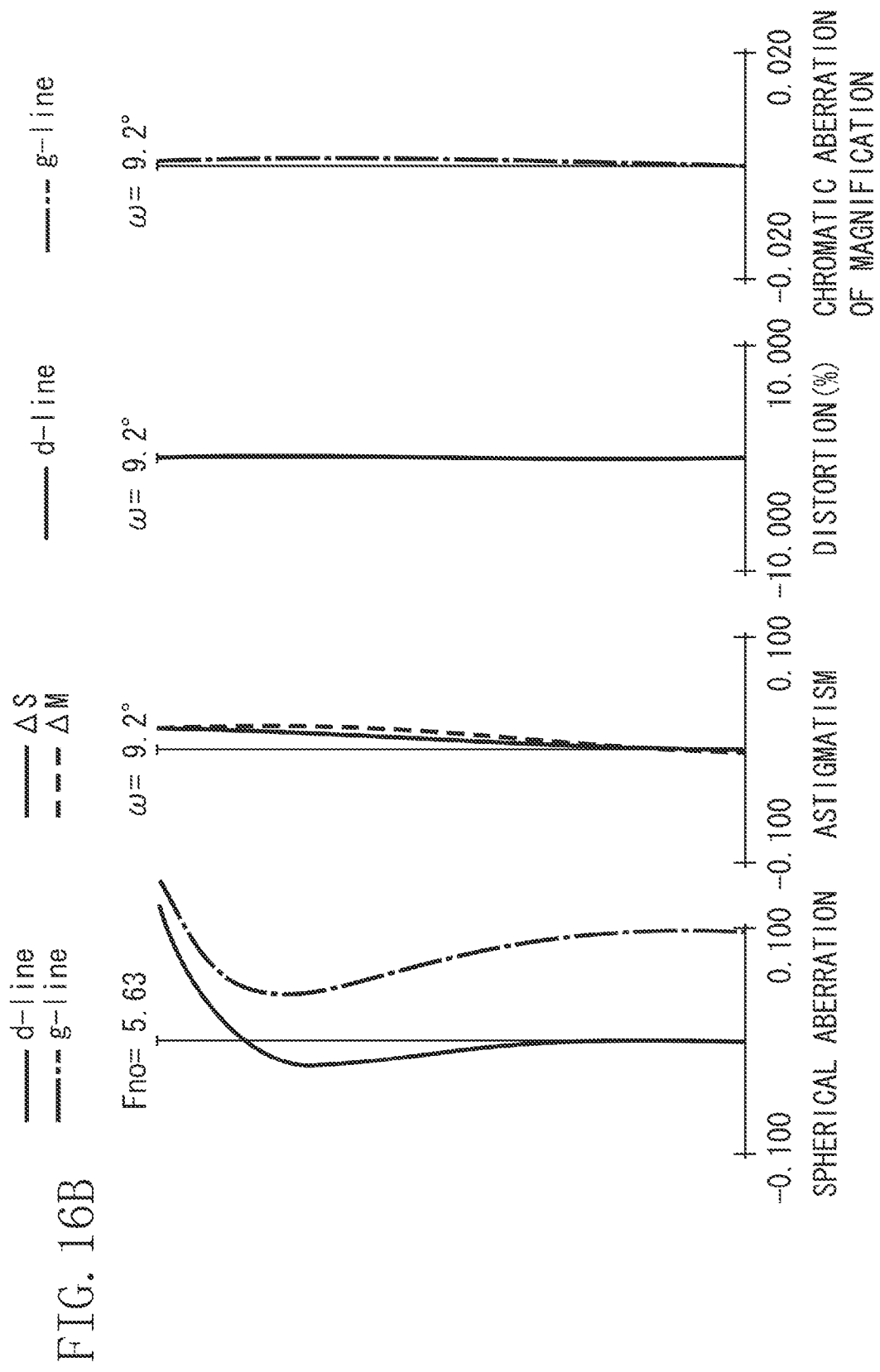

ZOOM LENS AND IMAGE PICKUP APPARATUS EQUIPPED WITH ZOOM LENS

BACKGROUND OF THE INVENTION

1. Field of the Invention

The invention relates to a zoom lens, and more particularly, to a zoom lens suitable for a photographic optical system used in an image pickup apparatus such as a video camera, a digital camera, a broadcasting camera, and a silver-halide film camera.

2. Description of the Related Art

Recently, there has been a demand for the photographic optical systems used in an image pickup apparatus to have a wide angle of view, a high zoom ratio, and a small size. In particular, a zoom lens capable of reducing the thickness of a camera has been demanded. A retractable zoom lens is known that enables the storage of a camera in a casing when it is not being used. This is achieved by reducing the distances between each lens unit from that when the zoom lens is in the photographing state, in order to obtain both miniaturization of the camera and a high zoom ratio. In addition, an optical-path-bending zoom lens is known in which an optical-path-bending reflective element, such as a reflection mirror or a reflection prism capable of bending or altering the optical axis of a portion of the photographic optical system by 90 degrees is arranged within the optical path of the zoom lens in order to reduce a thickness of the camera. Furthermore, as a combination of both types of zoom lens, a retractable optical-path-bending zoom lens in which the optical-bending-type is used when the camera is used, and the lens unit located on the object side of the reflective element is retractably stored in a space generated by moving the reflective element in an optical axis direction when the camera is not used is known.

Japanese Patent Application Laid-Open No. 2007-279541 discusses an optical-path-bending variable-magnification optical system including a first lens unit of a positive refractive power, a second lens unit of a negative refractive power, a reflection mirror, a third lens unit of a positive refractive power, and a fourth lens unit of a positive refractive power. In addition, a size of the camera is reduced by folding the reflection mirror and retracting the first and second lens units when the camera is not used.

U.S. Pat. No. 7,889,436 discusses a zoom lens including a first lens unit of a positive refractive power, a second lens unit of a negative refractive power, a reflection member, a third lens unit of a negative refractive power, a fourth lens unit of a positive refractive power, and a fifth lens unit of a positive or negative refractive power. In addition, the camera is thinned through the retreat of the reflection member to the image plane side along an optical axis and the retraction of the first and second lens units when the camera is not used.

Using the retractable optical-path-bending zoom lens, it is possible to facilitate a high zoom ratio and reduction of a thickness of the camera if it is applied to the camera. However, in order to obtain such advantages, it is important to appropriately set the lens configuration of the zoom lens and set an arrangement of the reflective element in the middle of an optical path or a location of the aperture stop.

For example, it is important to appropriately set a lens configuration such as the number of lens units, an arrangement of the refractive powers of each lens unit, or movement conditions of each lens unit during zooming, a location of the aperture stop when it is arranged within the optical path, and the like. If such a configuration is not appropriate, it is difficult to obtain the aforementioned advantages.

For example, in Examples 1, 2, and 4 in Japanese Patent Application Laid-Open No. 2007-279541, the arrangement is made such that a contribution of variable power of the lens unit on the object side is larger than that of the reflection member, and a movement amount of the first lens unit is set to be smaller than that of the second lens unit. In each of such examples, a total angle of view at the wide-angle end is set to 60 to 65 degrees. For example, in order to obtain a wide angle of view in this configuration, the movement amount of the second lens unit is larger than that of the first lens unit. Therefore, at the wide-angle end, the front lens is arranged far from the position of the stop. As a result, at the wide-angle end, the front lens effective diameter tends to increase. Meanwhile, in order to reduce the movement amount of the second lens unit, it is necessary to increase the refractive power of the second lens unit, and curvature of field tends to increase due to a wide angle of view.

In Example 3 of Japanese Patent Application Laid-Open No. 2007-279541, the second lens unit is stationary during zooming. In this configuration, in order to obtain a zoom lens having a wider angle of view and a higher zoom ratio, it is necessary to increase the movement amount of the first lens unit or increase the refractive power of the second lens unit. As a result, the number of retraction stages increases so that the lens barrel diameter tends to increase. In the retractable optical-path-bending zoom lens, it is very difficult to obtain a wide angle of view and reduce the front lens effective diameter.

SUMMARY OF THE INVENTION

Aspects of the present invention are directed to embodiments of a zoom lens capable of easily obtaining an excellent image with a high zoom ratio and a wide angle view and reducing a thickness of a camera when it is applied to the camera and an image pickup apparatus equipped with the zoom lens.

According to an aspect of the present invention, a zoom lens includes, in order from an object side to an image side, a first lens unit of a positive refractive power, a second lens unit of a negative refractive power, a reflective element, and a rear lens group including at least two lens units and an aperture stop, in which the first lens unit, the second lens unit, and two or more lens units of the rear lens group are arranged to move and the reflective element is arranged to be stationary during zooming, wherein the zoom lens satisfies the following conditions:

$$1.4 < M1/M2 < 20.0$$

$$0.20 < (M2+Ms)/LSw < 0.44, \text{ and}$$

$$0.20 < (\beta 2t/\beta 2w)/(ft/fw) < 0.44,$$

where M1 denotes the distance moved by the first lens unit, M2 denotes the distance moved by the second lens units and Ms denotes the distance moved by the aperture stop; during zooming from the wide-angle end to the telephoto end, LSw denotes the distance from the aperture stop to the lens surface in the first lens unit which is furthest from the aperture stop at the wide-angle end, $\beta 2w$ and $\beta 2t$ denote lateral magnifications of the second lens unit at the wide-angle end and the telephoto end, respectively, and fw and ft denote the focal lengths of the entire zoom lens at the wide-angle end and the telephoto end, respectively.

Further features and aspects of the present invention will become apparent from the following detailed description of embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

FIGS. 2A, 2B, and 2C are aberration charts of the zoom lens according to the first embodiment of the invention at the wide-angle end, the middle zoom position, and the telephoto end, respectively.

FIGS. 4A, 4B, and 4C are aberration charts of the zoom lens according to the second embodiment of the invention at the wide-angle end, the middle zoom position, and the telephoto end, respectively.

FIGS. 6A, 6B, and 6C are aberration charts of the zoom lens according to the third embodiment of the invention at the wide-angle end, the middle zoom position, and the telephoto end, respectively.

FIGS. 8A, 8B, and 8C are aberration charts of the zoom lens according to the fourth embodiment of the invention at the wide-angle end, the middle zoom position, and the telephoto end, respectively.

FIGS. 10A, 10B, and 10C are aberration charts of the zoom lens according to the fifth embodiment of the invention at the wide-angle end, the middle zoom position, and the telephoto end, respectively.

FIGS. 12A, 12B, and 12C are aberration charts of the zoom lens according to the sixth embodiment of the invention at the wide-angle end, the middle zoom position, and the telephoto end, respectively.

FIGS. 14A, 14B, and 14C are aberration charts of the zoom lens according to the seventh embodiment of the invention at the wide-angle end, the middle zoom position, and the telephoto end, respectively.

FIGS. 16A, 16B, and 16C are aberration charts of the zoom lens according to the eighth embodiment of the invention at the wide-angle end, the middle zoom position, and the telephoto end, respectively.

DESCRIPTION OF THE EMBODIMENTS

Various embodiments, features, and aspects of the invention will be described in detail below with reference to the drawings. Each of the embodiments of the present invention described below can be implemented solely or as a combination of a plurality of the embodiments or features thereof where necessary or where the combination of elements or features from individual embodiments in a single embodiment is beneficial.

A zoom lens according to an embodiment of the invention includes a first lens unit of a positive refractive power and a second lens unit of a negative refractive power in order from an object side to an image side. In addition, the zoom lens according to an embodiment of the invention includes an optical-path-bending refractive element including a reflection mirror or a reflection prism for bending an optical axis within 90° or 90°±10°, and a rear lens group including two or more lens units and an aperture stop. During zooming, the first lens unit, the second lens unit, and two or more lens units of the rear lens group are moved. During zooming, the reflective element is stationary.

In the retractably-stored state, the reflective element is moved to a position different from that in the photographing state. In addition, a portion of the zoom lens, for example, the first lens unit and the second lens unit are moved to a space generated by movement of the reflective element, and at least a part of them are retractably stored therein. Clearly an alternative portion of the zoom lens, such as just the first lens unit (L1) can be extended out of a body of an image pick up apparatus when image capture is activated (photographing state) and retracted into the body of the image pick up apparatus when image capture is not actuated.

Figure 1:
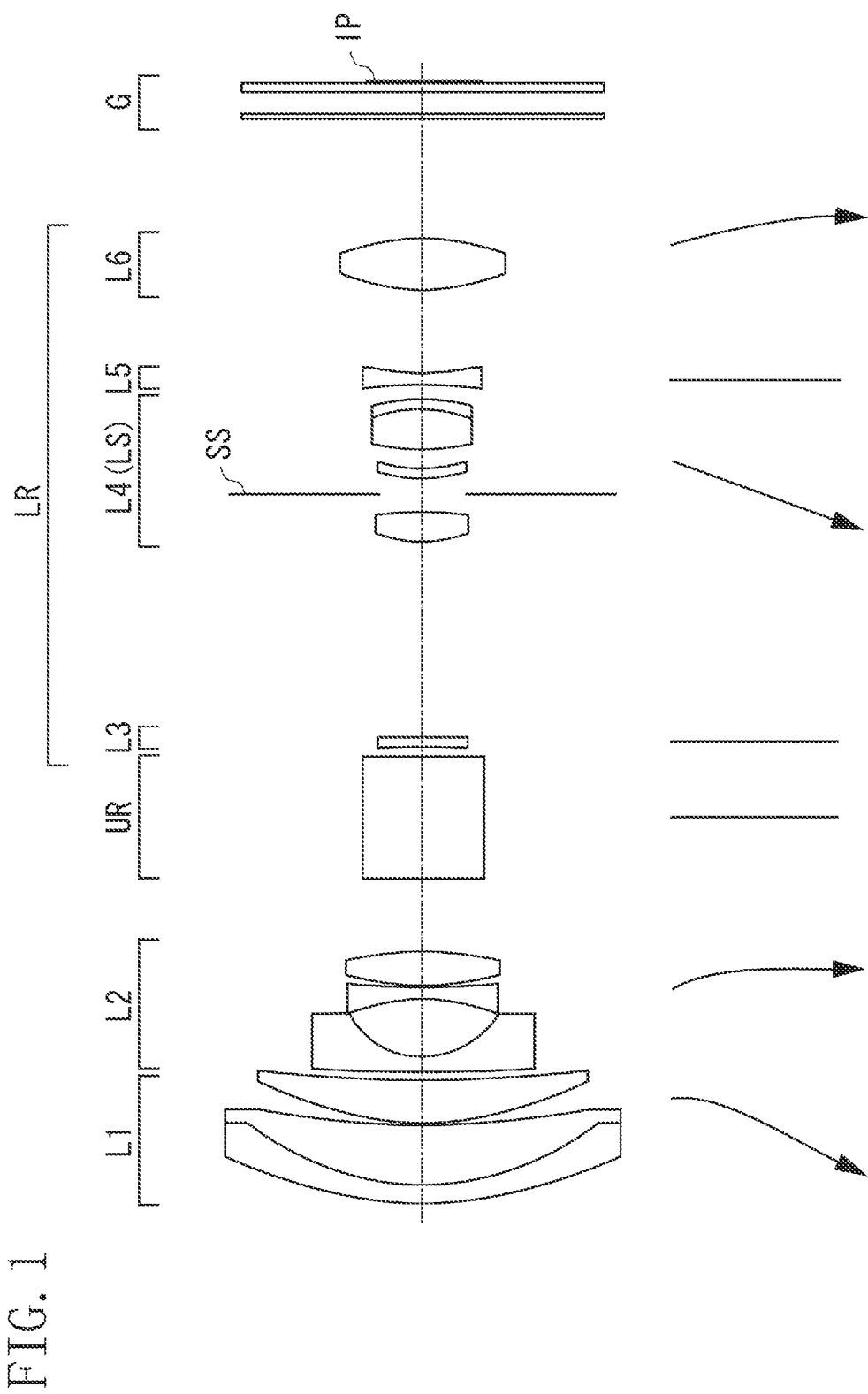
FIG. 1 is a lens cross-sectional view illustrating a zoom lens according to a first embodiment of the invention at the wide-angle end.
Figure 2B:
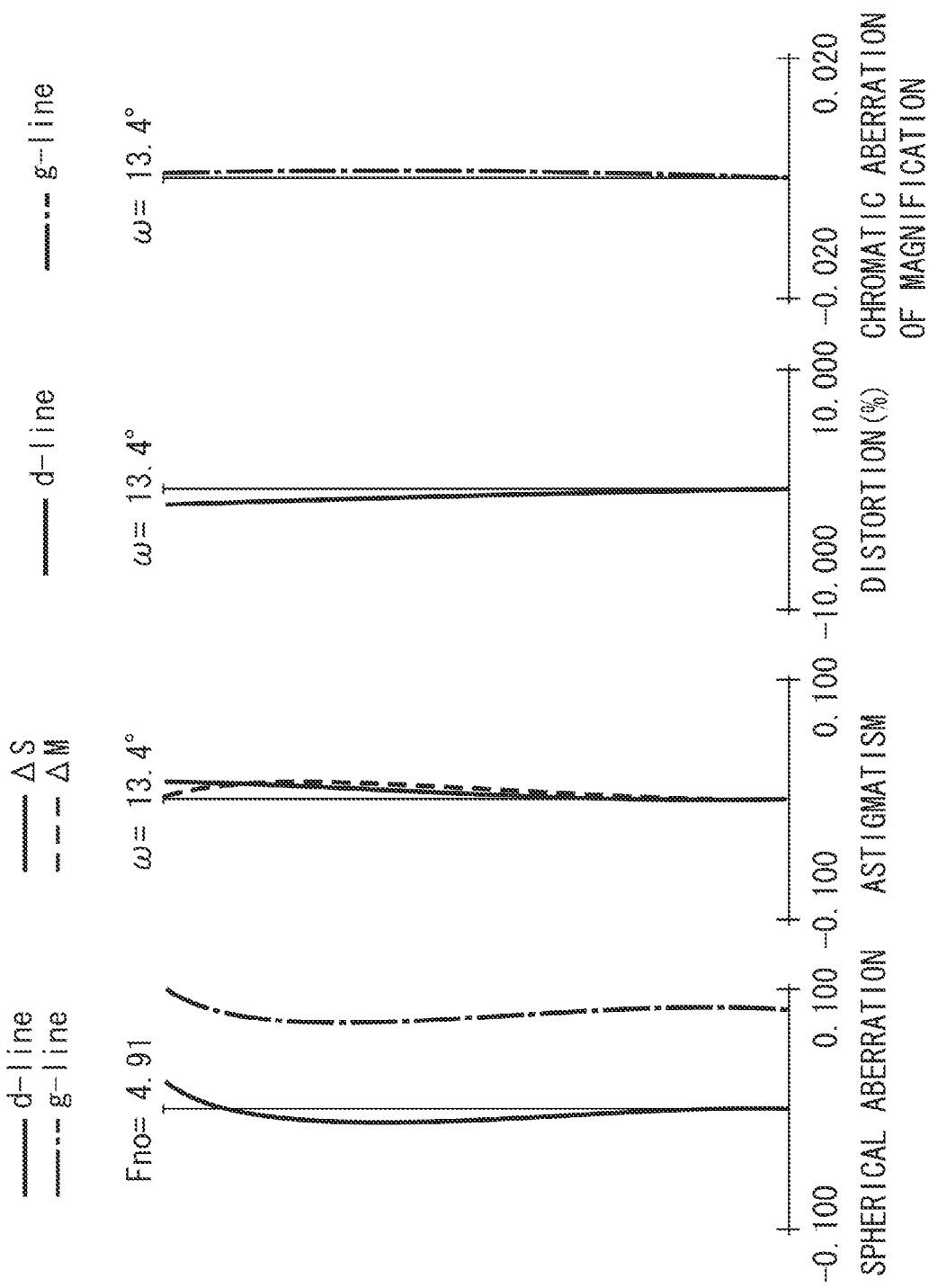
Figure 2C:
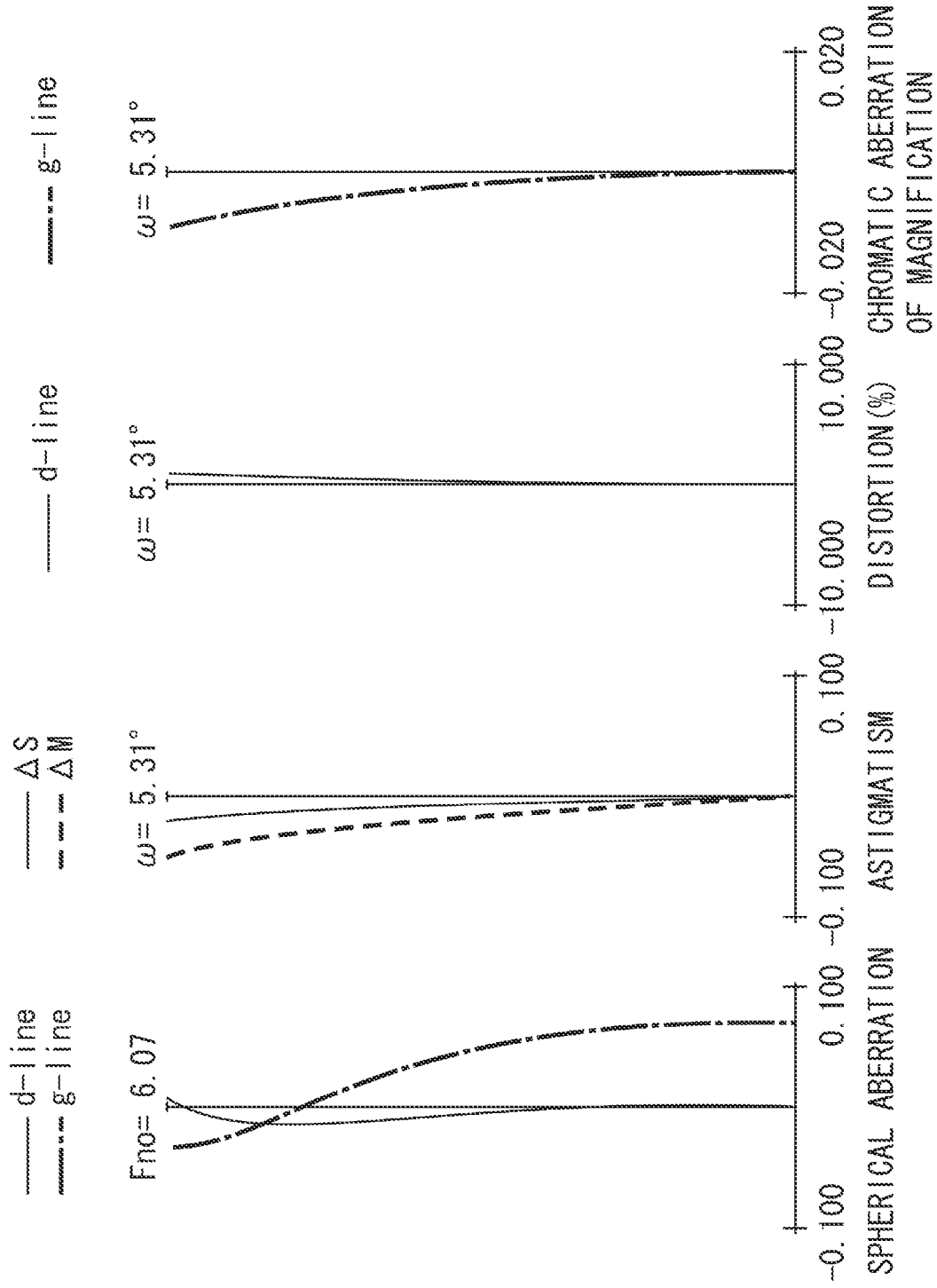

FIG. 1 is a lens cross-sectional view illustrating a zoom lens according to the first embodiment of the invention when an optical path is expanded at the wide-angle end (short focal length end). FIGS. 2A, 2B, and 2C are aberration charts of the zoom lens according to the first embodiment of the invention at the wide-angle end, the middle zoom position, and the telephoto end (long focal length end), respectively.

Figure 3:
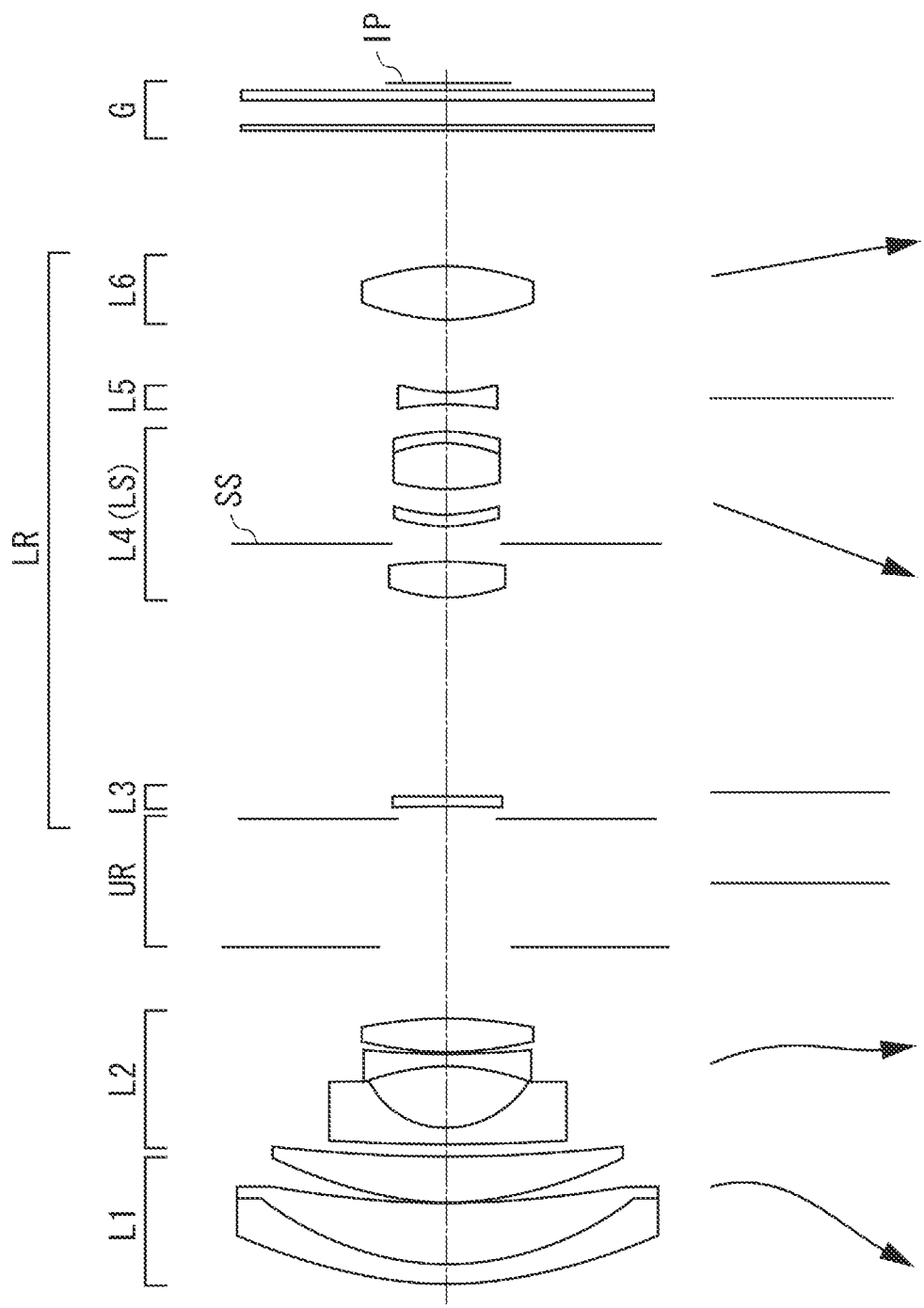
FIG. 3 is a lens cross-sectional view illustrating the zoom lens according to a second embodiment of the invention at the wide-angle end.
Figure 4A:
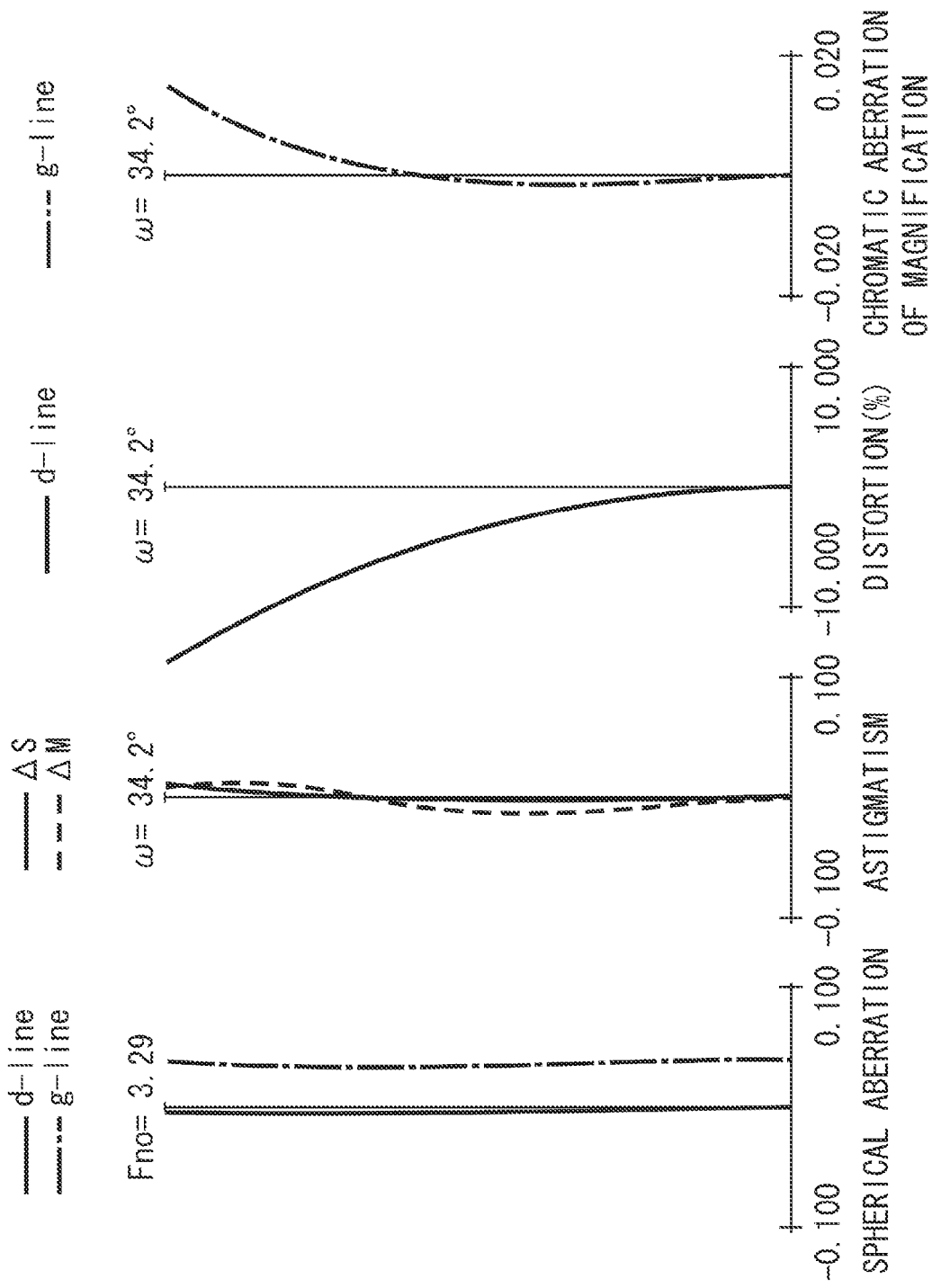

FIG. 3 is a lens cross-sectional view illustrating the zoom lens according to the second embodiment of the invention when the optical path is expanded at the wide-angle end. FIGS. 4A, 4B, and 4C are aberration charts of the zoom lens according to the second embodiment of the invention at the wide-angle end, the middle zoom position, and the telephoto end, respectively.

Figure 5:
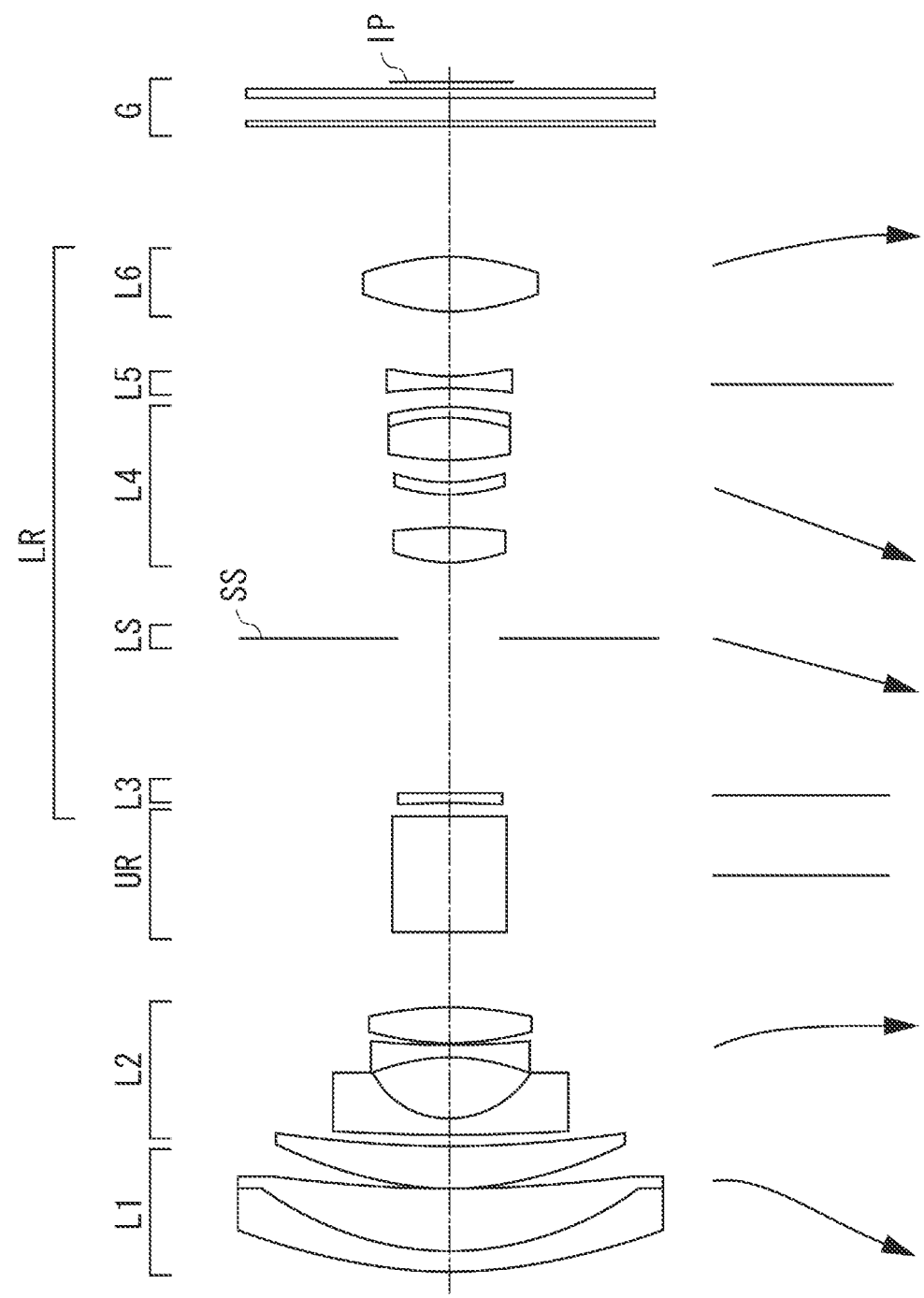
FIG. 5 is a lens cross-sectional view illustrating the zoom lens according to third embodiment of the invention at the wide-angle end.
Figure 6B:
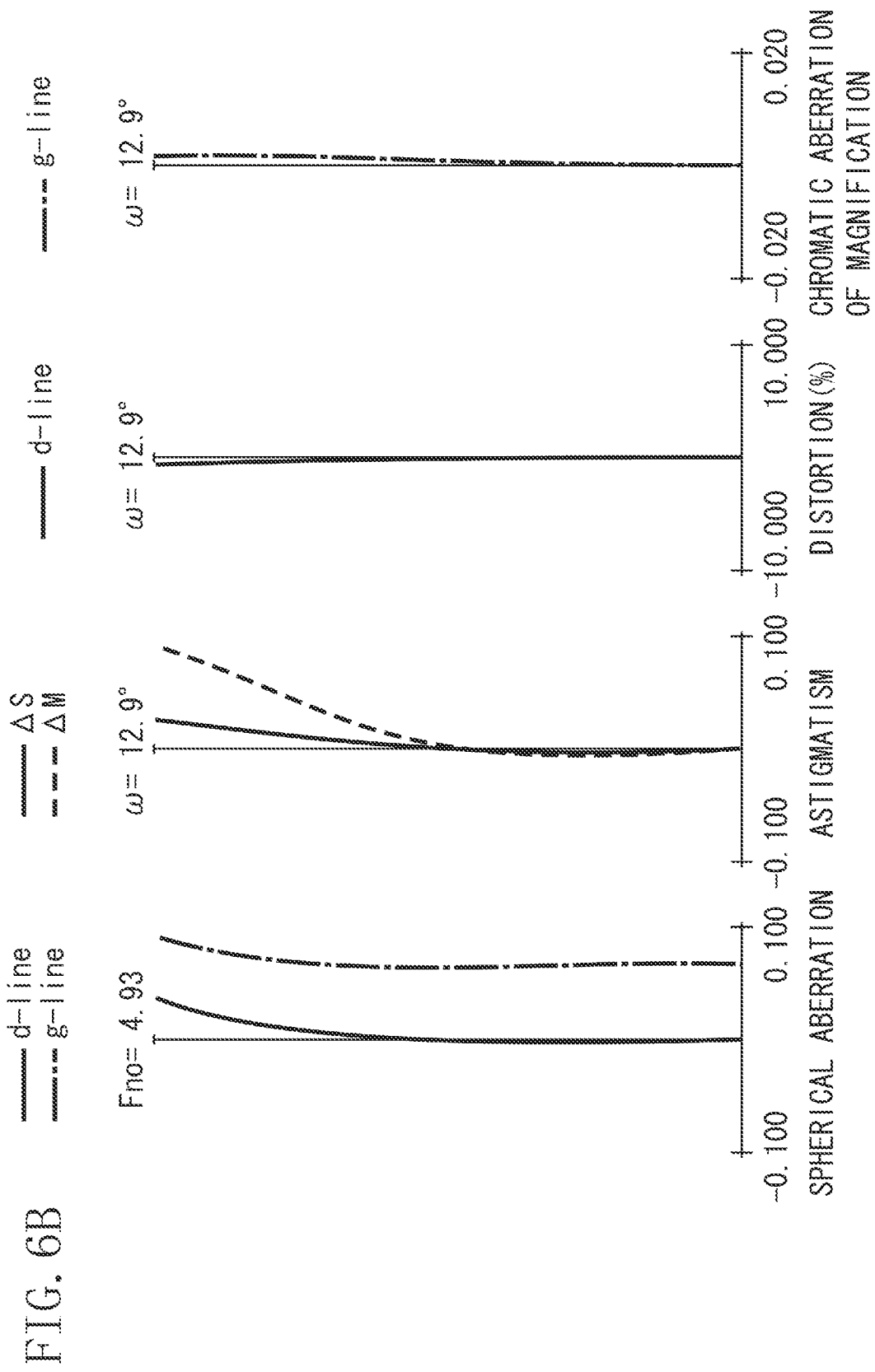
Figure 6C:
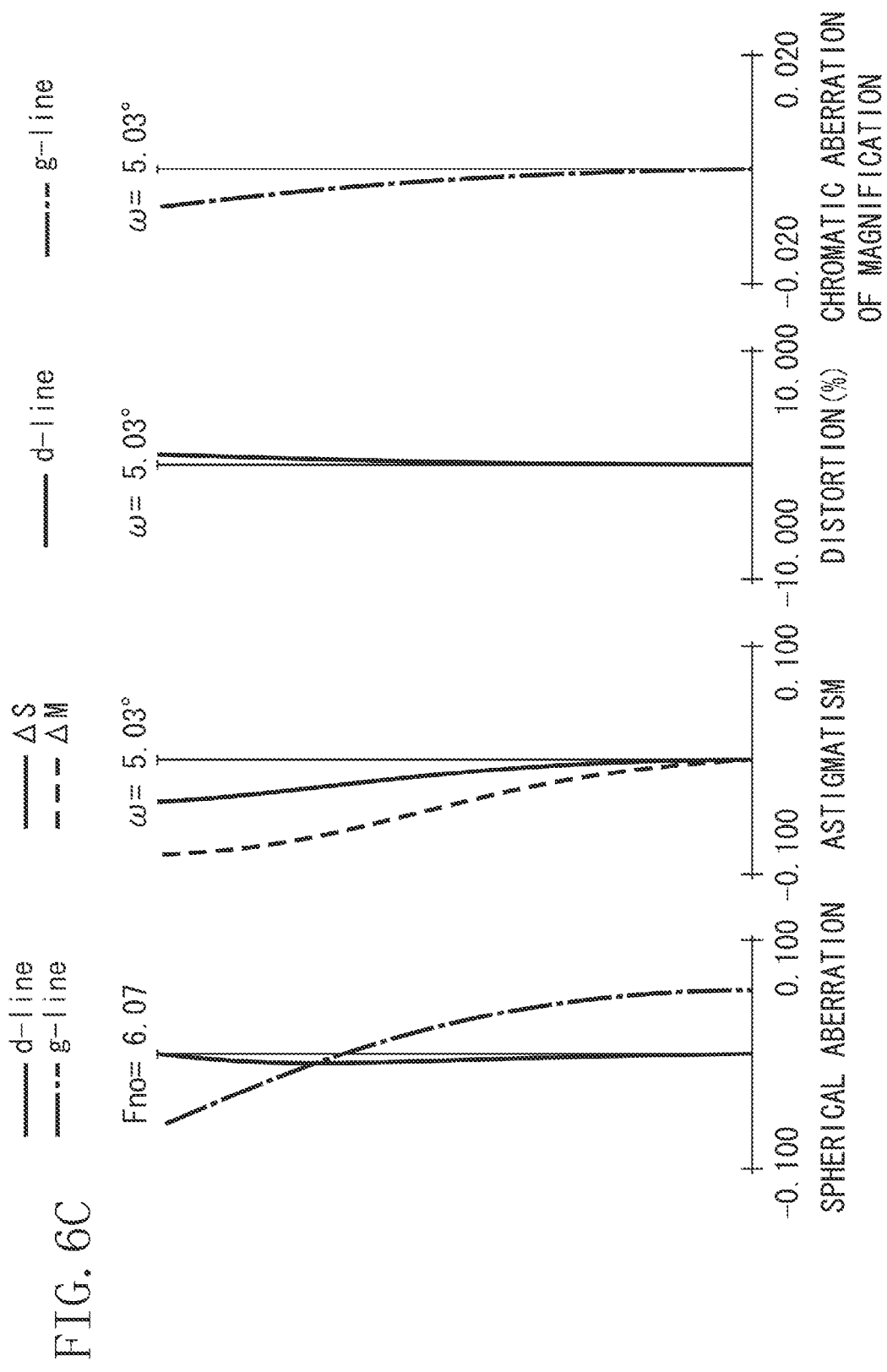

FIG. 5 is a lens cross-sectional view illustrating the zoom lens according to the third embodiment of the invention when the optical path is expanded at the wide-angle end. FIGS. 6A, 6B, and 6C are aberration charts of the zoom lens according to the third embodiment of the invention at the wide-angle end, the middle zoom position, and the telephoto end, respectively.

Figure 7:
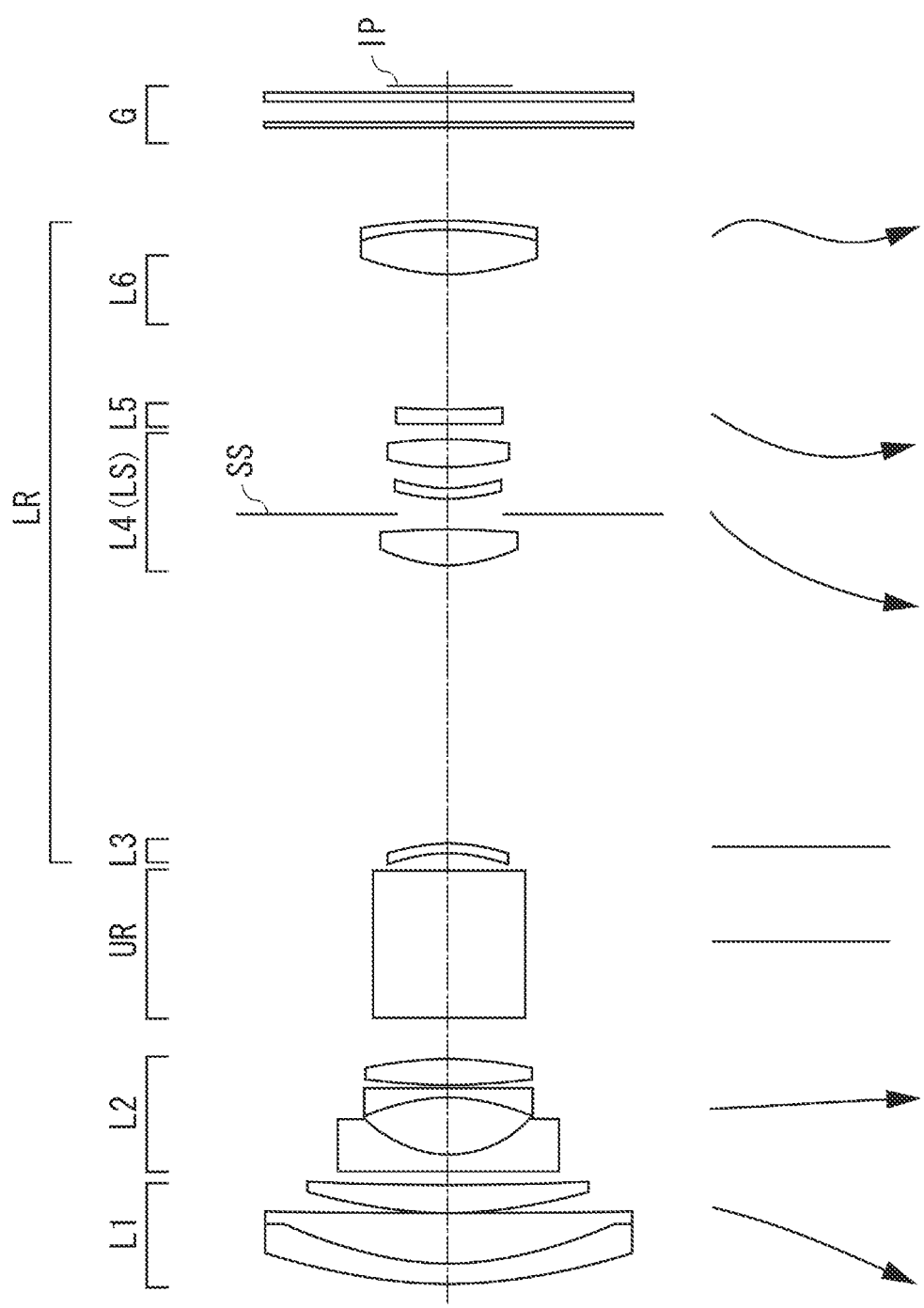
FIG. 7 is a lens cross-sectional view illustrating the zoom lens according to a fourth embodiment of the invention at the wide-angle end.
Figure 8B:
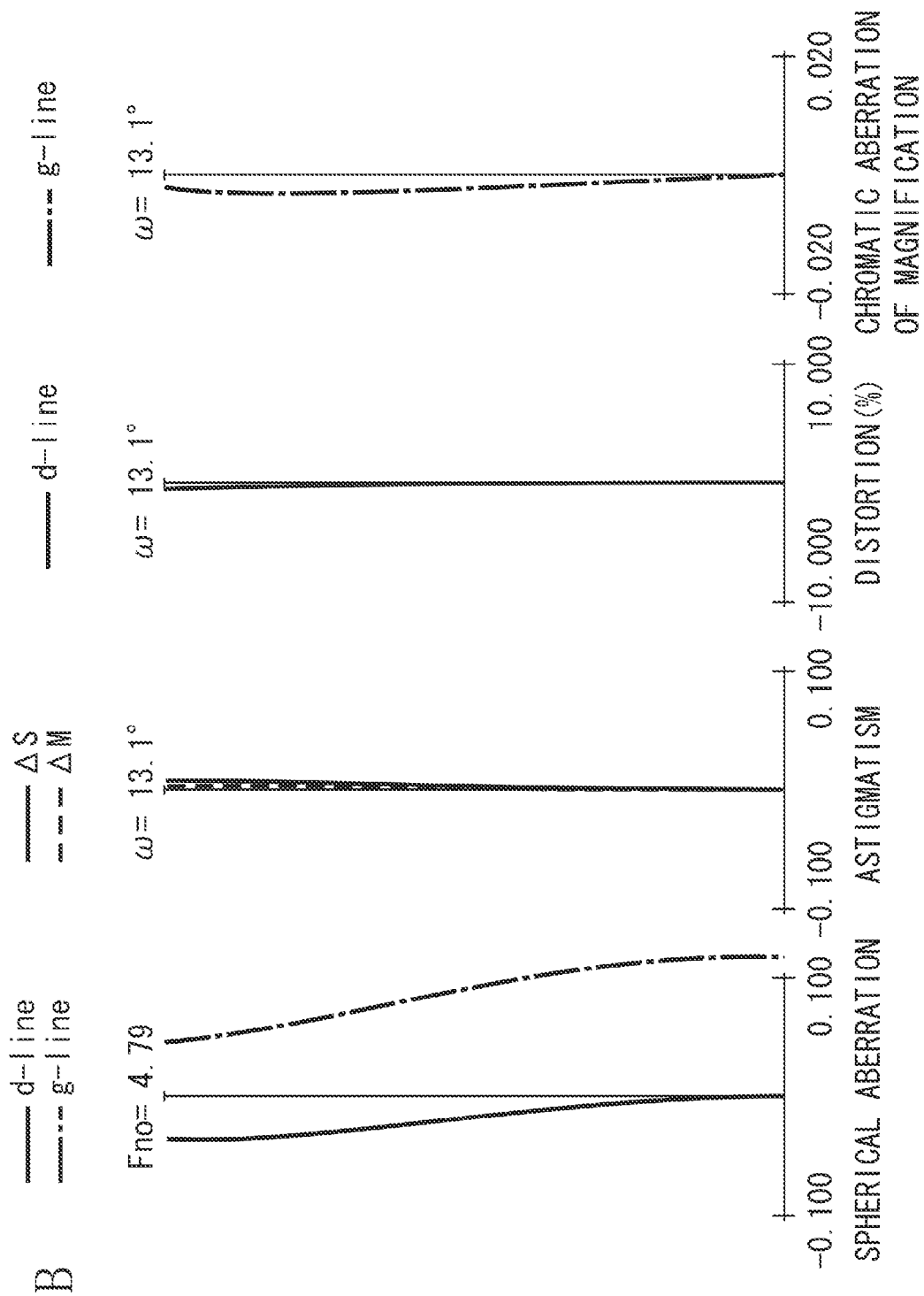

FIG. 7 is a lens cross-sectional view illustrating the zoom lens according to the fourth embodiment of the invention when the optical path is expanded at the wide-angle end. FIGS. 8A, 8B, and 8C are aberration charts of the zoom lens according to the fourth embodiment of the invention at the wide-angle end, the middle zoom position, and the telephoto end, respectively.

Figure 9:
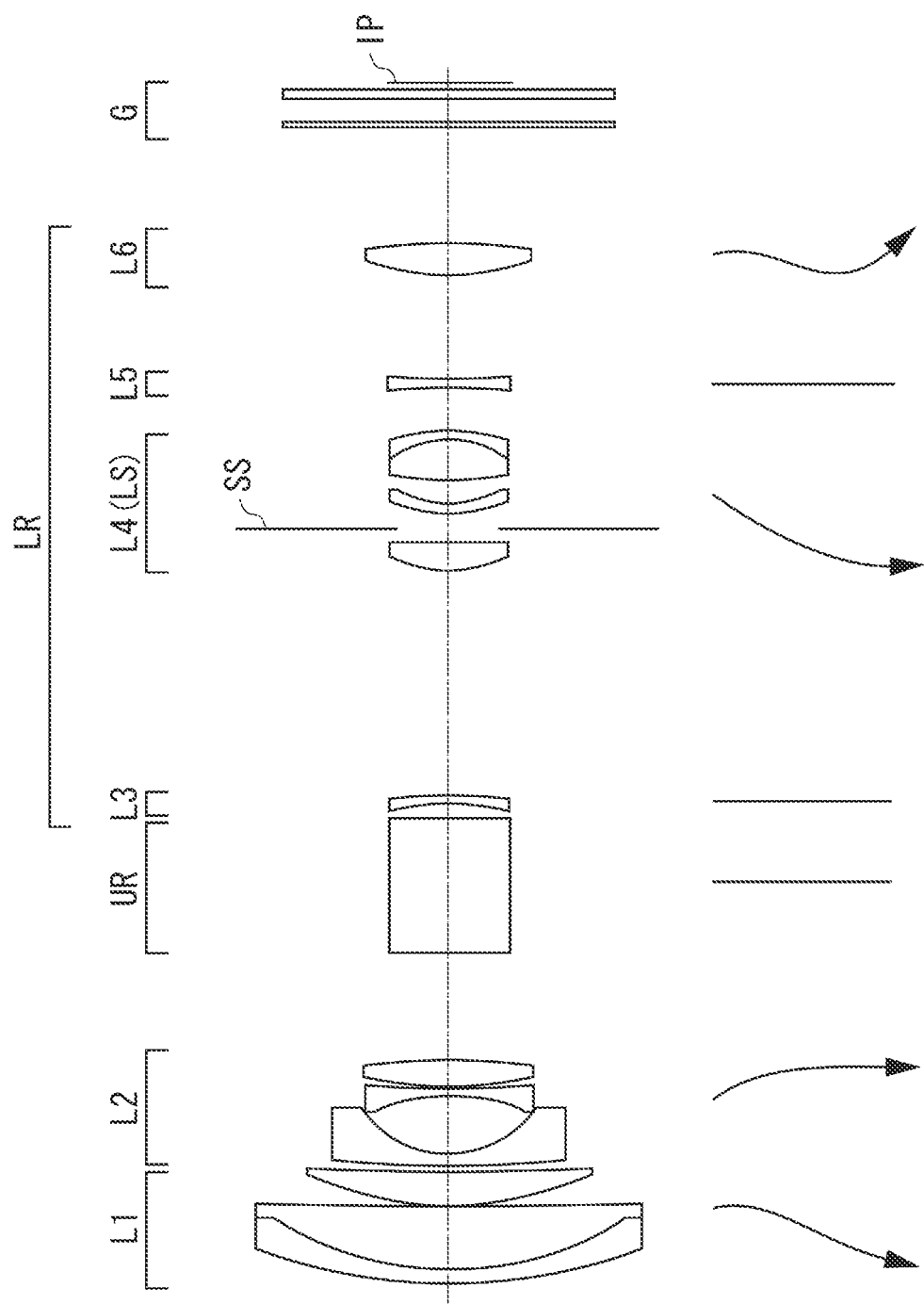
FIG. 9 is a lens cross-sectional view illustrating the zoom lens according to a fifth embodiment of the invention at the wide-angle end.
Figure 10A:
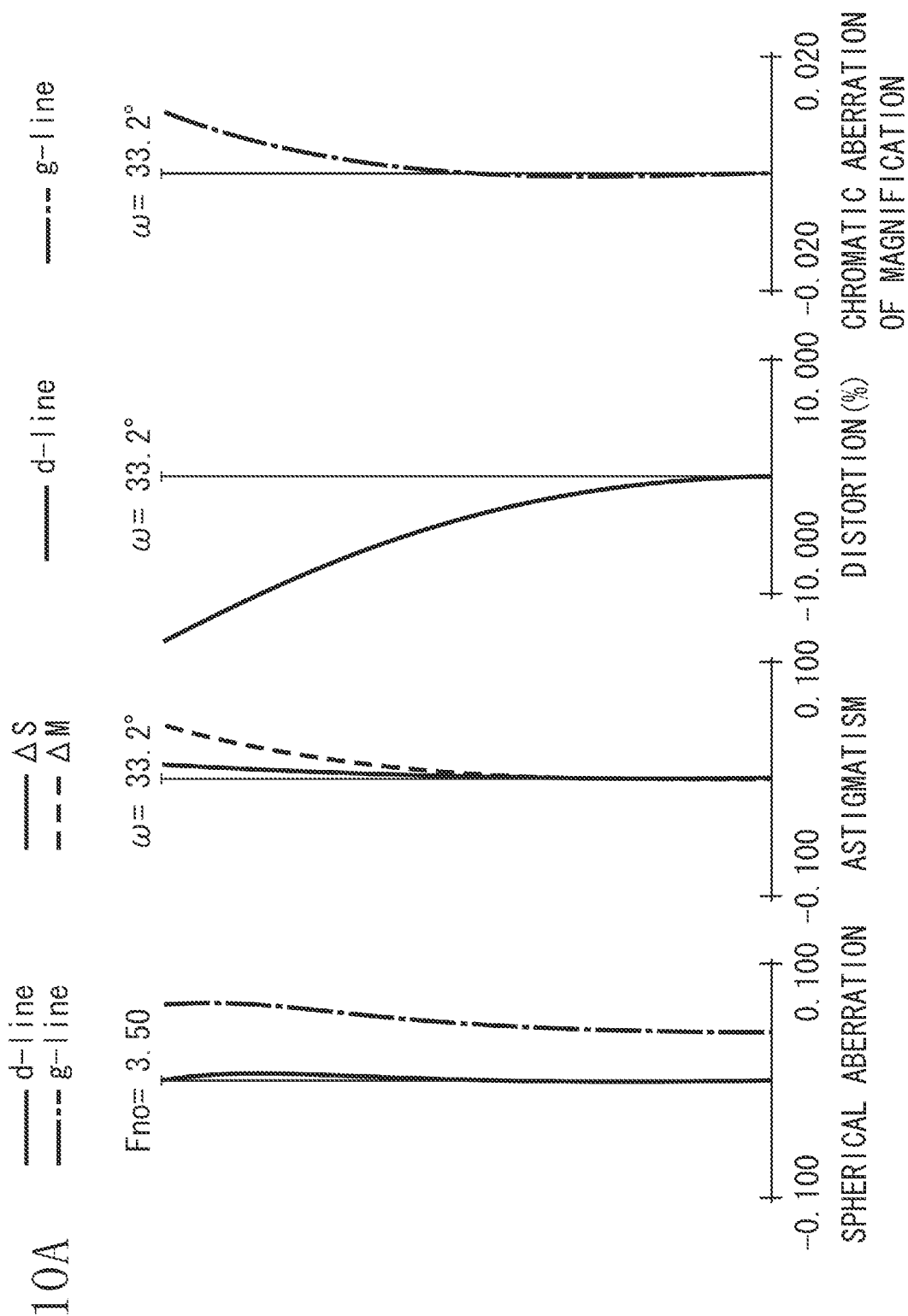

FIG. 9 is a lens cross-sectional view illustrating the zoom lens according to the fifth embodiment of the invention when the optical path is expanded at the wide-angle end. FIGS. 10A, 10B, and 10C are aberration charts of the zoom lens according to the fifth embodiment of the invention at the wide-angle end, the middle zoom position, and the telephoto end, respectively.

Figure 11:
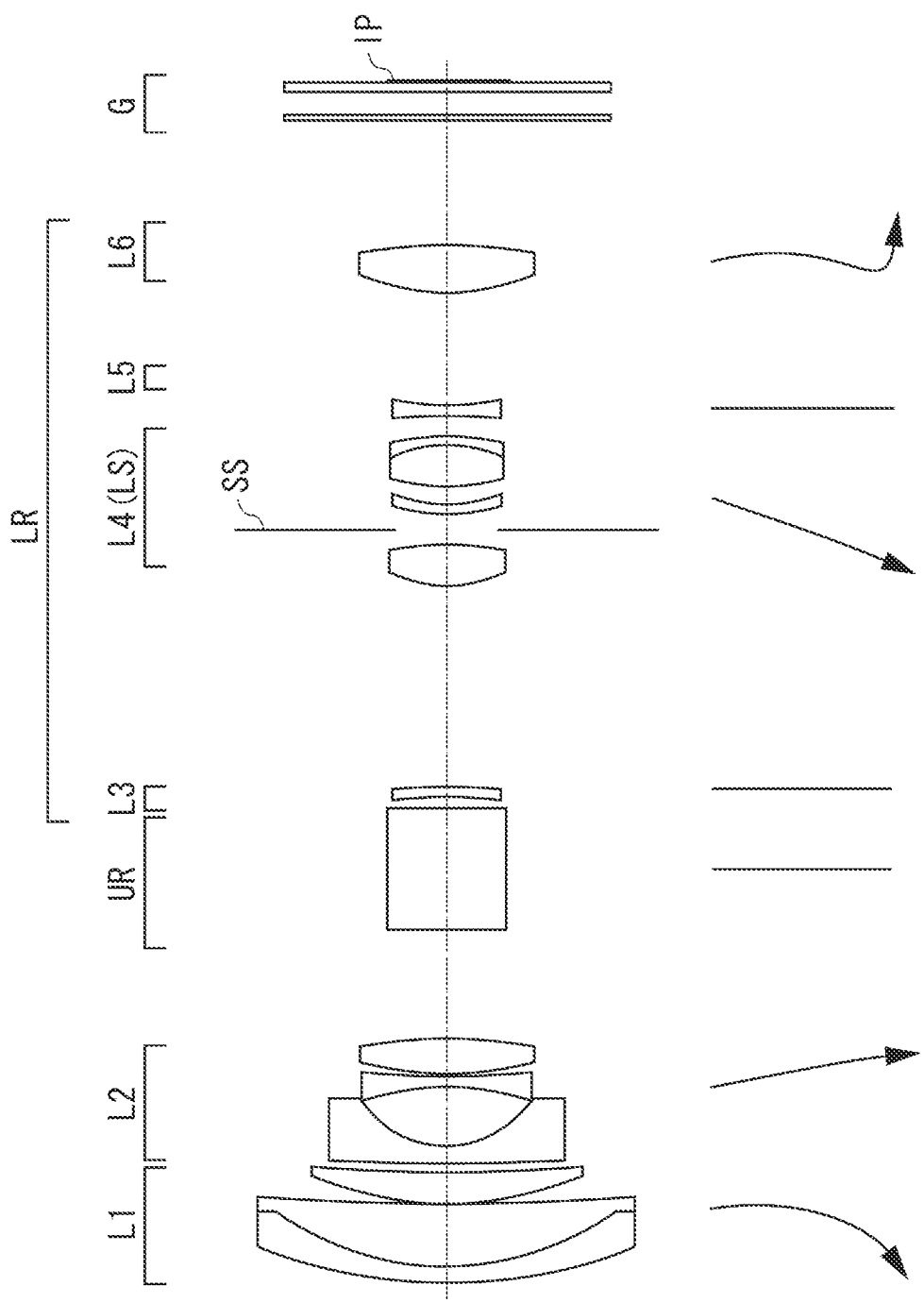
FIG. 11 is a lens cross-sectional view illustrating the zoom lens according to a sixth embodiment of the invention at the wide-angle end.
Figure 12B:
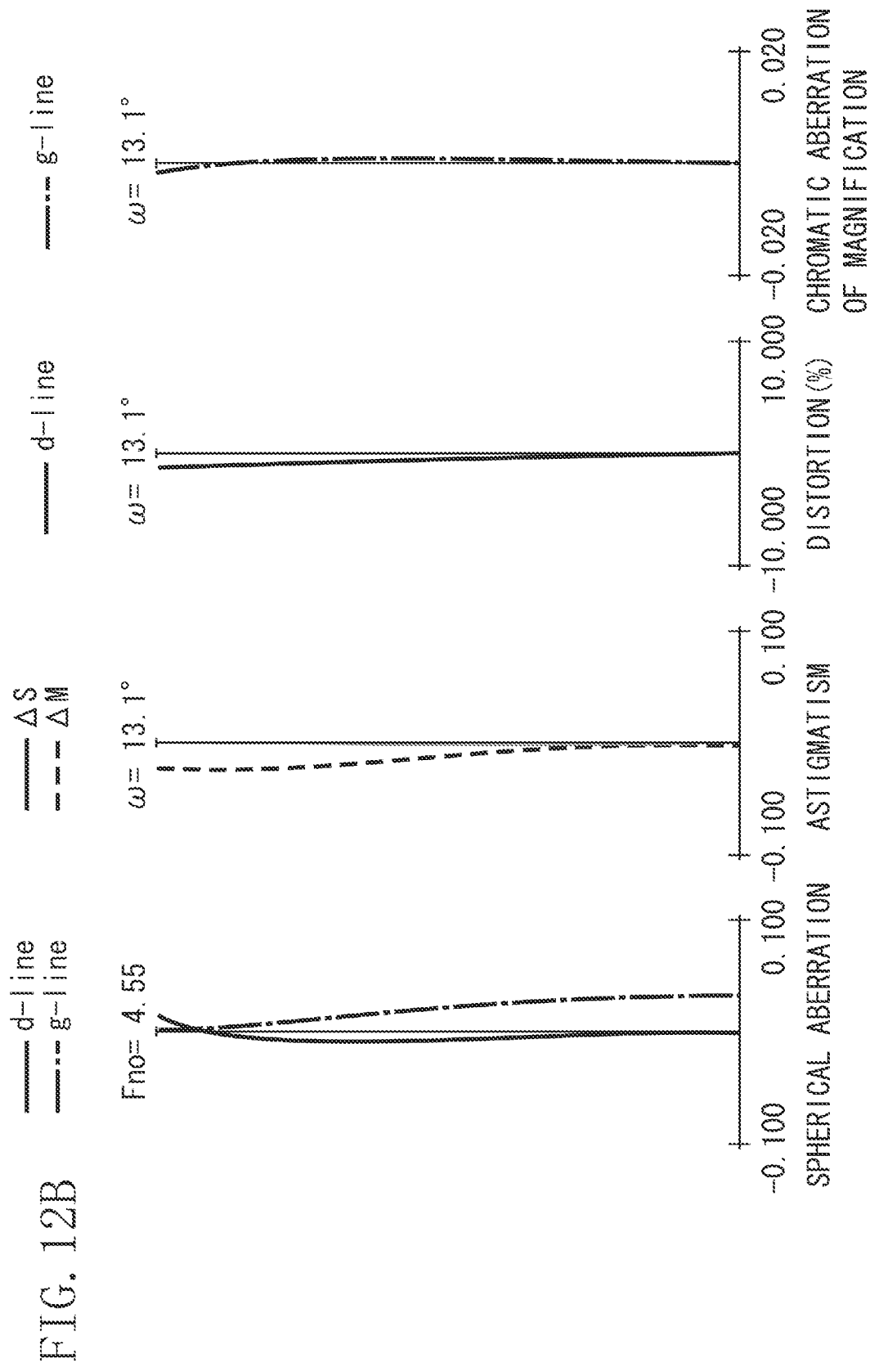

FIG. 11 is a lens cross-sectional view illustrating the zoom lens according to the sixth embodiment of the invention when the optical path is expanded at the wide-angle end. FIGS. 12A, 12B, and 12C are aberration charts of the zoom lens according to the sixth embodiment of the invention at the wide-angle end, the middle zoom position, and the telephoto end, respectively.

Figure 13:
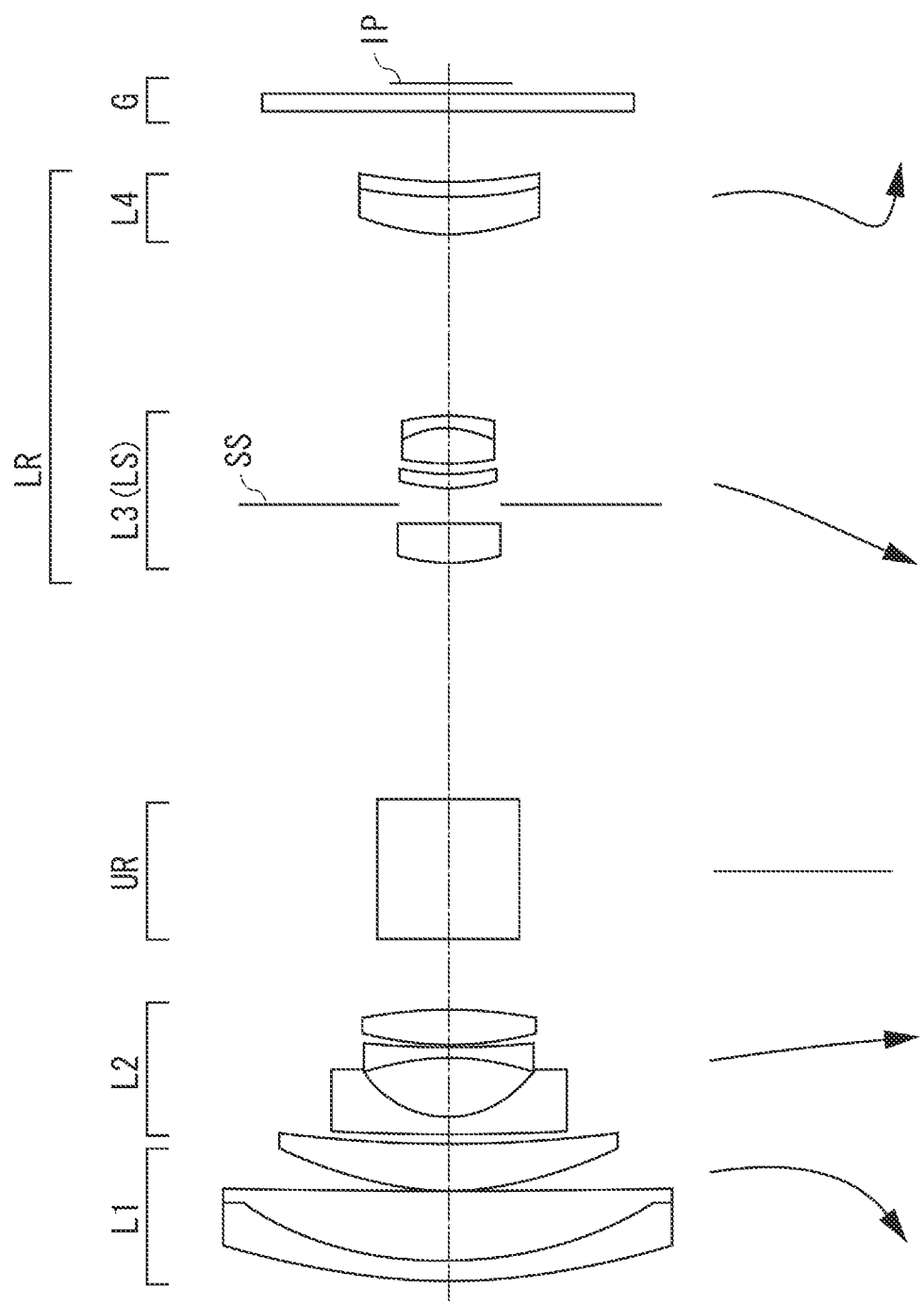
FIG. 13 is a lens cross-sectional view illustrating the zoom lens according to a seventh embodiment of the invention at the wide-angle end.

FIG. 13 is a lens cross-sectional view illustrating the zoom lens according to the seventh embodiment of the invention when the optical path is expanded at the wide-angle end. FIGS. 14A, 14B, and 14C are aberration charts of the zoom lens according to the seventh embodiment of the invention at the wide-angle end, the middle zoom position, and the telephoto end, respectively.

Figure 15:
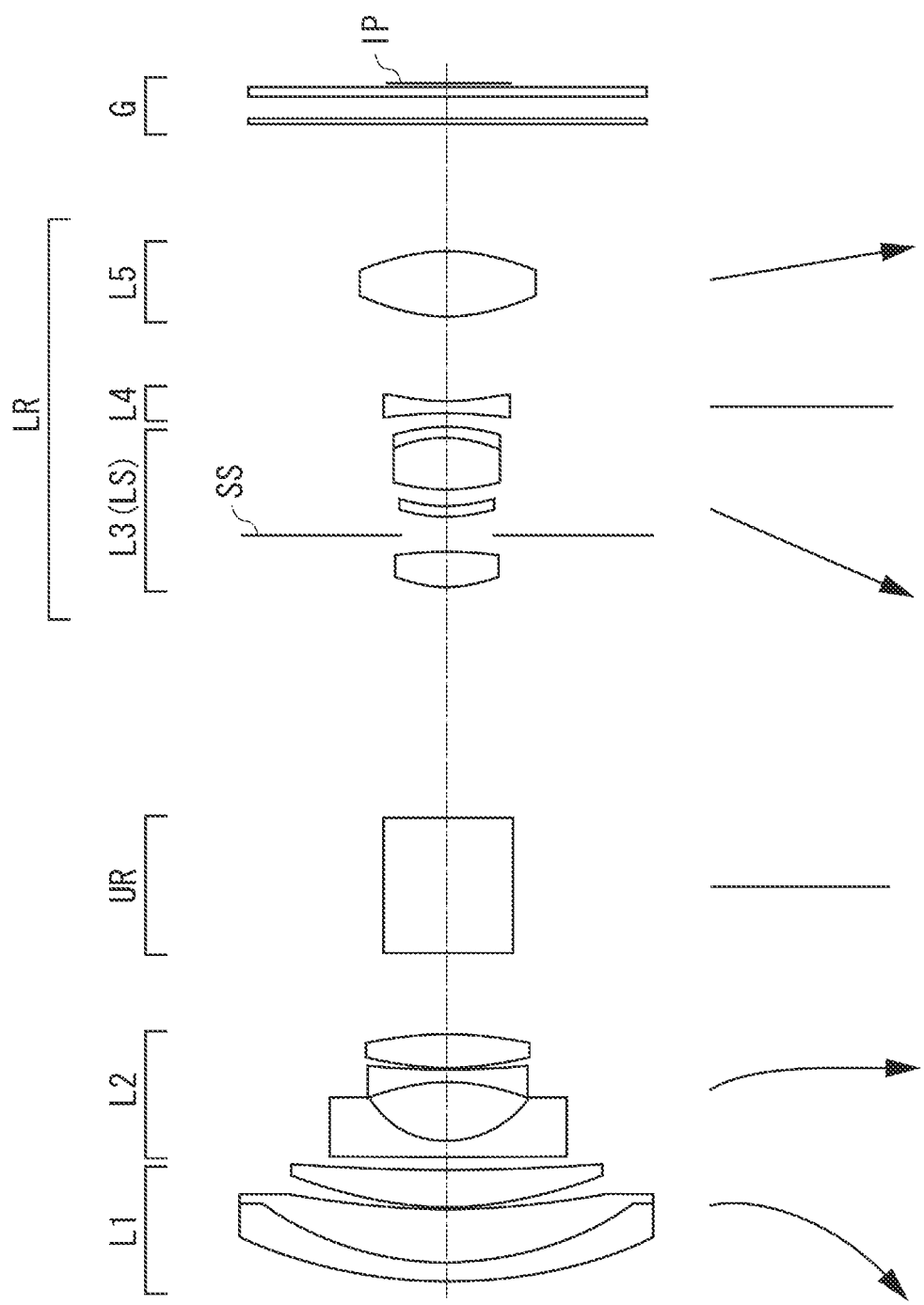
FIG. 15 is a lens cross-sectional view illustrating the zoom lens according to an eighth embodiment of the invention at the wide-angle end.
Figure 16C:
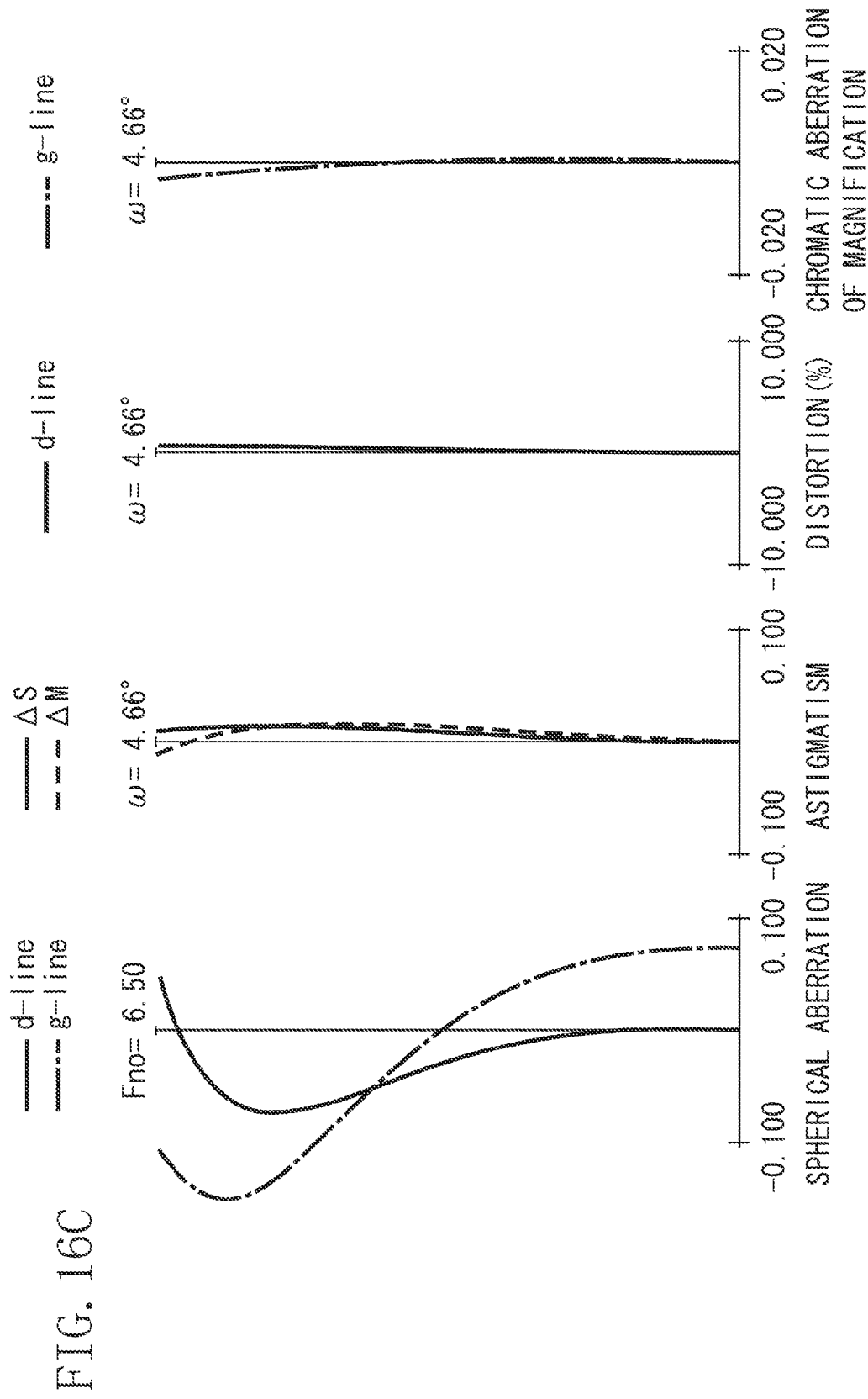

FIG. 15 is a lens cross-sectional view illustrating the zoom lens according to the eighth embodiment of the invention when the optical path is expanded at the wide-angle end. FIGS. 16A, 16B, and 16C are aberration charts of the zoom lens according to the eighth embodiment of the invention at the wide-angle end, the middle zoom position, and the telephoto end, respectively.

Figure 17A:
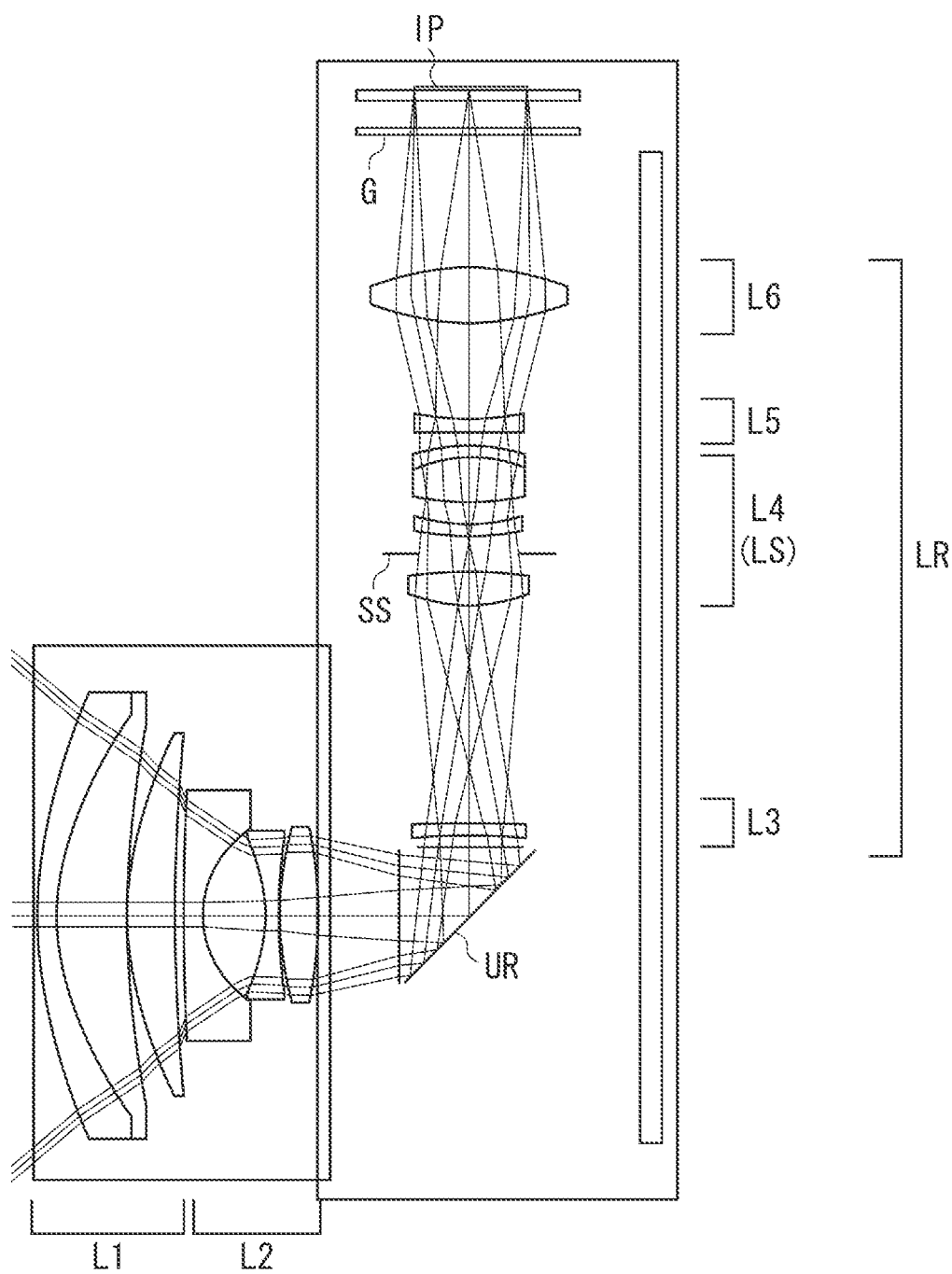
FIGS. 17A and 17B are schematic configuration diagrams illustrating an image pickup apparatus using the zoom lens according to an embodiment of the invention.
Figure 17B:
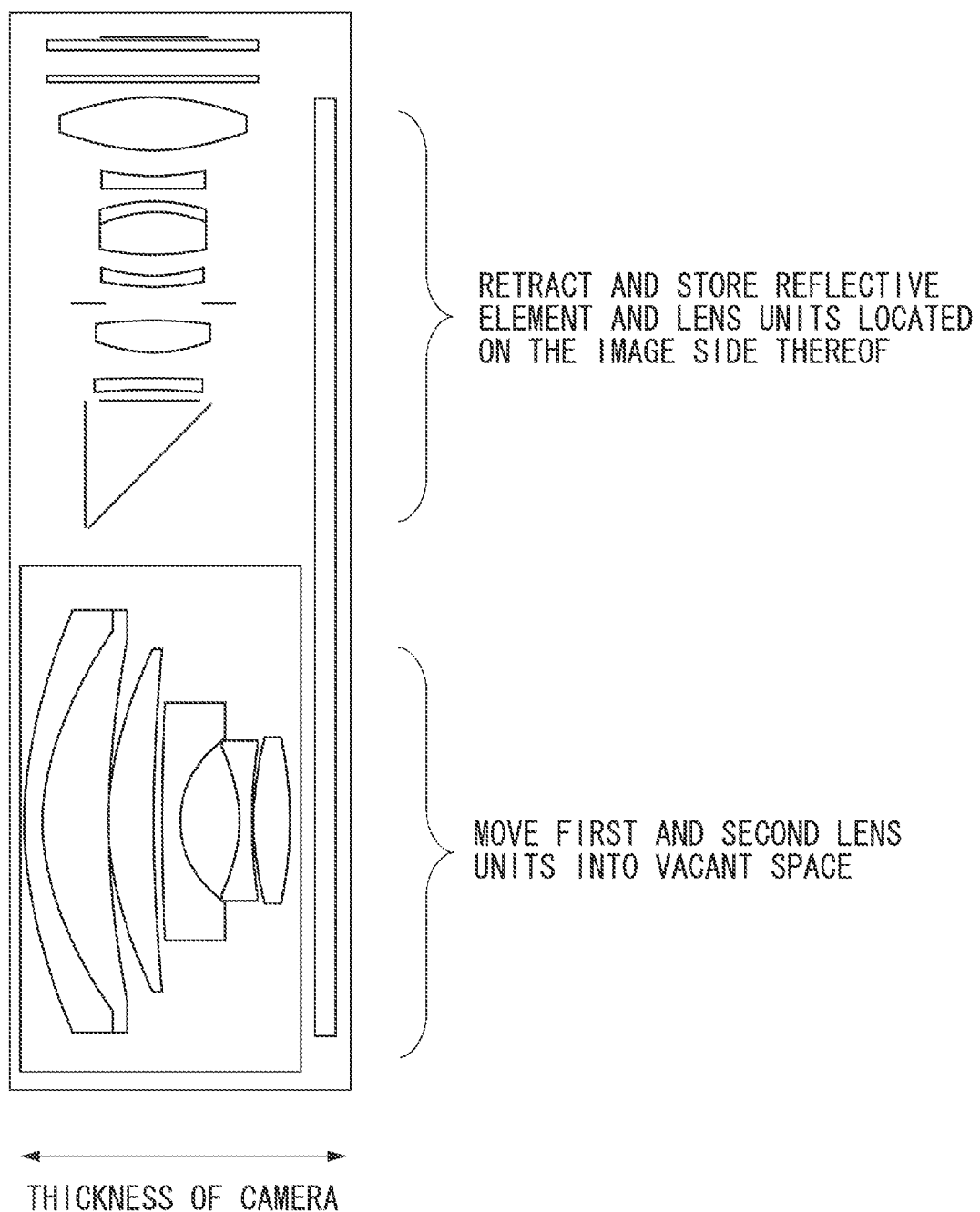
Figure 18:
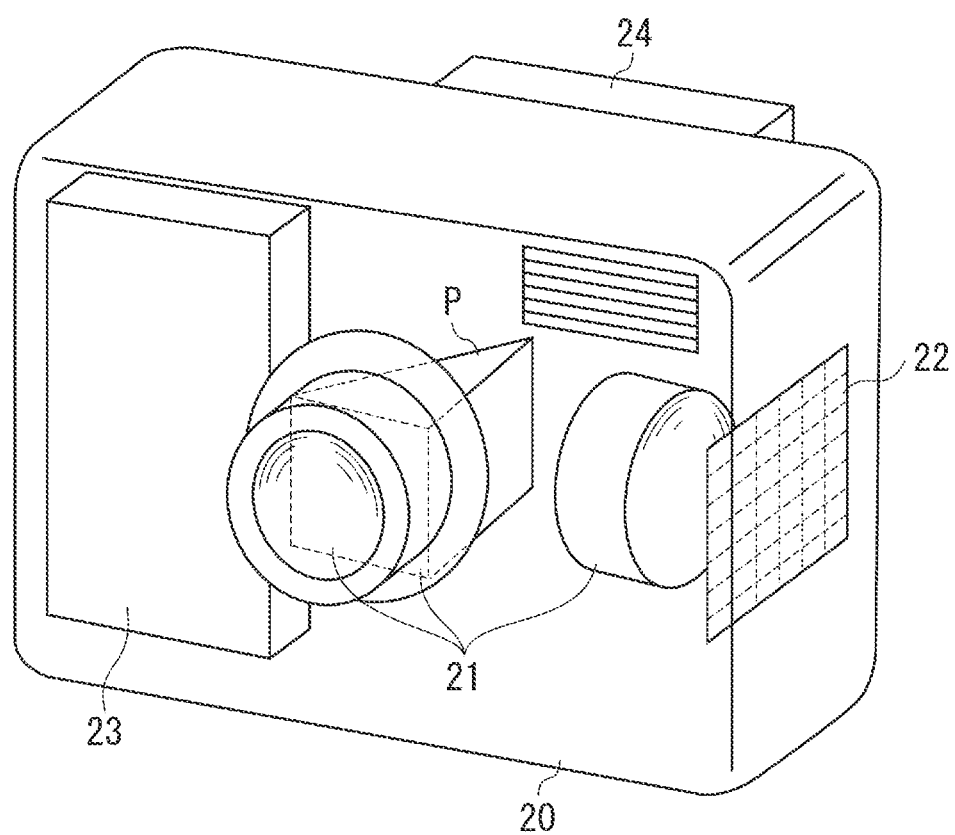
FIG. 18 is a schematic diagram illustrating an image pickup apparatus using the zoom lens according to an embodiment of the invention.

FIGS. 17A and 17B are schematic diagrams illustrating main parts of the image pickup apparatus when the optical axis of the zoom lens according to the first embodiment of the invention is bent by an optical-path-bending reflective element and is stored in a camera main body. FIG. 18 is a schematic diagram illustrating main parts of the image pickup apparatus according to an embodiment of the invention.

The first to eighth embodiments correspond to Numerical Examples 1 to 8, respectively, described below. The zoom lens of each embodiment is a photographic optical system used in an image pickup apparatus. In the lens cross-sectional view obtained by expanding the optical path, the left side refers to the object side (front side), and the right side refers to the image side (rear side). When the zoom lens of each embodiment is used as a projection lens in a projector or the like, the left side refers to a screen, and the right side refers to a projection target image in the lens cross-sectional view obtained by expanding the optical path. In the lens cross-sectional view, i denotes the order of the lens units from the object side, and Li denotes the i-th lens unit.

LR denotes a rear lens group including two or more lens units. SS denotes an aperture stop. UR denotes a reflective element including a reflection mirror for bending an optical axis of an optical system by 90 degrees or a prism that uses internal reflection. The arrow denotes a movement locus of each lens unit during zooming from the wide-angle end to the telephoto end.

G denotes an optical block including an optical filter, a phase plate, and the like. IP denotes an image plane, which corresponds to an image pickup plane of solid-state image sensor (photoelectric conversion element) such as a CCD sensor or a CMOS sensor when it is used as a photographic optical system of a video camera or a digital camera or corresponds to a film surface when it is used as an photographic optical system of a silver-halide film camera.

The first to sixth embodiments illustrated in FIGS. 1, 3, 5, 7, 9, and 11 relate to a 6-unit zoom lens. In such lens cross-sectional views, L1 denotes a first lens unit of a positive refractive power, L2 denotes a second lens unit of a negative refractive power, and UR denotes a reflective element. The rear lens group LR includes a third lens unit L3 of a negative refractive power, a fourth lens unit L4 of a positive refractive power, a fifth lens unit L5 of a negative refractive power, and a sixth lens unit L6 of a positive refractive power.

The seventh embodiment illustrated in FIG. 13 relates to a four-unit zoom lens. In the lens cross-sectional view of FIG. 13, L1 denotes a first lens unit of a positive refractive power, L2 denotes a second lens unit of a negative refractive power, and UR denotes a reflective element. The rear lens group LR includes a third lens unit L3 of a positive refractive power and a fourth lens unit L4 of a positive refractive power.

The eighth embodiment illustrated in FIG. 15 relates to a five-unit zoom lens. In the lens cross-sectional view of FIG. 15, L1 denotes a first lens unit of a positive refractive power, L2 denotes a second lens unit of a negative refractive power, and UR denotes a reflective element. The rear lens group LR includes a third lens unit L3 of a positive refractive power, a fourth lens unit L4 of a negative refractive power, and a fifth lens unit L5 of a positive refractive power.

In the schematic configuration diagrams of a digital camera (image pickup apparatus) having the zoom lens according to an embodiment of the invention illustrated in FIGS. 17A and 17B, FIG. 17A illustrates a photographing state, and FIG. 17B illustrates a stored state (retracted state) in which the zoom lens is not used for the imaging.

The zoom lens illustrated in FIGS. 17A and 17B is a zoom lens according to the first embodiment of the invention. In FIG. 17A, L1 denotes a first lens unit of a positive refractive power, and L2 denotes a second lens unit of a negative refractive power. UR denotes a reflective element including a reflective surface for bending an optical path, which is a prism that uses internal reflection in FIG. 17A. LR denotes a rear lens group including two or more lens units arranged on the image side relative to the reflective element UR and an aperture stop SS. The rear lens group LR includes a third lens unit L3 of a negative refractive power, a fourth lens unit L4 of a positive refractive power, a fifth lens unit L5 of a negative refractive power, and a sixth lens unit L6 of a positive refractive power.

The aperture stop SS is arranged between lenses of the fourth lens unit L4. IP denotes a solid-state image sensor (photoelectric conversion element) such as a CCD sensor or a CMOS sensor that receives an image formed by the zoom lens. In the aberration charts, d-line and g-line denote a Fraunhofer's d-line and a Fraunhofer's g-line, respectively, and $\Delta M$ and $\Delta S$ denote a meridional image plane and a sagittal image plane, respectively. Chromatic aberration of magnification is represented by g-line. $\omega$ denotes a half angle of view (degree), and Fno denotes an F-number. In each embodiment, the wide-angle end and the telephoto end refer to zoom positions when the zoom lens unit is positioned in respective ends within the movable range on an optical axis of a mechanism.

In each embodiment, the first lens unit L1 of a positive refractive power, the second lens unit L2 of a negative refractive power, the optical-path-bending reflective element UR, and a rear lens group LR including two or more lens units and the aperture stop are arranged in this order from the object side to the image side. During zooming, the first lens unit L1, the second lens unit L2, the two or more lens units of the rear lens group LR are moved. Here, the reflective element UR does not move for zooming.

Since the reflective element UR which is stationary during zooming is arranged, a space inside the camera body is effectively utilized by bending the optical path of the zoom lens. As a result, it is possible to implement a high zoom ratio and obtain a zoom lens having a reduced size in a front-rear direction. In addition, since the first lens unit L1 of a positive refractive power is arranged in the nearest side to an object, and the zooming is made by moving at least the first and second lens units L1 and L2, it is possible to obtain a wide angle of view and a high zooming ratio of the zoom lens.

In particular, the movement amount of the second lens unit L2 is smaller than that of the first lens unit L1 during zooming from the wide-angle end to the telephoto end. As a result, the front lens (first lens unit L1) is arranged in a position closer to the image side at the wide-angle end. Therefore, it is possible to reduce a distance to the aperture stop SS and suppress an increase of the front lens effective diameter caused by the wide angle of view. In addition, since the arrangement is made such that a contribution of variable power of the lens unit of the object side is smaller than that of the reflective element UR, it is possible to suppress an increase of the refractive power of the second lens unit L2 and appropriately correct curvature of field caused by the wide angle of view.

In each embodiment, the first and second lens units L1 and L2 are moved during zooming, and a ratio of movement amounts or contributions of variable power between the lens units L1 and L2 is appropriately adjusted. Therefore, it is possible to suppress an increase in a size of the entire zoom lens and easily obtain a wide angle of view.

Specifically, the advantages of the invention can be obtained if the following conditions are satisfied:

$$1.4 < M1/M2 < 20.0 \quad (1)$$

$$0.20 < (M2+Ms)/LSw < 0.44, \text{ and} \quad (2)$$

$$0.20 < (\beta 2t/(\beta 2w))/(ft/fw) < 0.44 \quad (3),$$

where M1 and M2 denote the movement amounts (absolute values) of the first and second lens units L1 and L2, respectively, during zooming from the wide-angle end to the telephoto end. $\beta 2w$ and $\beta 2t$ denote lateral magnifications of the second lens unit L2 at the wide-angle end and the telephoto end, respectively. LSw denotes a distance to the aperture stop SS at the wide-angle end on the first lens surface which is a lens surface closest to the object side. Ms denotes a movement amount (absolute value) of the aperture stop SS from the wide-angle end to the telephoto end during zooming. fw and ft denote focal lengths of the entire zoom lens at the wide-angle end and the telephoto end, respectively.

The condition (1) is a condition for defining relative movement amounts of the first and second lens units L1 and L2 from the wide-angle end to the telephoto end during zooming. In this condition, the movement amount of the first lens unit L1 is larger than that of the second lens unit L2. That is, the first lens unit L1 is moved towards the object side across a large distance from the wide-angle end to the telephoto end. As a result, the front lens (first lens unit L1) is arranged closer to the image side at the wide-angle end so that it is possible to suppress an increase of the front lens effective diameter caused by a wide angle of view.

If the lower limit of the condition (1) is exceeded, the movement amount of the second lens unit L2 is significantly greater than the movement amount of the first lens unit L1, and the front lens is arranged closer to the object side at the wide-angle end. Therefore, the front lens effective diameter increases due to a wide angle of view. Meanwhile, if the upper limit of the condition (1) is exceeded, the movement amount of the second lens unit L2 is significantly smaller than that of the first lens unit L1, and the zoom effect caused by the movement of the second lens unit L2 is reduced. For this reason, it is necessary to increase the refractive power of the second lens unit L2. Therefore, it is difficult to correct curvature of field at the wide-angle end.

The condition (2) defines a position of the aperture stop SS at the wide-angle end. In this condition, the arrangement is made such that the front lens is located in the vicinity of the aperture stop SS at the wide-angle end. Since the front lens is arranged closer to the aperture stop SS at the wide-angle end, it is possible to suppress an increase of the front lens effective diameter caused by a wide angle of view. If the lower limit of the condition (2) is exceeded, the movement amount of the second lens unit L2 serving as a zoom lens unit is significantly reduced, and it is necessary to increase the refractive power of the second lens unit L2 for zooming. Therefore, it is difficult to correct curvature of field at the wide-angle end.

Meanwhile, if the upper limit of the condition (2) is exceeded, the movement amount of the second lens unit L2 and the movement amount of the lens unit having the aperture stop significantly increase, and it is difficult to arrange the front lens in the vicinity of the aperture stop at the wide-angle end. Therefore, the front lens effective diameter increases due to a wide angle of view.

The condition (3) relates to an amount of contribution of variable power of the second lens unit L2. In this condition, a balance of the contribution of variable power between the object-side lens unit and the image-side lens unit is appropriately set by the optical-path-bending reflective element UR. If the lower limit of the condition (3) is exceeded, the amount of contribution of variable power of the second lens unit L2 is significantly reduced, and it is necessary to increase the contribution of variable power of the image-side lens unit using the reflective element UR. As a result, a size of the image-side lens system increases relative to the reflective element UR, and the width of the camera increases. Meanwhile, if the upper limit is exceeded, the amount of contribution of variable power of the second lens unit L2 significantly increases, and the refractive power of the second lens unit L2 increases accordingly. As a result, it is difficult to correct curvature of field at the wide-angle end.

In each embodiment, more usefully, the numerical ranges of the conditions (1) to (3) are set as follows:

$$1.43 < M1/M2 < 15.0 \quad (1a)$$

$$0.25 < (M2+Ms)/LSw < 0.43 \quad (2a)$$

$$0.220 < (\beta 2t/(\beta 2w))/(ft/fw) < 0.440 \quad (3a)$$

In each embodiment, more usefully, the numerical ranges of the conditions (1a) to (3a) are set as follows:

$$1.46 < M1/M2 < 10.00 \quad (1b)$$

$$0.30 < (M2+Ms)/LSw < 0.42 \quad (2b)$$

$$0.250 < (\beta 2t/(\beta 2w))/(ft/fw) < 0.435 \quad (3b)$$

Next, a configuration of the zoom lens according to each embodiment of the invention will be described. In each embodiment, when the zoom lens proceeds from the photographing state (FIG. 17A) to the stored state (FIG. 17B), the reflective element UR is moved towards the image side along the optical axis. In addition, the first and second lens units L1 and L2 are moved to the space generated by moving the reflective element UR and are retractably stored therein. If such a retractable optical-path-bending zoom lens is employed, it is possible to further easily reduce the size of the camera in the front-rear direction.

In the zoom lens according to an embodiment of the invention, usefully, one or more following conditions are satisfied. Here, OALw denotes the length of the entire zoom lens at the wide-angle end (a length of the glass block which has no refractive power and is closer to the image side relative to a lens surface closest to the image side is referred to as air-equivalent optical path length).

vd2p denotes the Abbe number of a material of a positive lens having the smallest Abbe number out of materials included in the second lens unit L2. nd2ave denotes an average refractive index of materials of the lenses included in the second lens unit L2. vd1p and n1dp denote the Abbe number and the refractive index, respectively, of a material of a positive lens having the greatest Abbe number out of materials included in the first lens unit L1. f1 and f2 denote the focal lengths of the first and second lens units L1 and L2, respectively. D2 denotes a thickness of the second lens unit L2 along the optical axis (a distance from the surface vertex of the lens on the object side to the surface vertex of the lens on the image side). In this case, at least one of the following conditions is usefully satisfied.

$$0.40 < LSw/OALw < 0.66 \quad (4)$$

$$10.0 < vd2p < 20.0 \quad (5)$$

$$1.83 < nd2\text{ave} < 2.30 \quad (6)$$

$$60.0 < vd1p < 100.0 \quad (7)$$

$$1.40 < nd1p < 1.70 \quad (8)$$

$$3.50 < f1/|f2| < 8.00 \quad (9)$$

$$0.60 < |f2|/D2 < 1.20 \quad (10)$$

Next, technical meanings of each condition will be described.

The condition (4) defines a position of the aperture stop SS at the wide-angle end. If the aperture stop SS is arranged to satisfy the condition (4), the front lens at the wide-angle end is arranged in the vicinity to the aperture stop SS. Therefore, it is possible to easily suppress an increase of the front lens effective diameter caused by a wide angle of view.

If the lower limit of the condition (4) is exceeded, the length of the entire zoom lens at the wide-angle end significantly increases relative to a distance to the position of the aperture stop SS from the front lens. This causes an increase of the width of the camera. Meanwhile, if the upper limit of the condition (4) is exceeded, it is difficult to arrange the front lens in the vicinity of the aperture stop SS at the wide-angle end. Therefore, the front lens effective diameter increases due to a wide angle of view.

The condition (5) defines the Abbe number of a material of a positive lens included in the second lens unit L2. If a high-dispersion material satisfying the condition (5) is used in at least one of the positive lenses included in the second lens unit L2, the achromatism within the second lens unit L2 is intensified, and it is possible to alleviate the refractive power of each single lens of the second lens unit L2. As a result, it is possible to easily reduce a thickness of the second lens unit L2 (thickness along the optical axis). In this case, since the second lens unit L2 is retracted when the camera is not used, it is possible to reduce a thickness of the second lens unit L2 and accordingly reduce a thickness of the camera.

If the lower limit of the condition (5) is exceeded, dispersion of the material of the positive lens significantly increases, and thus, chromatic aberration within the second lens unit L2 is excessively corrected. Meanwhile, if the upper limit of the condition (5) is exceeded, dispersion of the material of the positive lens is significantly reduced, and it is necessary to increase the power of each single lens for achromatism within the second lens unit L2. As a result, it is difficult to reduce a thickness of the second lens unit L2.

The condition (6) defines an average refractive index of materials of overall lenses included in the second lens unit L2. If the average refractive index of materials of overall lenses included in the second lens unit L2 satisfies the condition (6), a thickness of the second lens unit L2 is reduced, and thus, a thickness of the camera is reduced. In addition, curvature of field at the wide-angle end is easily corrected.

If the lower limit of the condition (6) is exceeded, the average refractive index is significantly lowered, and the thickness of the second lens unit L2 increases. In addition, it is difficult to correct curvature of field at the wide-angle end. Meanwhile, if the upper limit of the condition (6) is exceeded, the average refractive index significantly increases, and the Petzval sum of the entire zoom lens increases in the positive direction. Therefore, it is difficult to correct curvature of field for the entire zoom range.

The condition (7) defines the Abbe number of the material of the positive lens included in the first lens unit L1. If a low-dispersion material satisfying the condition (7) is used in at least one of the positive lenses included in the first lens unit L1, it is possible to appropriately correct chromatic aberration across the entire zoom range from the wide-angle end to the telephoto end.

If the lower limit of the condition (7) is exceeded, the dispersion of the material of the positive lens significantly increases, and chromatic aberration of magnification at the wide-angle end and axial chromatic aberration at the telephoto end are insufficiently corrected. Meanwhile, if the upper limit of the condition (7) is exceeded, chromatic aberration is easily corrected. However, since the material of this range tends to have a low refractive index, the thickness of the first lens unit L1 increases, and it is difficult to correct spherical aberration and coma at the telephoto end.

The condition (8) defines a refractive index of the material of the positive lens having the greatest Abbe number out of the positive lenses included in the first lens unit L1. If the refractive index of the material of the positive lens having the greatest Abbe number satisfies the condition (8), it is possible to reduce a thickness of the first lens unit L1 and easily correct spherical aberration and coma at the telephoto end. In this case, since the first lens unit L1 is retracted when the camera is not used, it is possible to easily reduce a thickness of the camera by reducing a thickness of the first lens unit L1.

If the lower limit of the condition (8) is exceeded, the refractive index of the material of the positive lens is significantly lowered, and the thickness of the first lens unit L1 increases. In addition, it is difficult to correct spherical aberration and coma at the telephoto end. Meanwhile, if the upper limit of the condition (8) is exceeded, the refractive index of the material of the positive lens significantly increases, and it is difficult to select a low-dispersion material. Therefore, it is difficult to correct chromatic aberration of magnification at the wide-angle end and axial chromatic aberration at the telephoto end.

The condition (9) defines a balance of refractive power between the first and second lens units L1 and L2. If the power balance between the first and second lens units L1 and L2 satisfies the condition (9), it is possible to reduce a size of the entire zoom lens and easily obtain excellent optical performance.

If either the lower limit or the upper limit of the condition (9) is exceeded, the refractive power of the first or second lens unit L1 or L2 unavoidably increases so that it is difficult to correct aberration across the entire zoom range. Therefore, a size of the entire zoom lens increases to obtain a desired zoom ratio.

The condition (10) defines a balance between the refractive power of the second lens unit L2 and a thickness of the second lens unit L2. If the second lens unit L2 satisfies the condition (10), the thickness of the second lens unit L2 is reduced so that it is possible to reduce the thickness of the camera and easily perform excellent correction of curvature of field at the wide-angle end.

If either the lower limit or the upper limit of condition (10) is exceeded, the refractive power of the second lens unit L2 significantly increases, and it is difficult to correct curvature of field at the wide-angle end. In addition, the thickness of the second lens unit L2 significantly increases, and the thickness of the camera increases.

In each embodiment, more usefully, the numerical ranges of the conditions (4) to (10) are set as follows:

$$0.500 < LSw/OALw < 0.655 \quad (4a)$$

$$12.0 < vd2p < 19.5 \quad (5a)$$

$$1.85 < nd2ave < 2.20 \quad (6a)$$

$$61.0 < vd1p < 98.0 \quad (7a)$$

$$1.43 < nd1p < 1.65 \quad (8a)$$

$$3.60 < f1/|f2| < 7.50 \quad (9a)$$

$$0.70 < |f2|/D2 < 1.15 \quad (10a)$$

In each embodiment, more usefully, the numerical ranges of the conditions (4a) to (10a) are set as follows:

$$0.520 < LSw/OALw < 0.652 \quad (4b)$$

$$14.0 < vd2p < 19.0 \quad (5b)$$

$$1.87 < nd2ave < 2.10 \quad (6b)$$

$$62.0 < vd1p < 96.0 \quad (7b)$$

$$1.45 < nd1p < 1.62 \quad (8b)$$

$$3.70 < f1/|f2| < 7.00 \quad (9b)$$

$$0.75 < |f2|/D2 < 1.10 \quad (10b)$$

Next, lens configurations of each embodiment will be described in detail.

The zoom lens according to the first embodiment of the invention will be described with reference to FIG. 1. The first embodiment of FIG. 1 relates to a six-unit zoom lens including first to sixth lens units having positive, negative, negative, positive, negative, and positive refractive powers in order from the object side to the image side.

In the first embodiment, during zooming from the wide-angle end to the telephoto end, the reflective element UR, the third lens unit L3, and the fifth lens unit L5 are stationary. In addition, the first lens unit L1 and the fourth lens unit L4 are moved towards the object side, and the second lens unit L2 and the sixth lens unit L6 are moved towards the image side. Here, a lens unit LS having the aperture stop SS is the fourth lens unit L4. The aperture stop SS is arranged inside the fourth lens unit L4 and is moved in synchronization with the fourth lens unit L4. In addition, a total reflection prism using total reflection is employed as the reflective element UR.

Since the third lens group L3 of a negative refractive power is arranged on the image side of the reflective element UR, the positive refractive power of the fourth lens unit L4 increases, and the contribution of variable power of the fourth lens unit L4 increases. In addition, a high zoom ratio is implemented across the entire zoom lens while a contribution of variable power of the lens unit located on the object side relative to the reflective element UR is alleviated.

Compensation for an image plane variation caused by zooming is performed by moving the sixth lens unit L6 towards the image side along a non-linear locus. Focusing from an infinitely-distant object to a finitely-distant object is performed by employing a rear focus type in which the sixth lens unit L6 is moved along the optical axis. Camera-shake correction for correcting an image shake generated when the zoom lens is vibrated is performed by moving a part of lenses of the fourth lens unit L4 to have a component perpendicular to the optical axis.

The zoom lens according to the second embodiment of the invention will be described with reference to FIG. 3. The second embodiment is similar to the first embodiment in the number of lens units, a zoom type such as a refractive power arrangement, a focusing type, a camera shake correction type, and the like. The second embodiment is different from the first embodiment in that a reflection mirror is employed as the reflective element UR.

The zoom lens according to the third embodiment of the invention will be described with reference to FIG. 5. The third embodiment is similar to the first embodiment in a zoom type, a focusing type, a camera shake correction type, and the like. The third embodiment is different from the first embodiment in that the aperture stop SS is independently configured and is independently moved during zooming.

Specifically, the aperture stop SS is arranged between the third and fourth lens units L3 and L4 and is moved towards the object side independently from each lens unit during zooming from the wide-angle end to the telephoto end. At the wide-angle end, the aperture stop is located closer to the object side. Therefore, it is possible to advantageously reduce the front lens effective diameter.

The zoom lens according to the fourth embodiment of the invention will be described with reference to FIG. 7. The fourth embodiment is similar to the first embodiment in a zoom type, a focusing type, a camera shake correction type, and the like. The fourth embodiment is different from the first embodiment in that the fifth lens unit L5 is moved during zooming. Specifically, a variation in curvature of field and the like in the middle zoom position is appropriately corrected by moving the fifth lens unit L5 towards the object side during zooming from the wide-angle end to the telephoto end.

The zoom lens according to the fifth embodiment of the invention will be described with reference to FIG. 9. The fifth embodiment is similar to the first embodiment in a zoom type, a focusing type, a camera shake correction type, and the like. The fifth embodiment is different from the first embodiment in that the zoom ratio is greater. In the fifth embodiment, a low-dispersion material of extraordinary partial dispersion is used in a positive lens of the first lens unit L1. Therefore, it is possible to appropriately correct increasing chromatic aberration at the telephoto end caused by the high zoom ratio.

The zoom lens according to the sixth embodiment of the invention will be described with reference to FIG. 11. The sixth embodiment is similar to the first embodiment in a zoom type, a focusing type, a camera shake correction type, and the like. The sixth embodiment is different from the first embodiment in that the zoom ratio is greater. In the sixth embodiment, a high-refractive-index material of extraordinary partial dispersion is used in a positive lens of the first lens unit L1 instead of a low-dispersion material. Therefore, it is possible to appropriately correct increasing chromatic aberration at the telephoto end caused by the high zoom ratio and reduce the thickness of the first lens unit L1.

The zoom lens according to the seventh embodiment of the invention will be described with reference to FIG. 13. In the seventh embodiment, the zoom lens is a four-unit zoom lens including the first to fourth lens units having positive, negative, positive, and positive refractive powers in order from the object side. In the seventh embodiment, the reflective element UR is stationary during zooming from the wide-angle end to the telephoto end. The first and third lens units L1 and L3 are arranged on the object side, and the second lens unit L2 is arranged on the image side. The fourth lens unit L4 is moved non-linearly.

Here, a lens unit LS having the aperture stop SS is the third lens unit L3. The aperture stop SS is arranged inside the third lens unit L3 and is moved in synchronization with the third lens unit L3. In addition, similar to the first embodiment, a total reflection prism is employed as the reflective element UR. Since a movement stroke of the third lens unit L3 immediately before the location of the reflective element UR is obtained during zooming from the wide-angle end to the telephoto end, a contribution of variable power of the third lens unit L3 increases. In addition, a high zoom ratio in the entire zoom lens is implemented while the contribution of variable power of the lens unit arranged on the object side relative to the reflective element UR is alleviated.

Compensation for a variation in the image plane caused by the zooming is performed by moving the fourth lens unit L4 towards the image side along a non-linear locus. Focusing from an infinitely-distant object to a finitely-distant object is performed by employing a rear focus type in which the fourth lens unit L4 is moved along the optical axis. The correction of the camera shake is performed by moving a part of lenses of the third lens unit L3 to have a component perpendicular to the optical axis.

The zoom lens according to the eighth embodiment of the invention will be described with reference to FIG. 15. In the eighth embodiment, the zoom lens is a five-unit zoom lens including first to fifth lens units having positive, negative, positive, negative, and positive refractive powers in order from the object side.

In the eighth embodiment, during zooming from the wide-angle end to the telephoto end, the reflective element UR and the fourth lens unit L4 are stationary, the first and third lens units L1 and L3 are moved towards the object side, and the second and fifth lens units L2 and L5 are moved towards the image side. Here, the lens unit LS having the aperture stop SS is the third lens unit L3. The aperture stop SS is arranged inside the third lens unit L3 and is moved in synchronization with the third lens unit L3. In addition, similar to the first embodiment, a total reflection prism is employed as the reflective element UR.

Since a movement stroke of the third lens unit L3 immediately before the location of the reflective element UR is obtained during zooming from the wide-angle end to the telephoto end, the contribution of variable power of the third lens unit L3 increases. In addition, since the fourth lens unit L4 of a negative refractive power is added between the third and fifth lens units L3 and L5, the positive refractive power of the fifth lens unit L5 increases, and both the contribution of variable power and the focus sensitivity increase. Therefore, the contributions of variable power of the third and fifth lens units L3 and L5 increase, and it is possible to implement a high zoom ratio in the entire zoom lens while the contribution of variable power of the lens unit arranged on the object side relative to the reflective element UR is alleviated.

Compensation for a variation in the image plane caused by the zooming is performed by moving the fifth lens unit L5 towards the image side along a non-linear locus. Focusing from an infinitely-distant object to a finitely-distant object is performed by employing a rear focus type in which the fifth lens unit L5 is moved along the optical axis. Correction of camera shake is performed by moving a part of lenses of the third lens unit L3 to have a component perpendicular to the optical axis.

In the zoom lens of each embodiment, an aperture diameter of the aperture stop SS may be controlled depending on the zoom position in order to control a variation in F-number during zooming. In addition, when the invention is applied to a digital camera having an electronic image sensor, distortion of an image formed by the zoom lens may be electrically corrected (corrected through image processing).

Hereinafter, specific numerical data of Numerical Examples 1 to 8 corresponding to the first to eighth embodiments will be described. In each numerical example, i denotes a surface number counted from the object side, and ri denotes a radius of curvature of the i-th optical surface (i-th surface). In addition, di denotes an axial distance between the i-th surface and the (i+1)th surface, and ndi and vdi denote a refractive index and an Abbe number, respectively, of the i-th optical member for d-line. The angle of view is represented as a half angle of view (degree). Here, the Abbe number vd can be expressed as follows:

$$vd=(Nd-1)/(NF-NC),$$

where Nd denotes a refractive index for the Fraunhofer's d-line (wavelength: 587.6 nm), NF denotes a refractive index for the Fraunhofer's F-line (wavelength: 486.1 nm), and NC denotes a refractive index for the Fraunhofer's C-line (wavelength: 656.3 nm).

The aspheric shape can be expressed as follows:

$$x=(h^2/r)/[1+\{1-(1+K)\times(h/r)^2\}^{1/2}]+A4\times h^4+A6\times h^6+A8\times h^8+A10\times h^{10},$$

where a propagation direction of light is set to positive, x denotes a displacement amount from the surface vertex in the optical axis direction, h denotes a height from the optical axis in the direction perpendicular to the optical axis, r denotes a paraxial radius of curvature, K denotes a conic constant, and A4, A6, A8, and A10 denote aspheric coefficients.

In addition, the expression "±eXX" means "×10$^{\pm xx}$." A relationship between conditions and numerical examples described above is represented in Table 1.

Numerical Example 1 unit: mm

Surface Data

| Surface number | r | d | nd | vd | Effective diameter |
|---|---|---|---|---|---|
| 1 | 29.442 | 1.10 | 1.84666 | 23.9 | 24.53 |
| 2 | 18.140 | 4.00 | 1.48749 | 70.2 | 21.76 |
| 3 | 58.222 | 0.10 | | | 21.01 |
| 4 | 21.740 | 2.80 | 1.77250 | 49.6 | 20.46 |
| 5 | 88.350 | Variable | | | 19.94 |
| 6 | 88.743 | 1.05 | 1.84954 | 40.1 | 13.50 |
| 7* | 5.649 | 3.78 | | | 9.27 |
| 8 | −11.341 | 0.60 | 1.88300 | 40.8 | 8.92 |
| 9 | 24.462 | 0.16 | | | 9.11 |
| 10 | 17.486 | 2.35 | 1.92286 | 18.9 | 9.31 |
| 11 | −23.100 | Variable | | | 9.31 |
| 12 | ∞ | 8.00 | 1.83400 | 37.2 | 7.26 |
| 13 | ∞ | 0.68 | | | 5.77 |
| 14 | −24.294 | 0.60 | 1.77250 | 49.6 | 5.89 |
| 15 | −41.535 | Variable | | | 6.06 |

-continued unit: mm

| | | | | | |
|---|---|---|---|---|---|
| 16* | 8.978 | 2.00 | 1.55332 | 71.7 | 6.39 |
| 17* | -32.298 | 1.02 | | | 6.31 |
| 18 (Stop) | ∞ | 1.02 | | | 6.10 |
| 19 | 11.955 | 0.60 | 1.84666 | 23.9 | 5.85 |
| 20 | 7.462 | 1.33 | | | 5.59 |
| 21 | 14.272 | 2.70 | 1.48749 | 70.2 | 5.73 |
| 22 | -7.881 | 0.61 | 1.88300 | 40.8 | 5.86 |
| 23 | -12.552 | Variable | | | 6.04 |
| 24 | -46.317 | 0.70 | 1.60311 | 60.6 | 5.77 |
| 25 | 11.130 | Variable | | | 5.81 |
| 26* | 12.732 | 3.35 | 1.48749 | 70.2 | 10.38 |
| 27 | -14.944 | Variable | | | 10.39 |
| 28 | ∞ | 0.30 | 1.51633 | 64.1 | 20.00 |
| 29 | ∞ | 1.50 | | | 20.00 |
| 30 | ∞ | 0.50 | 1.51633 | 64.1 | 20.00 |
| 31 | ∞ | | | | 20.00 |
| Image plane | ∞ | | | | |

Aspheric Data

7th surface

K = 0.00000e+000   A4 = -1.08503e-004   A6 = -6.19351e-006
A8 = 2.36397e-007  A10 = -1.20711e-008

16th surface

K = -4.71075e-001  A4 = -5.10203e-005   A6 = 1.18500e-007
A8 = -1.31444e-008

17th surface

K = -1.87937e+001  A4 = 3.60355e-005

26th surface

K = 0.00000e+000   A4 = -9.54239e-005   A6 = -9.58971e-007
A8 = 8.96786e-009

Various Data
Zoom ratio: 9.42

| | Wide angle | Middle | Telephoto |
|---|---|---|---|
| Focal length | 4.43 | 16.29 | 41.71 |
| F-number | 3.11 | 4.91 | 6.07 |
| Half angle of view | 36.96 | 13.38 | 5.31 |
| Image height | 3.33 | 3.88 | 3.88 |
| Total lens length | 73.53 | 79.52 | 86.37 |
| BF | 0.50 | 0.50 | 0.50 |
| d5 | 0.50 | 10.31 | 17.16 |
| d11 | 4.75 | 0.94 | 0.93 |
| d15 | 12.8 | 5.24 | 0.32 |
| d23 | 0.91 | 8.47 | 13.39 |
| d25 | 5.56 | 10.03 | 10.79 |
| d27 | 7.65 | 3.18 | 2.43 |
| Entrance pupil position | 15.01 | 42.25 | 89.55 |
| Exit pupil position | -63.23 | 64.31 | 46.98 |
| Front-side principal point position | 19.14 | 62.70 | 168.69 |
| Rear-side principal point position | -3.93 | -15.79 | -41.21 |

Zoom Lens Unit Data

| Unit | Starting surface | Focal length | Lens length | Front-side principal point position | Rear-side principal point position |
|---|---|---|---|---|---|
| L1 | 1 | 36.47 | 8.00 | 1.44 | -3.58 |
| L2 | 6 | -6.59 | 7.94 | 0.45 | -6.18 |
| UR | 12 | ∞ | 8.00 | 2.18 | -2.18 |
| L3 | 14 | -76.93 | 0.60 | -0.48 | -0.83 |
| L4 | 16 | 12.26 | 9.29 | 2.39 | -6.03 |
| L5 | 24 | -14.81 | 0.70 | 0.35 | -0.08 |
| L6 | 26 | 14.68 | 3.35 | 1.08 | -1.27 |
| G | 28 | ∞ | 2.30 | 1.01 | -1.01 |

-continued unit: mm

Single Lens Data

| Lens | Starting surface | Focal length |
|---|---|---|
| 1 | 1 | -58.43 |
| 2 | 2 | 52.34 |
| 3 | 4 | 36.66 |
| 4 | 6 | -7.14 |
| 5 | 8 | -8.71 |
| 6 | 10 | 11.09 |
| 7 | 12 | 0.00 |
| 8 | 14 | -76.93 |
| 9 | 16 | 12.92 |
| 10 | 19 | -24.98 |
| 11 | 21 | 10.85 |
| 12 | 22 | -25.56 |
| 13 | 24 | -14.81 |
| 14 | 26 | 14.68 |
| 15 | 28 | 0.00 |
| 16 | 30 | 0.00 |

Numerical Example 2

Unit : mm

Surface Data

| Surface number | r | d | Nd | vd | Effective diameter |
|---|---|---|---|---|---|
| 1 | 32.569 | 1.20 | 1.84666 | 23.9 | 24.31 |
| 2 | 19.807 | 3.60 | 1.59282 | 68.6 | 21.76 |
| 3 | 69.358 | 0.11 | | | 21.27 |
| 4 | 23.456 | 2.70 | 1.77250 | 49.6 | 20.62 |
| 5 | 73.065 | Variable | | | 19.99 |
| 6 | 117.517 | 1.20 | 1.86400 | 40.6 | 13.62 |
| 7* | 6.215 | 3.73 | | | 9.61 |
| 8 | -12.077 | 0.70 | 1.88300 | 40.8 | 9.31 |
| 9 | 30.450 | 0.12 | | | 9.57 |
| 10 | 18.308 | 2.00 | 1.92286 | 18.9 | 9.79 |
| 11 | -26.183 | Variable | | | 9.79 |
| 12 | ∞ | 8.00 | | | 7.98 |
| 13 | ∞ | 0.69 | | | 5.97 |
| 14 | -25.508 | 0.65 | 1.77250 | 49.6 | 6.07 |
| 15 | -49.142 | Variable | | | 6.24 |
| 16* | 9.848 | 2.10 | 1.55332 | 71.7 | 6.55 |
| 17* | -34.828 | 1.11 | | | 6.47 |
| 18 (Stop) | ∞ | 1.11 | | | 6.25 |
| 19 | 12.978 | 0.65 | 1.84666 | 23.9 | 5.99 |
| 20 | 8.181 | 1.63 | | | 5.74 |
| 21 | 15.449 | 2.90 | 1.48749 | 70.2 | 5.81 |
| 22 | -8.986 | 0.65 | 1.88300 | 40.8 | 5.61 |
| 23 | -14.140 | Variable | | | 5.75 |
| 24 | -49.593 | 0.80 | 1.60311 | 60.6 | 5.68 |
| 25 | 12.334 | Variable | | | 5.73 |
| 26* | 14.792 | 3.00 | 1.48749 | 70.2 | 9.84 |
| 27 | -15.612 | Variable | | | 9.88 |
| 28 | ∞ | 0.30 | 1.51633 | 64.1 | 20.00 |
| 29 | ∞ | 1.50 | | | 20.00 |
| 30 | ∞ | 0.50 | 1.51633 | 64.1 | 20.00 |
| 31 | ∞ | | | | 20.00 |
| Image plane | ∞ | | | | |

-continued

Unit : mm

Aspheric Data

7th surface

K = 0.00000e+000  A4 = −5.94099e−005  A6 = −2.81478e−006
A8 = 1.22686e−007  A10 = −2.51021e−009

16th surface

K = −3.43698e−001  A4 = −3.65178e−005  A6 = −7.24008e−007
A8 = 1.20830e−008

17th surface

K = −3.02555e+001  A4 = 2.39378e−005

26th surface

K = 0.00000e+000  A4 = −6.71413e−005  A6 = −5.68829e−007
A8 = 6.21340e−009

Various Data
zoom ratio: 8.53

|  | Wide angle | Middle | Telephoto |
|---|---|---|---|
| Focal length | 4.90 | 14.24 | 41.76 |
| F-number | 3.29 | 4.69 | 6.07 |
| Half angle of view | 34.25 | 15.22 | 5.30 |
| Image height | 3.33 | 3.88 | 3.88 |
| Total lens length | 74.02 | 78.10 | 86.77 |
| BF | 0.50 | 0.50 | 0.50 |
| d5 | 0.80 | 8.56 | 17.3 |
| d11 | 4.56 | 0.88 | 0.81 |
| d15 | 12.34 | 4.83 | 0.40 |
| d23 | 1.65 | 9.16 | 13.59 |
| d25 | 4.68 | 8.13 | 10.81 |
| d27 | 8.55 | 5.10 | 2.42 |
| Entrance pupil position | 16.32 | 37.16 | 99.03 |
| Exit pupil position | −50.39 | 221.85 | 63.65 |
| Front-side principal point position | 20.75 | 52.31 | 168.4 |
| Rear-side principal point position | −4.40 | −13.74 | −41.26 |

Zoom Lens Unit Data

| Unit | Starting surface | Focal length | Lens length | Front-side principal point position | Rear-side principal point position |
|---|---|---|---|---|---|
| L1 | 1 | 36.85 | 7.61 | 0.73 | −3.82 |
| L2 | 6 | −7.14 | 7.74 | 0.52 | −5.84 |
| UR | 12 | ∞ | 8.00 | 4.00 | −4.00 |
| L3 | 14 | −69.49 | 0.65 | −0.40 | −0.77 |
| L4 | 16 | 13.32 | 10.16 | 2.72 | −6.61 |
| L5 | 24 | −16.30 | 0.80 | 0.40 | −0.10 |
| L6 | 26 | 16.10 | 3.00 | 1.01 | −1.07 |
| G | 28 | ∞ | 2.30 | 1.01 | −1.01 |

Single Lens Data

| Lens | Starting surface | Focal length |
|---|---|---|
| 1 | 1 | −62.39 |
| 2 | 2 | 45.53 |
| 3 | 4 | 43.69 |
| 4 | 6 | −7.63 |
| 5 | 8 | −9.72 |
| 6 | 10 | 11.93 |
| 7 | 14 | −69.49 |
| 8 | 16 | 14.11 |
| 9 | 19 | −27.87 |
| 10 | 21 | 12.13 |
| 11 | 22 | −29.67 |
| 12 | 24 | −16.30 |
| 13 | 26 | 16.10 |
| 14 | 28 | 0.00 |
| 15 | 30 | 0.00 |

Numerical Example 3

Unit : mm

Surface Data

| Surface number | r | d | Nd | vd | Effective diameter |
|---|---|---|---|---|---|
| 1 | 35.542 | 1.20 | 1.84666 | 23.8 | 24.54 |
| 2 | 20.001 | 3.80 | 1.60300 | 65.4 | 21.79 |
| 3 | 82.748 | 0.10 |  |  | 20.34 |
| 4 | 22.033 | 2.40 | 1.77250 | 49.6 | 19.52 |
| 5 | 76.484 | Variable |  |  | 19.11 |
| 6 | 132.635 | 1.15 | 1.85135 | 40.1 | 12.87 |
| 7* | 5.824 | 3.40 |  |  | 8.92 |
| 8 | −11.841 | 0.65 | 1.88300 | 40.8 | 8.53 |
| 9 | 26.152 | 0.15 |  |  | 8.60 |
| 10 | 17.002 | 2.25 | 1.92286 | 18.9 | 8.74 |
| 11 | −26.285 | Variable |  |  | 8.66 |
| 12 | ∞ | 7.00 | 1.88300 | 40.8 | 6.39 |
| 13 | ∞ | 0.80 |  |  | 5.46 |
| 14 | −26.364 | 0.65 | 1.64000 | 60.1 | 5.62 |
| 15 | −52.757 | Variable |  |  | 5.78 |
| 16 (Stop) | ∞ | Variable |  |  | 5.95 |
| 17* | 9.151 | 2.10 | 1.55332 | 71.7 | 6.20 |
| 18* | −32.063 | 2.14 |  |  | 6.21 |
| 19 | 12.779 | 0.65 | 1.84666 | 23.8 | 6.29 |
| 20 | 7.785 | 1.39 |  |  | 6.10 |
| 21 | 14.743 | 2.50 | 1.51633 | 64.1 | 6.47 |
| 22 | −7.948 | 0.65 | 1.88300 | 40.8 | 6.55 |
| 23 | −14.330 | Variable |  |  | 6.76 |
| 24 | −59.860 | 0.75 | 1.60311 | 60.6 | 6.74 |
| 25 | 11.721 | Variable |  |  | 6.79 |
| 26* | 12.799 | 3.15 | 1.50670 | 70.5 | 9.62 |
| 27 | −18.021 | Variable |  |  | 9.63 |
| 28 | ∞ | 0.30 | 1.51633 | 64.1 | 20.00 |
| 29 | ∞ | 1.50 |  |  | 20.00 |
| 30 | ∞ | 0.50 | 1.51633 | 64.1 | 20.00 |
| 31 | ∞ |  |  |  | 20.00 |
| Image plane | ∞ |  |  |  |  |

Aspheric Data

7th surface

K = 0.00000e+000  A4 = −1.03449e−004  A6 = 3.79250e−006
A8 = −3.86219e−007  A10 = 7.81047e−009

17th surface

K = −4.95493e−001  A4 = −4.59098e−005  A6 = −1.91545e−006
A8 = 2.21486e−008

18th surface

K = −3.97025e+001  A4 = −6.69292e−005

26th surface

K = 0.00000e+000  A4 = −6.32748e−005  A6 = −3.51836e−007
A8 = 9.47021e−010

Various Data
zoom ratio: 9.50

|  | Wide angle | Middle | Telephoto |
|---|---|---|---|
| Focal length | 4.63 | 16.85 | 43.99 |
| F-number | 3.20 | 4.93 | 6.07 |
| Half angle of view | 35.75 | 12.95 | 5.03 |
| Image height | 3.33 | 3.88 | 3.88 |
| Total lens length | 71.86 | 78.24 | 83.88 |
| BF | 0.50 | 0.50 | 0.50 |
| d5 | 0.76 | 10.23 | 16.37 |
| d11 | 4.68 | 1.58 | 1.09 |
| d15 | 9.29 | 3.87 | 0.47 |
| d16 | 4.53 | 2.06 | 0.31 |
| d23 | 0.99 | 8.89 | 14.04 |
| d25 | 4.17 | 8.69 | 9.38 |
| d27 | 7.77 | 3.25 | 2.56 |
| Entrance pupil position | 14.81 | 42.45 | 86.91 |

-continued

Unit : mm

| | | | |
|---|---|---|---|
| Exit pupil position | −259.46 | 72.75 | 59.45 |
| Front-side principal point position | 19.36 | 63.23 | 163.73 |
| Rear-side principal point position | −4.13 | −16.35 | −43.49 |

Zoom Lens Unit Data

| Unit | Starting surface | Focal length | Lens length | Front-side principal point position | Rear-side principal point position |
|---|---|---|---|---|---|
| L1 | 1 | 34.19 | 7.50 | 1.22 | −3.28 |
| L2 | 6 | −6.69 | 7.60 | 0.48 | −5.69 |
| UR | 12 | ∞ | 7.00 | 1.86 | −1.86 |
| L3 | 14 | −83.14 | 0.65 | −0.40 | −0.80 |
| LS | 16 | ∞ | 0.00 | 0.00 | −0.00 |
| L4 | 17 | 12.71 | 9.43 | 2.14 | −6.25 |
| L5 | 24 | −16.19 | 0.75 | 0.39 | −0.08 |
| L6 | 26 | 15.30 | 3.15 | 0.90 | −1.27 |
| G | 28 | ∞ | 2.30 | 1.01 | −1.01 |

Single Lens Data

| Lens | Starting surface | Focal length |
|---|---|---|
| 1 | 1 | −56.01 |
| 2 | 2 | 42.77 |
| 3 | 4 | 39.31 |
| 4 | 6 | −7.18 |
| 5 | 8 | −9.16 |
| 6 | 10 | 11.47 |
| 7 | 12 | 0.00 |
| 8 | 14 | −83.14 |
| 9 | 17 | 13.10 |
| 10 | 19 | −25.03 |
| 11 | 21 | 10.39 |
| 12 | 22 | −21.23 |
| 13 | 24 | −16.19 |
| 14 | 26 | 15.30 |
| 15 | 28 | 0.00 |
| 16 | 30 | 0.00 |

Numerical Example 4

Unit : mm

Surface Data

| Surface number | r | d | Nd | vd | Effective diameter |
|---|---|---|---|---|---|
| 1 | 35.840 | 1.20 | 1.84666 | 23.9 | 22.02 |
| 2 | 23.085 | 3.20 | 1.55332 | 71.7 | 20.09 |
| 3 | 219.562 | 0.10 | | | 18.86 |
| 4 | 29.929 | 1.70 | 1.69680 | 55.5 | 16.6 |
| 5 | 137.857 | Variable | | | 15.61 |
| 6 | −458.440 | 1.05 | 1.84954 | 40.1 | 12.97 |
| 7* | 6.960 | 3.66 | | | 9.76 |
| 8 | −10.889 | 0.60 | 1.88300 | 40.8 | 9.40 |
| 9 | 827.269 | 0.10 | | | 9.72 |
| 10 | 33.800 | 1.70 | 1.94595 | 18.0 | 9.88 |
| 11 | −24.698 | Variable | | | 9.91 |
| 12 | ∞ | 9.50 | 1.83400 | 37.2 | 8.88 |
| 13 | ∞ | 1.03 | | | 7.23 |
| 14 | −9.467 | 0.60 | 1.48749 | 70.2 | 7.12 |
| 15 | −11.446 | Variable | | | 7.16 |
| 16* | 9.241 | 2.35 | 1.58313 | 59.4 | 7.90 |
| 17* | −41.011 | 1.00 | | | 7.70 |
| 18 (Stop) | ∞ | 1.00 | | | 6.59 |
| 19 | 19.669 | 0.60 | 1.84666 | 23.9 | 6.28 |
| 20 | 8.446 | 1.23 | | | 6.03 |
| 21* | 14.484 | 2.00 | 1.48749 | 70.2 | 7.20 |
| 22 | −22.344 | Variable | | | 7.10 |
| 23 | −39.402 | 0.70 | 1.55332 | 71.7 | 6.08 |
| 24 | 29.970 | Variable | | | 6.17 |
| 25 | 16.444 | 2.80 | 1.55332 | 71.7 | 10.31 |
| 26 | −23.252 | 0.60 | 1.77250 | 49.6 | 10.20 |
| 27 | −40.048 | Variable | | | 10.19 |
| 28 | ∞ | 0.30 | 1.51633 | 64.1 | 20.00 |
| 29 | ∞ | 1.50 | | | 20.00 |
| 30 | ∞ | 0.50 | 1.51633 | 64.1 | 20.00 |
| 31 | ∞ | | | | 20.00 |
| Image plane | ∞ | | | | |

Aspheric Data

7th surface $K = -1.09678e-001$  $A4 = -4.44213e-005$  $A6 = -6.06895e-007$

16th surface $K = -1.32529e+000$  $A4 = 8.46085e-005$  $A6 = -1.95426e-007$
$A8 = -5.16392e-010$ 17th surface $K = 2.21785e+001$  $A4 = 8.92541e-005$ 21st surface $K = -1.00040e+000$  $A4 = -3.56047e-005$  $A6 = 5.22400e-008$
$A8 = -2.19280e-008$ Various Data
zoom ratio: 6.83

| | Wide angle | Middle | Telephoto |
|---|---|---|---|
| Focal length | 5.15 | 16.71 | 35.18 |
| F-number | 3.07 | 4.79 | 5.74 |
| Half angle of view | 32.89 | 13.05 | 6.29 |
| Image height | 3.33 | 3.88 | 3.88 |
| Total lens length | 76.38 | 83.02 | 89.12 |
| BF | 0.50 | 0.50 | 0.50 |
| d5 | 0.97 | 8.64 | 15.43 |
| d11 | 2.70 | 1.67 | 0.98 |
| d15 | 17.69 | 4.28 | 0.30 |
| d22 | 0.97 | 6.39 | 12.10 |
| d24 | 8.76 | 16.54 | 15.77 |
| d27 | 5.77 | 5.98 | 5.02 |
| Entrance pupil position | 15.00 | 32.67 | 63.90 |
| Exit pupil position | −45.94 | 284.08 | 152.62 |
| Front-side principal point position | 19.58 | 50.37 | 107.22 |
| Rear-side principal point position | −4.65 | −16.21 | −34.68 |

Zoom Lens Unit Data

| Unit | Starting surface | Focal length | Lens length | Front-side principal point position | Rear-side principal point position |
|---|---|---|---|---|---|
| L1 | 1 | 37.94 | 6.20 | 1.20 | −2.66 |
| L2 | 6 | −7.47 | 7.11 | 0.43 | −5.47 |
| UR | 12 | ∞ | 9.50 | 2.59 | −2.59 |
| L3 | 14 | −124.75 | 0.60 | −2.14 | −2.59 |
| L4 | 16 | 13.88 | 8.18 | 1.60 | −5.62 |
| L5 | 23 | −30.65 | 0.70 | 0.26 | −0.19 |
| L6 | 25 | 23.39 | 3.40 | 0.57 | −1.62 |
| G | 28 | ∞ | 2.30 | 1.01 | −1.01 |

Single Lens Data

| Lens | Starting surface | Focal length |
|---|---|---|
| 1 | 1 | −80.07 |
| 2 | 2 | 46.35 |
| 3 | 4 | 54.51 |
| 4 | 6 | −8.06 |
| 5 | 8 | −12.17 |

-continued

Unit : mm

| | | |
|---|---|---|
| 6 | 10 | 15.30 |
| 7 | 12 | 0.00 |
| 8 | 14 | −124.75 |
| 9 | 16 | 13.16 |
| 10 | 19 | −17.92 |
| 11 | 21 | 18.35 |
| 12 | 23 | −30.65 |
| 13 | 25 | 17.86 |
| 14 | 26 | −72.90 |
| 15 | 28 | 0.00 |
| 16 | 30 | 0.00 |

Numerical Example 5

Unit : mm

Surface Data

| Surface number | r | d | Nd | vd | Effective diameter |
|---|---|---|---|---|---|
| 1 | 35.843 | 0.85 | 1.84666 | 23.9 | 23.62 |
| 2 | 20.695 | 4.10 | 1.49700 | 81.5 | 21.48 |
| 3 | 340.774 | 0.05 | | | 20.06 |
| 4 | 21.627 | 2.10 | 1.77250 | 49.6 | 17.20 |
| 5 | 95.579 | Variable | | | 16.85 |
| 6 | 116.727 | 0.70 | 1.85135 | 40.1 | 13.72 |
| 7* | 6.544 | 3.80 | | | 10.01 |
| 8 | −12.399 | 0.40 | 1.88300 | 40.8 | 9.69 |
| 9 | 48.287 | 0.15 | | | 9.85 |
| 10 | 22.001 | 1.75 | 1.95906 | 17.5 | 10.03 |
| 11 | −34.573 | Variable | | | 9.99 |
| 12 | ∞ | 8.50 | 1.80610 | 33.3 | 7.18 |
| 13 | ∞ | 1.00 | | | 5.54 |
| 14 | −14.062 | 0.50 | 1.48749 | 70.2 | 7.00 |
| 15 | −25.033 | Variable | | | 7.00 |
| 16* | 8.378 | 1.90 | 1.55332 | 71.7 | 7.00 |
| 17* | −67.218 | 0.80 | | | 7.00 |
| 18 (Stop) | ∞ | 1.00 | | | 6.20 |
| 19 | 10.573 | 0.60 | 1.90366 | 31.3 | 6.80 |
| 20 | 6.873 | 1.40 | | | 6.60 |
| 21* | 23.129 | 2.70 | 1.58313 | 59.4 | 7.00 |
| 22 | −6.057 | 0.50 | 1.80610 | 40.9 | 7.00 |
| 23 | −15.031 | Variable | | | 7.00 |
| 24 | −33.088 | 0.50 | 1.53172 | 48.8 | 7.07 |
| 25 | 33.088 | Variable | | | 7.21 |
| 26 | 15.811 | 2.10 | 1.48749 | 70.2 | 9.71 |
| 27 | −34.307 | Variable | | | 9.69 |
| 28 | ∞ | 0.30 | 1.51633 | 64.1 | 20.00 |
| 29 | ∞ | 1.50 | | | 20.00 |
| 30 | ∞ | 0.50 | 1.51633 | 64.1 | 20.00 |
| 31 | ∞ | | | | 20.00 |
| Image plane | ∞ | | | | |

Aspheric Data

7th surface

K = 1.49123e−001  A4 = −9.59483e−005  A6 = −2.72499e−006
A8 = 3.98916e−008  A10 = −3.09588e−009

-continued

Unit : mm

16th surface

K = −4.91752e−001  A4 = −2.37528e−005  A6 = −1.58510e−006
A8 = 5.38005e−008

17th surface

K = −2.47829e+002  A4 = −2.29333e−005

21st surface

K = 6.87148e+000  A4 = 5.32093e−005  A6 = 1.92409e−006
A8 = −6.46807e−008  A10 = 1.22441e−009

Various Data
zoom ratio: 11.35

| | Wide angle | Middle | Telephoto |
|---|---|---|---|
| Focal length | 5.15 | 25.24 | 58.50 |
| F-number | 3.50 | 5.00 | 6.08 |
| Half angle of view | 33.19 | 8.73 | 3.79 |
| Image height | 3.37 | 3.88 | 3.88 |
| Total lens length | 76.76 | 81.32 | 86.26 |
| BF | 0.50 | 0.50 | 0.50 |
| d5 | 0.45 | 11.32 | 16.31 |
| d11 | 6.90 | 0.60 | 0.54 |
| d15 | 14.40 | 3.46 | 0.99 |
| d23 | 2.85 | 13.79 | 16.27 |
| d25 | 6.60 | 3.42 | 9.14 |
| d27 | 7.36 | 10.53 | 4.81 |
| Entrance pupil position | 15.18 | 53.87 | 113.71 |
| Exit pupil position | −45.74 | −67.78 | 28103.68 |
| Front-side principal point position | 19.76 | 69.78 | 172.34 |
| Rear-side principal point position | −4.65 | −24.74 | −58.00 |

Zoom Lens Unit Data

| Unit | Starting surface | Focal length | Lens length | Front-side principal point position | Rear-side principal point position |
|---|---|---|---|---|---|
| L1 | 1 | 30.60 | 7.10 | 2.12 | −2.38 |
| L2 | 6 | −7.19 | 6.80 | 0.48 | −5.14 |
| UR | 12 | ∞ | 8.50 | 2.35 | −2.35 |
| L3 | 14 | −66.82 | 0.50 | −0.44 | −0.78 |
| L4 | 16 | 14.37 | 8.90 | 1.36 | −6.21 |
| L5 | 24 | −31.03 | 0.50 | 0.16 | −0.16 |
| L6 | 26 | 22.51 | 2.10 | 0.45 | −0.98 |
| G | 28 | ∞ | 2.30 | 1.01 | −1.01 |

Single Lens Data

| Lens | Starting surface | Focal length |
|---|---|---|
| 1 | 1 | −59.37 |
| 2 | 2 | 44.14 |
| 3 | 4 | 35.74 |
| 4 | 6 | −8.17 |
| 5 | 8 | −11.14 |
| 6 | 10 | 14.23 |
| 7 | 12 | 0.00 |
| 8 | 14 | −66.82 |
| 9 | 16 | 13.58 |
| 10 | 19 | −23.55 |
| 11 | 21 | 8.52 |
| 12 | 22 | −12.91 |
| 13 | 24 | −31.03 |
| 14 | 26 | 22.51 |
| 15 | 28 | 0.00 |
| 16 | 30 | 0.00 |

Numerical Example 6

Unit: mm

Surface Data

| Surface number | r | d | nd | vd | Effective diameter |
|---|---|---|---|---|---|
| 1 | 33.995 | 1.10 | 1.84666 | 23.8 | 23.49 |
| 2 | 19.237 | 4.00 | 1.59282 | 68.6 | 21.04 |
| 3 | 129.013 | 0.10 | | | 19.65 |
| 4 | 21.484 | 2.00 | 1.77250 | 49.6 | 16.69 |
| 5 | 77.246 | Variable | | | 15.66 |
| 6 | 2770.857 | 1.05 | 1.85135 | 40.1 | 14.20 |
| 7* | 6.075 | 3.88 | | | 10.10 |
| 8 | −14.789 | 0.60 | 1.88300 | 40.8 | 9.88 |
| 9 | 35.129 | 0.10 | | | 10.11 |
| 10 | 19.661 | 2.50 | 1.94595 | 18.0 | 10.33 |
| 11 | −27.291 | Variable | | | 10.31 |
| 12 | ∞ | 8.00 | 1.83400 | 37.2 | 7.24 |
| 13 | ∞ | 0.81 | | | 6.34 |
| 14 | −16.935 | 0.60 | 1.88300 | 40.8 | 6.43 |
| 15 | −34.443 | Variable | | | 6.63 |
| 16* | 8.939 | 2.60 | 1.55332 | 71.7 | 7.01 |
| 17* | −37.742 | 1.00 | | | 6.88 |
| 18 (Stop) | ∞ | 1.00 | | | 6.63 |
| 19 | 11.439 | 0.60 | 1.80610 | 33.3 | 6.51 |
| 20 | 7.214 | 1.18 | | | 6.28 |
| 21 | 13.305 | 2.80 | 1.49700 | 81.5 | 6.52 |
| 22 | −7.865 | 0.60 | 1.88300 | 40.8 | 6.55 |
| 23 | −15.269 | Variable | | | 6.74 |
| 24 | −37.463 | 0.70 | 1.48749 | 70.2 | 6.41 |
| 25 | 13.868 | Variable | | | 6.46 |
| 26* | 13.687 | 3.15 | 1.48749 | 70.2 | 10.38 |
| 27 | −25.410 | Variable | | | 10.28 |
| 28 | ∞ | 0.30 | 1.51633 | 64.1 | 20.00 |
| 29 | ∞ | 1.50 | | | 20.00 |
| 30 | ∞ | 0.50 | 1.51633 | 64.1 | 20.00 |
| 31 | ∞ | | | | 20.00 |
| Image plane | ∞ | | | | |

Aspheric Data

7th surface

K = −3.84786e−001  A4 = 6.27857e−005  A6 = 4.96701e−007
A8 = 9.99933e−008  A10 = −9.53117e−010

16th surface

K = −6.90777e−001  A4 = −2.90468e−005  A6 = −2.03489e−007
A8 = −3.95408e−009

17th surface

K = −3.32420e+001  A4 = −5.36955e−005

26th surface

K = 0.00000e+000  A4 = −2.18835e−005  A6 = −5.64572e−008
A8 = −1.39247e−009

Various Data
Zoom ratio: 13.99

| | Wide angle | Middle | Telephoto |
|---|---|---|---|
| Focal length | 5.15 | 16.68 | 72.05 |
| F-number | 3.31 | 4.55 | 6.07 |
| Half angle of view | 33.51 | 13.08 | 3.08 |
| Image height | 3.41 | 3.88 | 3.88 |
| Total lens length | 78.56 | 80.88 | 88.25 |
| BF | 0.50 | 0.50 | 0.50 |
| d5 | 0.68 | 7.70 | 16.59 |
| d11 | 7.04 | 2.34 | 0.83 |
| d15 | 13.16 | 4.60 | 0.30 |
| d23 | 1.26 | 9.82 | 14.12 |
| d25 | 7.34 | 7.20 | 12.37 |
| d27 | 7.92 | 8.06 | 2.89 |
| Entrance pupil position | 15.82 | 36.15 | 130.73 |
| Exit pupil position | −57.83 | −183.97 | 88.89 |
| Front-side principal point position | 20.51 | 51.32 | 261.52 |
| Rear-side principal point position | −4.65 | −16.18 | −71.55 |

Zoom Lens Unit Data

| Unit | Starting surface | Focal length | Lens length | Front-side principal point position | Rear-side principal point position |
|---|---|---|---|---|---|
| L1 | 1 | 30.52 | 7.20 | 1.57 | −2.83 |
| L2 | 6 | −7.82 | 8.13 | −0.02 | −6.97 |
| UR | 12 | ∞ | 8.00 | 2.18 | −2.18 |
| L3 | 14 | −38.35 | 0.60 | −0.31 | −0.64 |
| L4 | 16 | 13.04 | 9.78 | 1.68 | −6.6 |
| L5 | 24 | −20.67 | 0.70 | 0.34 | −0.13 |
| L6 | 26 | 18.74 | 3.15 | 0.76 | −1.41 |
| G | 28 | ∞ | 2.30 | 1.01 | −1.01 |

Single Lens Data

| Lens | Starting surface | Focal length |
|---|---|---|
| 1 | 1 | −54.19 |
| 2 | 2 | 37.63 |
| 3 | 4 | 37.93 |
| 4 | 6 | −7.15 |
| 5 | 8 | −11.72 |
| 6 | 10 | 12.40 |
| 7 | 12 | 0.00 |
| 8 | 14 | −38.35 |
| 9 | 16 | 13.33 |
| 10 | 19 | −25.87 |
| 11 | 21 | 10.40 |
| 12 | 22 | −19.09 |
| 13 | 24 | −20.67 |
| 14 | 26 | 18.74 |
| 15 | 28 | 0.00 |
| 16 | 30 | 0.00 |

Numerical Example 7

Unit: mm

Surface Data

| Surface number | r | d | nd | vd | Effective diameter |
|---|---|---|---|---|---|
| 1 | 41.911 | 1.00 | 1.84666 | 23.9 | 24.25 |
| 2 | 20.801 | 4.00 | 1.61800 | 63.3 | 21.78 |
| 3 | 238.630 | 0.10 | | | 20.56 |
| 4 | 19.108 | 2.60 | 1.77250 | 49.6 | 17.93 |
| 5 | 62.702 | Variable | | | 17.33 |
| 6 | 117.905 | 0.80 | 1.85135 | 40.1 | 12.61 |
| 7* | 5.896 | 3.60 | | | 9.06 |
| 8 | −11.312 | 0.60 | 1.88300 | 40.8 | 8.62 |
| 9 | 34.929 | 0.10 | | | 8.75 |
| 10 | 20.923 | 1.80 | 1.94595 | 18.0 | 8.86 |
| 11 | −30.404 | Variable | | | 8.84 |
| 12 | ∞ | 8.00 | 1.83400 | 37.2 | 7.35 |
| 13 | ∞ | Variable | | | 5.90 |
| 14* | 9.554 | 2.30 | 1.55332 | 71.7 | 5.28 |
| 15* | −12766.102 | 1.00 | | | 5.11 |
| 16 (Stop) | ∞ | 1.00 | | | 5.01 |
| 17 | 9.588 | 0.70 | 1.84666 | 23.9 | 4.89 |
| 18 | 7.082 | 0.7 | | | 4.66 |
| 19* | 19.688 | 2.00 | 1.55332 | 71.7 | 4.68 |
| 20 | −5.160 | 0.60 | 1.77250 | 49.6 | 4.60 |
| 21 | −13.876 | Variable | | | 4.71 |
| 22 | 12.120 | 2.20 | 1.77250 | 49.6 | 9.28 |
| 23 | 30.400 | 0.70 | 1.94595 | 18.0 | 8.86 |

-continued

Unit: mm

| | | | | | |
|---|---|---|---|---|---|
| 24 | 18.947 | Variable | | | 8.62 |
| 25 | ∞ | 1.00 | 1.51633 | 64.1 | 20.00 |
| 26 | ∞ | | | | 20.00 |
| Image plane | ∞ | | | | |

Aspheric Data

7th surface

K = -1.22408e-002    A4 = -7.64686e-005

14th surface

K = -1.76907e+000    A4 = 7.06284e-005    A6 = 3.37752e-006
A8 = -2.21321e-007

15th surface

K = 2.37349e+007    A4 = -1.08046e-004

19th surface

K = 1.09850e+001    A4 = 1.34385e-005

Various Data
Zoom ratio: 9.47

| | Wide angle | Middle | Telephoto |
|---|---|---|---|
| Focal length | 5.13 | 14.47 | 48.60 |
| F-number | 3.60 | 4.86 | 5.74 |
| Half angle of view | 33.31 | 14.99 | 4.56 |
| Image height | 3.37 | 3.88 | 3.88 |
| Total lens length | 68.00 | 70.39 | 77.88 |
| BF | 0.50 | 0.50 | 0.50 |
| d5 | 0.69 | 6.04 | 14.57 |
| d11 | 4.06 | 1.1 | 0.06 |
| d13 | 13.37 | 3.6 | -0.15 |
| d21 | 10.39 | 16.25 | 26.49 |
| d24 | 4.19 | 8.1 | 1.61 |
| Entrance pupil position | 15.45 | 29.30 | 99.04 |
| Exit pupil position | -24.89 | -42.72 | -89.12 |
| Front-side principal point position | 19.54 | 38.93 | 121.28 |
| Rear-side principal point position | -4.63 | -13.97 | -48.10 |

Zoom Lens Unit Data

| Unit | Starting surface | Focal length | Lens length | Front-side principal point position | Rear-side principal point position |
|---|---|---|---|---|---|
| L1 | 1 | 28.75 | 7.70 | 1.67 | -2.93 |
| L2 | 6 | -6.09 | 6.90 | 0.64 | -4.89 |
| UR | 12 | ∞ | 8.00 | 2.18 | -2.18 |
| L3 | 14 | 14.91 | 8.30 | 1.32 | -5.43 |
| L4 | 22 | 41.23 | 2.90 | -3.00 | -4.29 |
| G | 25 | ∞ | 1.00 | 0.33 | -0.33 |

Single Lens Data

| Lens | Starting surface | Focal length |
|---|---|---|
| 1 | 1 | -49.86 |
| 2 | 2 | 36.62 |
| 3 | 4 | 34.68 |
| 4 | 6 | -7.31 |
| 5 | 8 | -9.62 |
| 6 | 10 | 13.33 |
| 7 | 12 | 0.00 |
| 8 | 14 | 17.25 |
| 9 | 17 | -36.70 |
| 10 | 19 | 7.61 |
| 11 | 20 | -10.96 |
| 12 | 22 | 24.79 |
| 13 | 23 | -54.80 |
| 14 | 25 | 0.00 |

Numerical Example 8

Unit: mm

Surface Data

| Surface number | r | d | nd | vd | Effective diameter |
|---|---|---|---|---|---|
| 1 | 34.161 | 1.20 | 1.84666 | 23.9 | 26.20 |
| 2 | 21.199 | 3.70 | 1.59282 | 68.6 | 23.41 |
| 3 | 66.122 | 0.12 | | 21.97 | |
| 4 | 26.833 | 2.30 | 1.77250 | 49.6 | 19.53 |
| 5 | 86.631 | Variable | | | 18.13 |
| 6 | 137.406 | 1.20 | 1.84954 | 40.1 | 14.33 |
| 7* | 6.131 | 3.94 | | | 9.88 |
| 8 | -11.824 | 0.70 | 1.88300 | 40.8 | 9.55 |
| 9 | 30.577 | 0.16 | | | 9.81 |
| 10 | 19.283 | 2.30 | 1.92286 | 18.9 | 10.05 |
| 11 | -28.205 | Variable | | | 10.06 |
| 12 | ∞ | 9.00 | 1.83400 | 37.2 | 8.17 |
| 13 | ∞ | Variable | | | 6.59 |
| 14* | 9.907 | 2.40 | 1.55332 | 71.7 | 6.95 |
| 15* | -38.154 | 1.15 | | | 6.84 |
| 16 (Stop) | ∞ | 1.15 | | | 6.57 |
| 17 | 13.574 | 0.70 | 1.84666 | 23.9 | 6.26 |
| 18 | 8.310 | 1.12 | | | 5.97 |
| 19 | 17.051 | 3.50 | 1.48749 | 70.2 | 6.01 |
| 20 | -8.599 | 0.70 | 1.88300 | 40.8 | 6.07 |
| 21 | -14.337 | Variable | | | 6.24 |
| 22 | -60.527 | 0.80 | 1.60311 | 60.6 | 5.88 |
| 23 | 11.688 | Variable | | | 5.91 |
| 24* | 13.713 | 4.30 | 1.48749 | 70.2 | 10.42 |
| 25 | -14.526 | Variable | | | 10.44 |
| 26 | ∞ | 0.30 | 1.51633 | 64.1 | 20.00 |
| 27 | ∞ | 1.50 | | | 20.00 |
| 28 | ∞ | 0.50 | 1.51633 | 64.1 | 20.00 |
| 29 | ∞ | | | | 20.00 |
| Image plane | ∞ | | | | |

Aspheric Data

7th surface

K = 0.00000e+000    A4 = -9.39007e-005    A6 = -2.47950e-006
A8 = 3.06773e-008    A10 = -3.95563e-009

14th surface

K = -7.17496e-002    A4 = -1.30618e-004    A6 = -1.93409e-007
A8 = -3.88670e-008

24th surface

K = 0.00000e+000    A4 = -1.02776e-004    A6 = -3.84889e-007
A8 = -3.46352e-009

Various Data
Zoom ratio: 9.5

| | Wide angle | Middle | Telephoto |
|---|---|---|---|
| Focal length | 5.00 | 23.92 | 47.52 |
| F-number | 3.13 | 5.63 | 6.50 |
| Half angle of view | 37.78 | 9.20 | 4.66 |
| Image height | 3.88 | 3.88 | 3.88 |
| Total lens length | 79.87 | 88.03 | 94.48 |
| BF | 0.50 | 0.50 | 0.50 |
| d5 | 0.93 | 13.11 | 19.89 |
| d11 | 5.28 | 1.26 | 0.94 |
| d13 | 15.44 | 3.48 | 0.61 |
| d21 | 0.81 | 12.76 | 15.63 |
| d23 | 5.78 | 10.67 | 11.74 |
| d25 | 8.39 | 3.50 | 2.43 |
| Entrance pupil position | 15.44 | 48.72 | 93.59 |
| Exit pupil position | -79.20 | 48.05 | 40.42 |
| Front-side principal point position | 20.12 | 84.68 | 197.67 |
| Rear-side principal point position | -4.50 | -23.42 | -47.02 |

-continued

Unit: mm

Zoom Lens Unit Data

| Unit | Starting surface | Focal length | Lens length | Front-side principal point position | Rear-side principal point position |
|---|---|---|---|---|---|
| L1 | 1 | 42.08 | 7.32 | 0.68 | −3.71 |
| L2 | 6 | −6.67 | 8.30 | 0.68 | −6.05 |
| UR | 12 | ∞ | 9.00 | 2.45 | −2.45 |
| L3 | 14 | 14.32 | 10.73 | 2.13 | −7.17 |
| L4 | 22 | −16.18 | 0.80 | 0.42 | −0.08 |
| L5 | 24 | 15.23 | 4.30 | 1.48 | −1.57 |
| G | 26 | ∞ | 2.30 | 1.01 | −1.01 |

Single Lens Data

| Lens | Starting surface | Focal length |
|---|---|---|
| 1 | 1 | −68.91 |
| 2 | 2 | 51.07 |
| 3 | 4 | 49.49 |
| 4 | 6 | −7.59 |
| 5 | 8 | −9.58 |
| 6 | 10 | 12.71 |
| 7 | 12 | 0.00 |
| 8 | 14 | 14.47 |
| 9 | 17 | −26.95 |
| 10 | 19 | 12.27 |
| 11 | 20 | −25.81 |
| 12 | 22 | −16.18 |
|  | 24 | 15.23 |
| 14 | 26 | 0.00 |
| 15 | 28 | 0.00 |

TABLE 1

| Conditions | | Numerical Examples | | | | | | | |
|---|---|---|---|---|---|---|---|---|---|
| Lower limit | Upper limit | 1 | 2 | 3 | 4 | 5 | 6 | 7 | 8 |
| (1) 1.40 | 20.00 | 3.355 | 3.405 | 3.352 | 7.411 | 1.493 | 1.559 | 2.467 | 3.365 |
| (2) 0.20 | 0.44 | 0.352 | 0.344 | 0.324 | 0.389 | 0.409 | 0.388 | 0.398 | 0.385 |
| (3) 0.20 | 0.44 | 0.310 | 0.357 | 0.328 | 0.324 | 0.418 | 0.415 | 0.431 | 0.284 |
| (4) 0.40 | 0.66 | 0.632 | 0.618 | 0.535 | 0.646 | 0.632 | 0.629 | 0.651 | 0.626 |
| (5) 10.00 | 20.00 | 18.90 | 18.90 | 18.90 | 17.98 | 17.49 | 17.98 | 17.98 | 18.90 |
| (6) 1.83 | 2.30 | 1.885 | 1.890 | 1.886 | 1.893 | 1.898 | 1.893 | 1.893 | 1.885 |
| (7) 60.00 | 100.00 | 70.23 | 68.63 | 65.44 | 71.68 | 81.54 | 68.63 | 63.33 | 68.63 |
| (8) 1.40 | 1.70 | 1.487 | 1.593 | 1.603 | 1.553 | 1.497 | 1.593 | 1.618 | 1.593 |
| (9) 3.50 | 8.00 | 5.532 | 5.160 | 5.112 | 5.075 | 4.256 | 3.904 | 4.722 | 6.308 |
| (10) 0.60 | 1.20 | 0.830 | 0.922 | 0.881 | 1.051 | 1.057 | 0.962 | 0.882 | 0.804 |

Next, a digital camera (optical apparatus) in which the zoom lens according to an embodiment of the invention is used as the photographic optical system will be described with reference to FIG. 18. In FIG. 18, reference numeral 20 denotes a digital camera main body, and reference numeral 21 denotes a photographic optical system including the zoom lens according to an embodiment of the invention described above. P denotes a reflective element. The photographic optical system 21 forms an image of the object on a solid-state image sensor (photoelectric conversion element) 22 such as a CCD. Reference numeral 23 denotes a recording unit for recording an image of an object received by the image sensor 22, and reference numeral 24 denotes a viewfinder for observing an image displayed on a display device (not shown). The display device includes a liquid crystal panel and the like to display an image formed on the image sensor 22.

In this manner, if the zoom lens according to an embodiment of the invention is applied to a digital camera and the like, it is possible to implement a miniaturized image pickup apparatus having high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-129910 filed Jun. 10, 2011, which is hereby incorporated by reference herein in its entirety.

What is claimed is:

1. A zoom lens comprising, in order from an object side to an image side, a first lens unit of a positive refractive power, a second lens unit of a negative refractive power, a reflective element, and a rear lens group including at least two lens units and an aperture stop, in which the first lens unit, the second lens unit, and two or more lens units of the rear lens group are arranged to move and the reflective element is arranged to be stationary during zooming, wherein the zoom lens satisfies the following conditions:

$1.4 < M1/M2 < 20.0$ $0.20 < (M2+Ms)/LSw < 0.44$, and $0.20 < (\beta 2t/\beta 2w)/(ft/fw) < 0.44$, where M1 denotes a distance moved by the first lens unit, M2 denotes a distance moved by the second lens units and Ms denotes a distance moved by the aperture stop, during zooming from a wide-angle end to a telephoto end, LSw denotes a distance from the aperture stop to a lens surface in the first lens unit which is furthest from the aperture stop at the wide-angle end, $\beta 2w$ and $\beta 2t$ denote lateral magnifications of the second lens unit at the wide-angle end and the telephoto end, respectively, and fw and ft denote focal lengths of the zoom lens at the wide-angle end and the telephoto end, respectively.

2. The zoom lens according to claim 1, wherein a condition $0.40 < LSw/OALw < 0.66$ is satisfied, where OALw denotes a length of the zoom lens at the wide-angle end.

3. The zoom lens according to claim 1, wherein the second lens unit includes a positive lens, and wherein a condition $10.0 < vd2p < 20.0$ is satisfied, where vd2p denotes an Abbe number of the positive lens in the second lens unit having the smallest Abbe number.

4. The zoom lens according to claim 1, wherein the second lens unit includes a plurality of lenses, and
wherein a condition $1.83 < nd2ave < 2.30$ is satisfied, where nd2ave denotes an average refractive index of materials from which the lenses of the second lens unit are manufactured.

5. The zoom lens according to claim 1, wherein the first lens unit includes a plurality of positive lenses, and
wherein conditions $60.0 < vd1p < 100.0$ and $1.40 < nd1p < 1.70$ are satisfied, where vd1p and nd1p denote an Abbe number and a refractive index, respectively, of a positive lens in the first lens unit having the greatest Abbe number.

6. The zoom lens according to claim 1, wherein a condition $3.50 < f1/|f2| < 8.00$ is satisfied, where f1 denotes a focal length of the first lens unit, and f2 denotes a focal length of the second lens unit.

7. The zoom lens according to claim 1, wherein a condition $0.60 < |f2|/D2 < 1.20$ is satisfied, where f2 denotes a focal length of the second lens unit, and D2 denotes a thickness of the second lens unit along an optical axis of the zoom lens.

8. The zoom lens according to claim 1, wherein the reflective element is arranged to move when a portion of the zoom lens is retracted, said portion of the zoom lens being arranged to move into a space generated by moving the reflective element.

9. The zoom lens according to claim 8, wherein said portion of the zoom lens includes the first and second lens units.

10. The zoom lens according to claim 1, wherein the rear lens group includes, in order from the object side to the image side, a third lens unit of a negative refractive power, a fourth lens unit of a positive refractive power, a fifth lens unit of a negative refractive power, and a sixth lens unit of a positive refractive power.

11. The zoom lens according to claim 1, wherein the rear lens group includes, in order from the object side to the image side, a third lens unit of a positive refractive power and a fourth lens unit of a positive refractive power.

12. The zoom lens according to claim 1, wherein the rear lens group includes, in order from the object side to the image side, a third lens unit of a positive refractive power, a fourth lens unit of a negative refractive power, and a fifth lens unit of a positive refractive power.

13. An image pickup apparatus comprising the zoom lens and a solid-state image sensor configured to receive an image formed by the zoom lens,
wherein the zoom lens comprises, in order from an object side to an image side, a first lens unit of a positive refractive power, a second lens unit of a negative refractive power, a reflective element, and a rear lens group including at least two lens units and an aperture stop, in which the first lens unit, the second lens unit, and two or more lens units of the rear lens group are arranged to move and the reflective element is arranged to be stationary during zooming,
wherein the zoom lens satisfies the following conditions:

$$1.4 < M1/M2 < 20.0$$

$$0.20 < (M2+Ms)/LSw < 0.44, \text{ and}$$

$$0.20 < (\beta 2t/\beta 2w)/(ft/fw) < 0.44,$$

where M1 denotes a distance moved by the first lens unit, M2 denotes a distance moved by the second lens units and Ms denotes a distance moved by the aperture stop, during zooming from a wide-angle end to a telephoto end, LSw denotes a distance from the aperture stop to a lens surface in the first lens unit which is furthest from the aperture stop at the wide-angle end, $\beta 2w$ and $\beta 2t$ denote lateral magnifications of the second lens unit at the wide-angle end and the telephoto end, respectively, and fw and ft denote focal lengths of the zoom lens at the wide-angle end and the telephoto end, respectively.

* * * * *